US008464025B2

(12) United States Patent
Yamaguchi et al.

(10) Patent No.: US 8,464,025 B2
(45) Date of Patent: Jun. 11, 2013

(54) SIGNAL PROCESSING APPARATUS WITH SIGNAL CONTROL UNITS AND PROCESSOR UNITS OPERATING BASED ON DIFFERENT THREADS

(75) Inventors: Yuji Yamaguchi, Tokyo (JP); Masatoshi Imai, Kanagawa (JP); Toshiharu Noda, Kanagawa (JP); Naosuke Asari, Chiba (JP); Tomoo Mitsunaga, Kanagawa (JP); Mitsuharu Ohki, Tokyo (JP); Kazumasa Ito, Tokyo (JP); Hidetoshi Nagano, Tokyo (JP); Sumito Arakawa, Kanagawa (JP); Kei Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 1287 days.

(21) Appl. No.: 11/572,331

(22) PCT Filed: May 22, 2006

(86) PCT No.: PCT/JP2006/310174
§ 371 (c)(1),
(2), (4) Date: Jan. 19, 2007

(87) PCT Pub. No.: WO2006/123822
PCT Pub. Date: Nov. 23, 2006

(65) Prior Publication Data
US 2009/0006773 A1  Jan. 1, 2009

(30) Foreign Application Priority Data

May 20, 2005  (JP) .................................. 2005-148301

(51) Int. Cl.
*G06F 15/00*  (2006.01)

(52) U.S. Cl.
USPC ............. 712/22; 345/418; 345/501; 345/502; 345/503; 345/504; 345/505; 348/721; 710/1; 710/5; 710/7; 711/1; 711/100; 711/154; 712/10; 712/11; 712/14; 712/16; 712/34; 712/35

(58) Field of Classification Search
USPC ........................................................ 712/22
See application file for complete search history.

(56) References Cited

U.S. PATENT DOCUMENTS 5,243,699 A * 9/1993 Nickolls et al. ................. 712/11
5,293,596 A * 3/1994 Toyokura et al. ................. 711/1

(Continued)

FOREIGN PATENT DOCUMENTS

GB  2407179 A * 4/2005
JP  06-162226  6/1994

(Continued)

OTHER PUBLICATIONS

'Multimedia Signal Processors: An Architectural Platform with Algorithmic Compilation' by Yen-Kuang Chen and S.Y. Kung, Journal of VLSI Signal Processing 20, 181-204 (1998).*

(Continued)

Primary Examiner — Steven Snyder
(74) Attorney, Agent, or Firm — Dentons US LLP

(57) ABSTRACT

A signal processing apparatus able to raise a processing capability in processing accompanying access to a storing means is provided. Stream control units (SCU) 203_0 to 203_3 access data at an external memory system or local memories 204_0 to 204_3 according to a thread under control from a host processor. Processor units (PU) arrays 202_0 to 202_3 perform image processing by a different thread from the thread of the SCUs 203_0 to 203_3.

18 Claims, 75 Drawing Sheets

U.S. PATENT DOCUMENTS

| | | | | |
|---|---|---|---|---|
| 5,504,916 | A * | 4/1996 | Murakami et al. | 712/36 |
| 5,537,601 | A * | 7/1996 | Kimura et al. | 712/35 |
| 5,598,408 | A * | 1/1997 | Nickolls et al. | 370/351 |
| 5,606,707 | A * | 2/1997 | Tomassi et al. | 345/418 |
| 5,659,780 | A * | 8/1997 | Wu | 712/19 |
| 5,754,871 | A * | 5/1998 | Wilkinson et al. | 712/20 |
| 5,790,879 | A * | 8/1998 | Wu | 712/19 |
| 5,815,723 | A * | 9/1998 | Wilkinson et al. | 712/20 |
| 5,825,677 | A * | 10/1998 | Agarwal et al. | 708/520 |
| 5,850,268 | A * | 12/1998 | Ohki et al. | 348/721 |
| 5,991,866 | A * | 11/1999 | Heller et al. | 712/10 |
| 6,079,008 | A * | 6/2000 | Clery, III | 712/11 |
| 6,343,309 | B1 * | 1/2002 | Clarke et al. | 718/106 |
| 6,606,704 | B1 * | 8/2003 | Adiletta et al. | 712/248 |
| 6,728,419 | B1 * | 4/2004 | Young | 382/276 |
| 6,732,126 | B1 * | 5/2004 | Wang | 708/232 |
| 6,924,807 | B2 * | 8/2005 | Ebihara et al. | 345/503 |
| 7,191,321 | B2 * | 3/2007 | Bernstein et al. | 712/245 |
| 7,305,500 | B2 * | 12/2007 | Adiletta et al. | 710/39 |
| 7,356,666 | B2 * | 4/2008 | Kanai et al. | 711/202 |
| 7,492,368 | B1 * | 2/2009 | Nordquist et al. | 345/502 |
| 7,755,631 | B1 * | 7/2010 | Mrazek et al. | 345/501 |
| 2002/0050991 | A1 * | 5/2002 | Fujita et al. | 345/422 |
| 2002/0174318 | A1 * | 11/2002 | Stuttard et al. | 712/13 |
| 2003/0021484 | A1 * | 1/2003 | Miki | 382/236 |
| 2003/0145159 | A1 * | 7/2003 | Adiletta et al. | 711/104 |
| 2004/0054880 | A1 * | 3/2004 | Bernstein et al. | 712/245 |
| 2004/0268083 | A1 * | 12/2004 | Kanai et al. | 711/203 |
| 2005/0283587 | A1 * | 12/2005 | Pappalardo et al. | 712/22 |
| 2008/0007562 | A1 * | 1/2008 | Stuttard et al. | 345/581 |
| 2008/0288952 | A1 * | 11/2008 | Seki et al. | 718/105 |
| 2009/0164752 | A1 * | 6/2009 | McConnell | 712/16 |
| 2009/0216962 | A1 * | 8/2009 | Mutlu et al. | 711/151 |

FOREIGN PATENT DOCUMENTS

| | | |
|---|---|---|
| JP | 10-111858 | 4/1998 |
| JP | 10-304184 | 11/1998 |
| JP | 2005310167 A * | 11/2005 |

OTHER PUBLICATIONS

'A Systolic Design Methodology with Application to Full-Search Block-Matching Architectures' by Yen-Kuang Chen and S.Y. Kung, Journal of VLSI Signal Processing 19, 51-77 (1998).*

'Instruction Systolic Array (ISA)' by H.W. Lang, Sep. 17, 1998, found at http://www.iti.fh-flensburg.de/lang/papers/isa/index.htm.*

'A Real-Time Vision System Using an Integrated Memory Array Processor Prototype' by Yoshihiro Fujita et al., Machine Vision and Applications, 1994.*

'IMAP-VISION: An SIMD Processor With High-Speed On-Chip Memory and Large Capacity External Memory' by Yoshihiro Fujita et al., IAPR Workshop on Machine Vision Applications, Nov. 1996.*

'ILLIAC IV CFD' by Bryan Carpenter, from http://grids.ucs.indiana.edu, Jul. 12, 2002.*

* cited by examiner

SCU SUPPLY DATA OF NEXT 1 LINE TO IN LINE BUFFER

SCU202_0(set_BR_lof4x4_sam)

set_DR_packed_64x1 set_DR_64x1

FIG. 61

| INSTRUCTION TYPE | INSTRUCTION MEAN | INSTRUC-TION (7:0) | opr 0(3:0): | opr 1(7:0): | disp (15:0): |
|---|---|---|---|---|---|
| EXEC | ecec WI_data_op / WO data_op | exec_op | Rn = 0~7 | WI_data_op | — |
| | | exec_op | Rn = 0~7 | WO_data_op | — |
| | ecec WI_data_op / WO data_op | exec_op | Rn = 0~7 | WI_data_op | — |
| | | exec_op | Rn = 0~7 | WO_data_op | — |
| | EXEC AND COMPLETE DMA | exec_op | — | — | — |

FIG. 62

| | | | |
|---|---|---|---|
| branch if ax (Rn) >= disp | br_ax_ge | Rn = 0~7 | -128~+127 | disp (15:0) |
| branch if ay (Rn) >= disp | br_ay_ge | Rn = 0~7 | -128~+127 | disp (15:0) |
| branch if bx (Rn) >= disp | br_bx_ge | Rn = 0~7 | -128~+127 | disp (15:0) |
| branch if by (Rn) >= disp | br_by_ge | Rn = 0~7 | -128~+127 | disp (15:0) |
| branch if cx (Rn) >= disp | br_cx_ge | Rn = 0~7 | -128~+127 | disp (15:0) |
| branch if cy (Rn) >= disp | br_cy_ge | Rn = 0~7 | -128~+127 | disp (15:0) |
| branch if dx (Rn) >= disp | br_dx_ge | Rn = 0~7 | -128~+127 | disp (15:0) |
| branch if dy (Rn) >= disp | br_dy_ge | Rn = 0~7 | -128~+127 | disp (15:0) |
| branch_always | br | - | - | disp (15:0) |
| loopreg (Rn) - = 1<br>branch if loopreg (Rn) <> 0 | loop | Rn = 0~7 | -128~+127 | disp (15:0) |

BRANCH /
LOOP

FIG. 63

| INSTRUCTION TYPE | INSTRUCTION MEAN | INSTRUC-TION (7:0) | opr 0(3:0): | opr 1(7:0): | disp (15:0): |
|---|---|---|---|---|---|
| Set AR/BR/ CR/DR | ax(Rn)=disp | seti_ax | all/Rn=0~7 | – | disp(15:0) |
| | ay(Rn)=disp | seti_ay | all/Rn=0~7 | – | disp(15:0) |
| | aw(Rn)=disp | seti_aw | all/Rn=0~7 | – | disp(15:0) |
| | ah(Rn)=disp | seti_ah | all/Rn=0~7 | – | disp(15:0) |
| | bx(Rn)=disp | seti_bx | all/Rn=0~7 | – | disp(15:0) |
| | by(Rn)=disp | seti_by | all/Rn=0~7 | – | disp(15:0) |
| | NOT DEPENDENT ON bw=disp Rn | seti_bw | – | – | disp(15:0) |
| | NOT DEPENDENT ON bh=disp Rn | seti_bh | – | – | disp(15:0) |
| | cx(Rn)=disp | seti_cx | all/Rn=0~7 | – | disp(15:0) |
| | cy(Rn)=disp | seti_cy | all/Rn=0~7 | – | disp(15:0) |
| | cw(Rn)=disp | seti_cw | all/Rn=0~7 | – | disp(15:0) |
| | ah(Rn)=disp | seti_ch | all/Rn=0~7 | – | disp(15:0) |
| | bx(Rn)=disp | seti_dx | all/Rn=0~7 | – | disp(15:0) |
| | by(Rn)=disp | seti_dy | all/Rn=0~7 | – | disp(15:0) |
| | NOT DEPENDENT ON bw=disp Rn | seti_dw | – | – | disp(15:0) |
| | NOT DEPENDENT ON dh=disp Rn | seti_dh | – | – | disp(15:0) |
| | loopreg (Rn)=disp as_positive | seti_loop | Rn=0~7 | – | disp(15:0) |

| INSTRUCTION TYPE | INSTRUCTION MEAN | INSTRUCTION (7:0) | | | disp (15:0): |
|---|---|---|---|---|---|
| SetWR | ww=disp | seti_ww | – | | disp(15:0) |
| | bp=disp(24bit) | seti_bp | disp(23:0) | | |

| INSTRUCTION TYPE | INSTRUCTION MEAN | INSTRUCTION | | | |
|---|---|---|---|---|---|
| SetDMA | dma_from_reg=disp | setdm_fr | disp(23:0) | | |
| | dma_to_reg=disp | setdm_to | disp(23:0) | | |
| | dma_size_reg=disp | setdm_sz | disp(23:0) | | |

FIG. 64

ADDITION

| | | | |
|---|---|---|---|
| ax(Rn)+=disp(2'sc) | addiax | all/Rn=0~7 | – disp(15:0) |
| ay(Rn)+=disp(2'sc) | addiay | all/Rn=0~7 | – disp(15:0) |
| bx(Rn)+=disp(2'sc) | addibx | all/Rn=0~7 | – disp(15:0) |
| by(Rn)+=disp(2'sc) | addiby | all/Rn=0~7 | – disp(15:0) |
| cx(Rn)+=disp(2'sc) | addicx | all/Rn=0~7 | – disp(15:0) |
| cy(Rn)+=disp(2'sc) | addicy | all/Rn=0~7 | – disp(15:0) |
| dx(Rn)+=disp(2'sc) | addidx | all/Rn=0~7 | – disp(15:0) |
| dy(Rn)+= disp(2'sc) | addidy | all/Rn=0~7 | – disp(15:0) |
| dx(Rn)+=DR_mask_size | addmsdx | all/Rn=0~7 | – – |

SIGNAL PROCESSING APPARATUS WITH SIGNAL CONTROL UNITS AND PROCESSOR UNITS OPERATING BASED ON DIFFERENT THREADS

TECHNICAL FIELD

The present invention relates to a signal processing apparatus.

The present invention particularly relates to a signal processing apparatus suitable for image processing.

BACKGROUND ART

For example, Japanese Patent Publication (A) No. 06-4690 discloses an image processing apparatus for processing image capture information of a moving picture or still picture input from a CCD (Charge Coupled Device) or CMOS (Complementary Metal Oxide Semiconductor) or other image capturing device and displaying or storing the same.

This image processing apparatus achieves a reduction of the processing time by for example processing the pixel data composing the image capture information in parallel.

Further, this image processing apparatus performs read and write processing (memory access) of the pixel data with respect to the memory and processing using the pixel data in synchronization based on the same thread.

DISCLOSURE OF THE INVENTION

Problem to be Solved by the Invention

There is a demand for further improving the processing ability of an image processing apparatus.

The same demand also exists in processing other than image processing.

An object of the present invention is to provide a signal processing apparatus improving the access to a storing means to improve the signal processing ability.

Means for Solving the Invention

According to the present invention, there is provided a signal processing apparatus comprising storage units, an input/output data control unit (SCU) for controlling reading and/or writing of data to/from a predetermined storage unit in at least one of said storage units, and a signal processing unit (PU array or PU_SIMD) for performing predetermined signal processing on the data read out by said input/output data processing unit, wherein said input/output data control unit and said signal processing unit operate based on different threads.

Effect of the Invention

According to the present invention, in the processing accompanied by access to the storing means, by using different threads, a signal processing apparatus able to further raise the image processing ability can be provided.

BRIEF DESCRIPTION OF THE DRAWINGS

FIG. 61 is a diagram for explaining a command "exec" executed by an SCU.

FIG. 62 is a diagram for explaining a command "Branch" executed by an SCU.

FIG. 63 is a diagram for explaining a command "set" executed by an SCU.

FIG. 64 is a diagram for explaining a command "addition" executed by an SCU.

DESCRIPTION OF REFERENCES

100 . . . image processing apparatus, 101 . . . host processor, 102 . . . image processing engine, 103 . . . codec engine, 104 . . . memory I/F, 105 . . . memory system, 106 . . . sensor I/F, 107 . . . camera module, 108 . . . storage medium I/F, 109 . . . storage medium, 110 . . . internal display device I/F, 111 . . . built-in display device, 112 . . . video I/F, 201 . . . control processor, 202_0 to 3 . . . processor unit (PU) array, 203_0 to 3 . . . SCU, 204_0 to 3 . . . local memory, PU . . . processor unit, 401 . . . in line buffer, 403 . . . shared function unit, 404 . . . out line buffer, PE . . . processor element, SR0 to 2 . . . stream register, ALU . . . arithmetic and logic unit

BEST MODE FOR CARRYING OUT THE INVENTION

First Embodiment

Below, embodiments of the signal processing apparatus of the present invention will be explained by illustrating the processing of image data.

First, the correspondence between components of the present embodiment and the components of the present invention will be explained.

Figure 2:
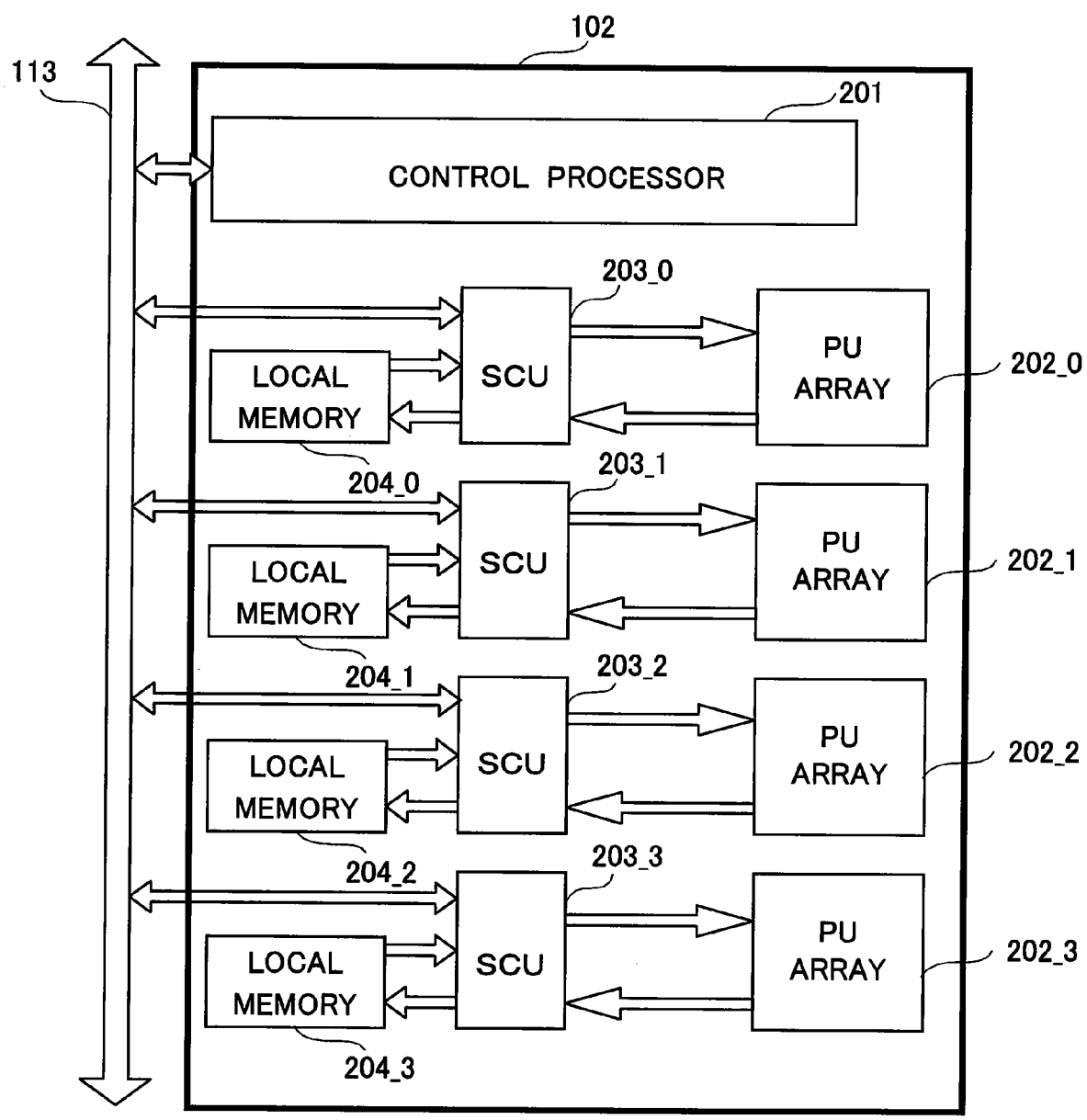
FIG. 2 is a view of the configuration of an image processing engine shown in FIG. 1.

The stream control units (SCU) 203_0 to 203_3 shown in FIG. 2 etc. are examples of an input/output data control unit of the present invention.

Figure 3:
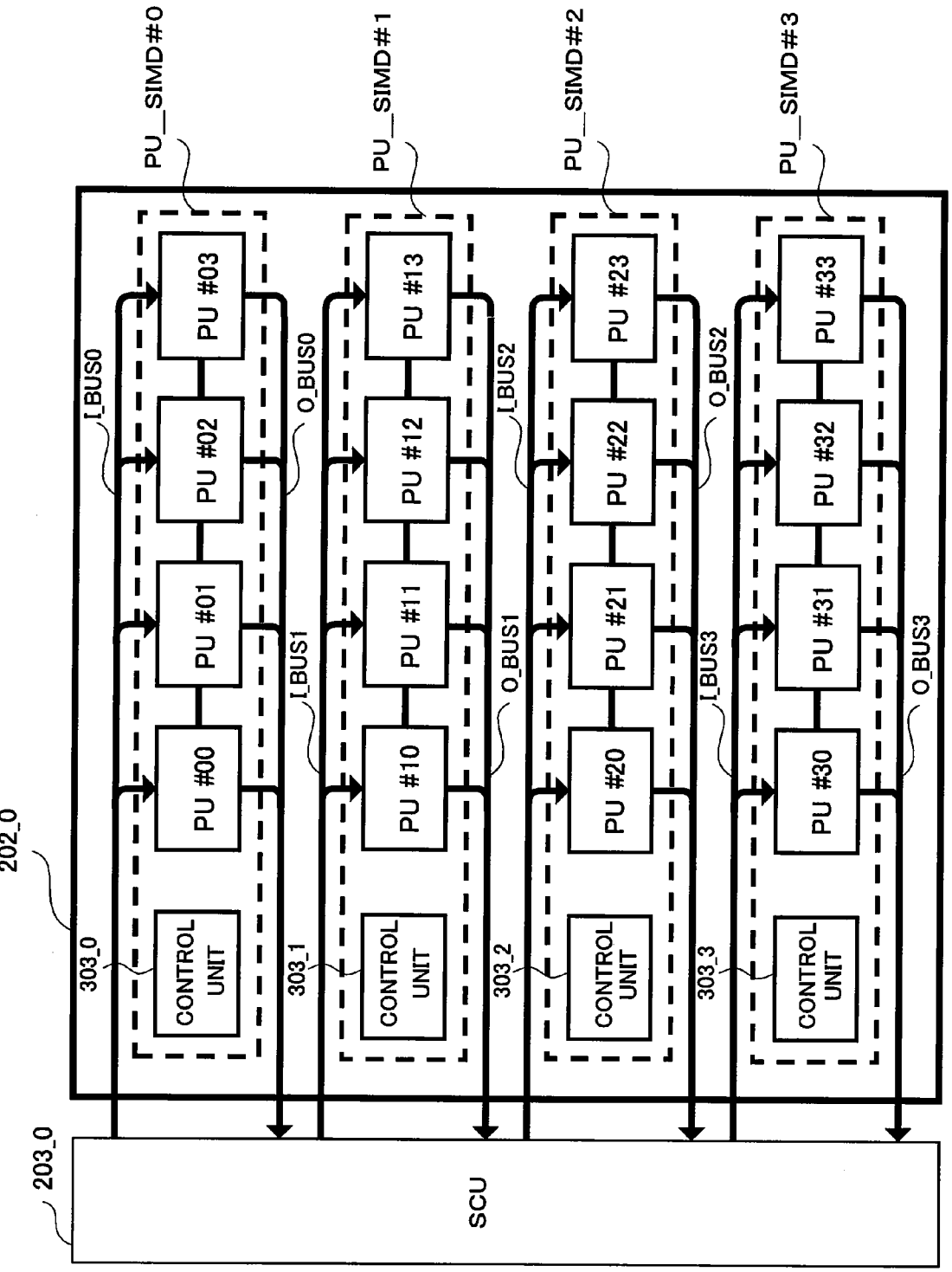
FIG. 3 is a view of the configuration of a processor unit (PU) array shown in FIG. 2.

The processor units PU shown in FIG. 3 etc. are examples of a signal processing circuit of the present invention.

Figure 4:
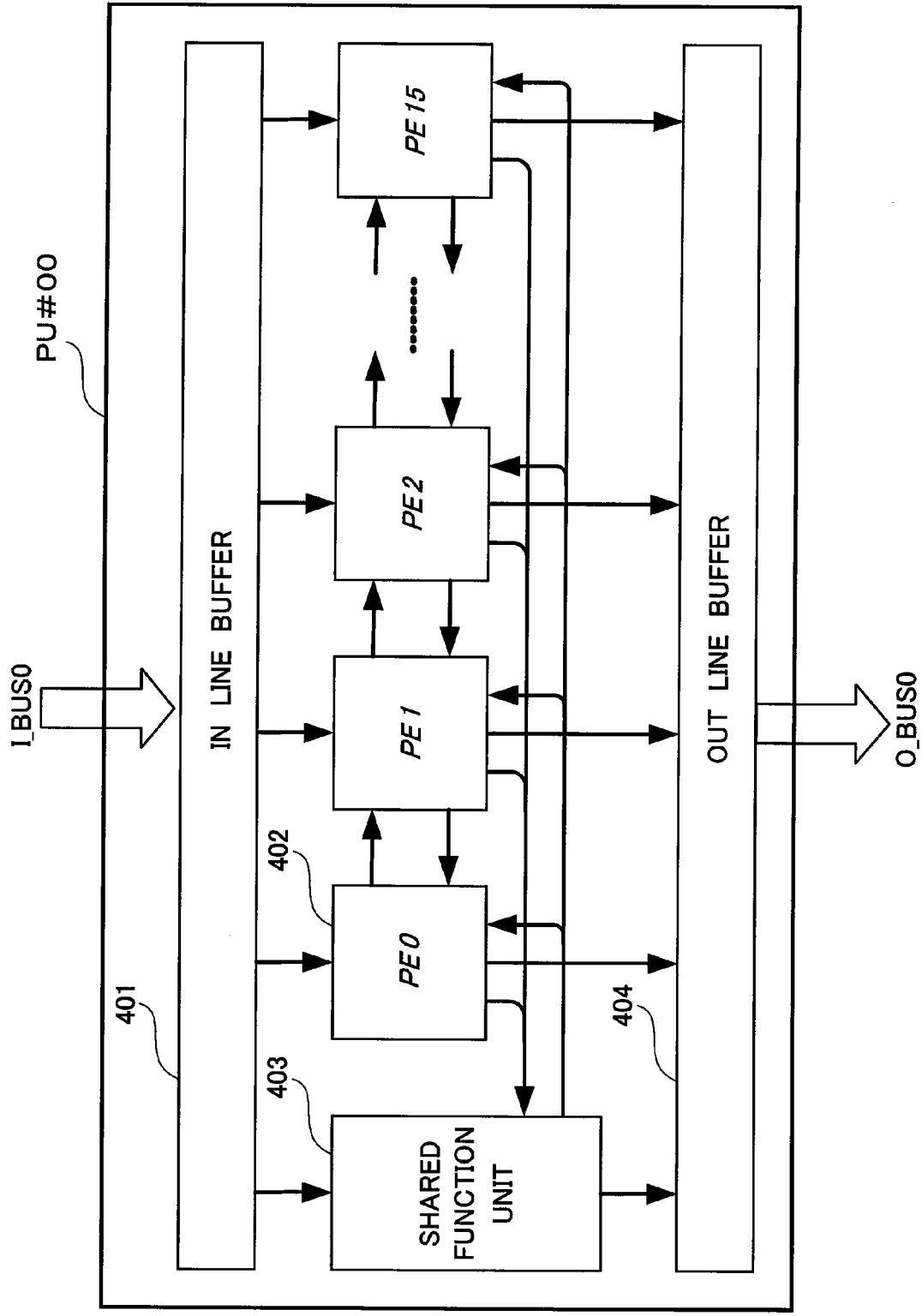
FIG. 4 is a view of the configuration of a PU shown in FIG. 3.

The PEs shown in FIG. 4 etc. are examples of a signal processing element of the present invention.

Figure 1:
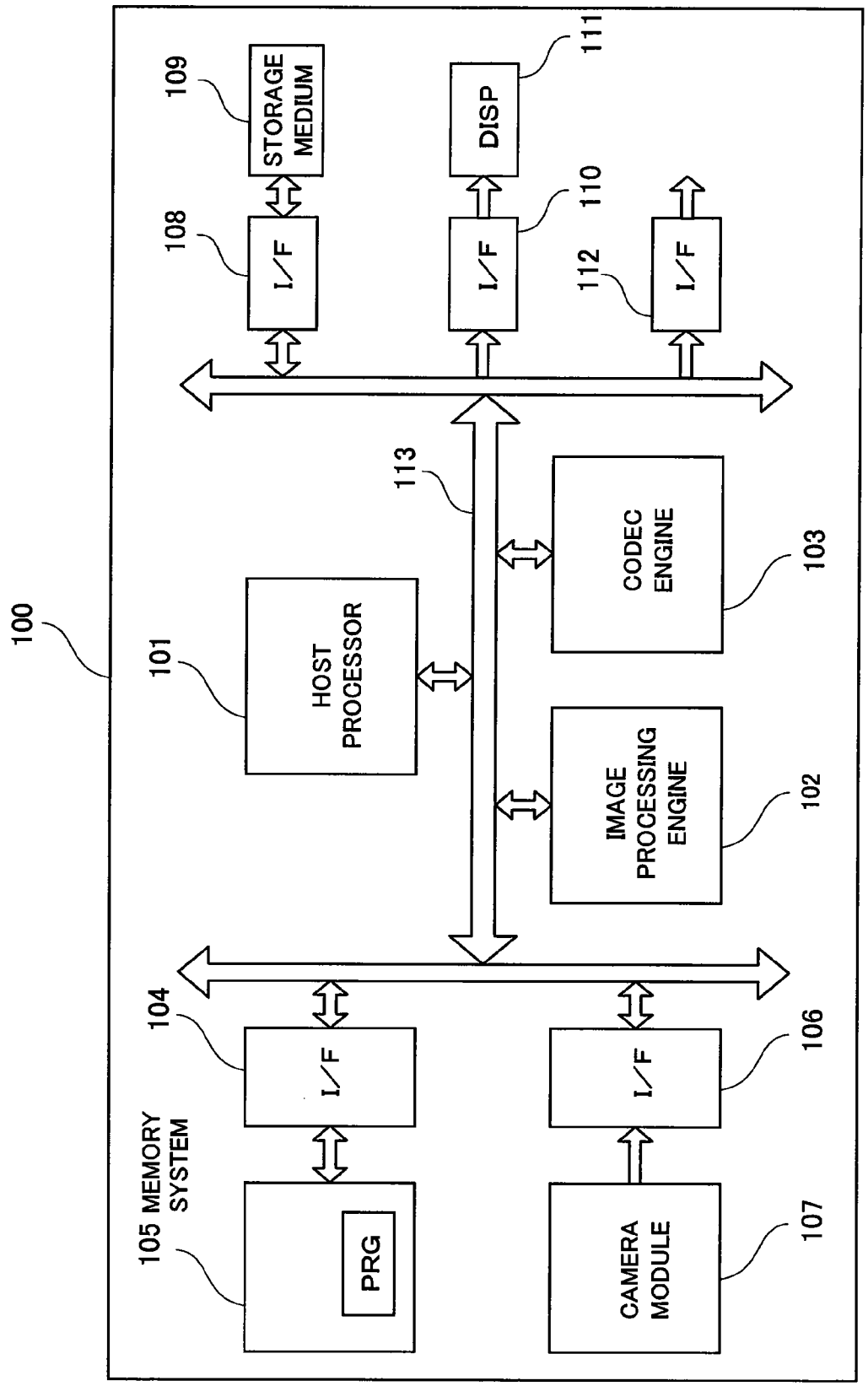
FIG. 1 is an overall configuration diagram of an image processing apparatus according to an embodiment of a signal processing apparatus of the present invention.

The host processor 101 shown in FIG. 1 is an example of a host processing circuit of the present invention.

The memory system 105 shown in FIG. 1 etc. or local memories 204_0 to 204_3 shown in FIG. 2 etc. are examples of a storage unit of the present invention.

As the storage medium of the present invention, any storage medium such as a semiconductor memory, magnetic disc, optical disc, and opto-magnetic disc can be applied.

FIG. 1 is a diagram of the overall configuration of an image processing apparatus 100 according to a first embodiment of a signal processing apparatus of the present invention.

The image processing apparatus 100 has for example a host processor (Host CPU) 101, image processing engine 102, codec engine 103, memory interface (I/F) 104, memory system 105, sensor I/F 106, camera module 107, storage medium I/F 108, storage medium 109, built-in display device I/F 110, built-in display device 111, and video I/F 112.

The image processing apparatus 100 has as its characteristic feature the control of threads of the processing in the image processing engine 102 by the host processor 101.

[Host Processor 101]

The host processor 101 is a processor for controlling the overall image processing apparatus 100. It operates for example a real time operating system (OS) and performs scheduling of various types of tasks to be executed in the image processing apparatus 100, realization of a file system using the storage medium 109, data input/output control, etc.

[Image Processing Engine 102]

The image processing engine 102 is a programmable image processor and executes image processing instructed by the host processor 101 in accordance with an application program executed in the image processing apparatus 100.

The image data for the image processing includes data captured at the camera module 107 input via the sensor I/F 106, data stored in the memory system 105 input via the memory I/F 104, data stored in the storage medium 109 input via the storage medium I/F 108, or data given from the codec engine 103 and data processed at the codec engine 103.

The image processing engine 102 stores its own processing results in the memory system 105 via the memory I/F 104, stores the same via the storage medium I/F 108 in the storage medium 109, outputs them to the codec engine 103, displays the same via the built-in display device I/F 110 in the built-in display device 111, or outputs the same via the video I/F 112 to an external apparatus.

[Codec Engine 103]

The codec engine 103 is a unit for compression/extension of image and/or audio and realizes for example a MPEG (Motion Picture Experts Group)-2, MPEG-4, H.264, and other motion picture image use codecs and the JPEG (Joint Photographic Coding Experts Group), JPEG2000, and other codecs mainly used for still images.

[Memory System 105]

The memory system 105 is a memory for storing data processed at the host processor 101, image processing engine 102, and codec engine 103 and a program PRG executed in the host processor 101, image processing engine 102, and the codec engine 103. For example, a DRAM is used.

The memory I/F 104 is an interface connecting the memory system 105 and a system bus 113.

[Camera Module 107]

The camera module 107 is a device including a lens, aperture, shutter, and other optical devices, a CCD image sensor, CMOS image sensor, or other image capturing device, and a control unit for controlling these.

The camera module 107 converts the captured results to a digital signal, then outputs the same via the sensor I/F 106 to the image processing engine 102 or the memory system 105.

The host processor 101 or the image processing engine 102 outputs a control signal via the sensor I/F 106 to the camera module 107.

[Recording Medium 109]

The storage medium 109 is for example a hard disc, flash memory, or other nonvolatile memory, a DVD (Digital Versatile Disk) or other optical disc, or a tape type storage medium and is read from or written in via the storage medium I/F 108.

[Built-in Display Device 111]

The built-in display device 111 displays the results obtained by processing the image captured by the camera module 107 at the image processing engine 102 or the image data stored in the storage medium 109.

The built-in display device 111 displays an image in accordance with the image data input via the built-in display device I/F 110.

[Video Interface 112]

The video I/F 112 is an interface for supplying image data to an external image display device or image recording device.

[Image Processing Engine 102]

FIG. 2 is a view of the configuration of an image processing engine 102 shown in FIG. 1.

The image processing engine 102 has a control processor (CPU) 201, PU (processor unit) arrays 202_0 to 202_3, stream control units (SCU) 203_0 to 203_3, and local memories 204_0 to 204_3.

In the image processing engine 102, the PEs in the SCUs 203_0 to 203_3 and PU arrays 202_0 to 202_3 operate by different threads.

The control processor 201 is a processor for controlling the entire image processing engine 102 and is responsible for setting and activating the PU arrays 202_0 to 202_3 and SCUs 203_0 to 203_3 and executing the hard-to-make-parallel processing at the SIMD (Single Instruction Multiple Data) type processor arrays constituted by the PU arrays 202.

The PU arrays 202_0 to 202_3 are programmable processors configured by a plurality of SIMD type processor arrays as will be explained later.

The SCUs 203_0 to 203_3 control the data input/output in the case where the data required by the PU arrays 202_0 to 202_3 are read out from the memory system 105 via the internal bus or the case where the results processed by the PU arrays 202_0 to 202_3 are written into the memory system 105 via the internal bus.

The local memories 204_0 to 204_3 are working memories of the image processing engine 102 which hold parts of the image data stored in the memory system 105, store intermediate results processed at the PU arrays 202_0 to 202_3, store programs executed in the PU arrays 202_0 to 202_3, various types of parameters, and so on.

The image processing engine 102 operates for example the PU arrays 202_0 to 202_3 shown in FIG. 2 by a shared thread under the control of the host processor 101.

A "shared thread" means for example that the processing is performed based on a common program.

The SCUs 203_0 to 203_3 are operated under the control of the host processor 101 by a different thread from that for the PU arrays 202_0 to 202_3.

[PU Arrays 202_0 to 202_3]

The PU array 202_0 will be explained.

The PU arrays 202_1 to 202_3 have the same configuration as that of the PU array 202_0.

FIG. 3 is a view of the configuration of the PU array 202_0 shown in FIG. 2.

The PU array 202_0 has four PU_SIMD (Single Instruction Multiple Data) processing circuits #0 to #3.

The PU_SIMD processing circuits #0 to #3 are connected in parallel to the SCU (Stream Control Unit) 203_0.

The PU_SIMD processing circuit #0 has a control unit 303_0 and four processor units PU #00 to #03.

The four processor units PU #00 to #03 configure SIMD type processors operating under the same command.

The four processor units PU #00 to #03 are laterally connected in a one-dimensional state.

By limiting the connection among the processor units PU #00 to #03 to adjacent processor units and, at the same time, having the I_BUS0 used for the data supply from the SCU 203_0 shared by four processor units, the interconnects can be reduced and, at the same time, the bus control can be simplified.

By serially connecting the processor units PU #00 to #03, in image processing frequently using the adjacent pixel data, the pixel data can be directly output to the adjacent processor unit without going through the SCU 203_0, so the processing time can be shortened.

The PU_SIMD processing circuits #1 to #3 have the same configuration as that of the PU_SIMD processing circuit #0.

[Processor Unit PU#00]

FIG. 4 is a view of the configuration of the processor unit PU#00 shown in FIG. 3.

The processor unit PU#00 has for example an in line buffer 401, a plurality of processor elements PE0 to PE15, a shared function unit 403 shared among the PEs, and an out line buffer 404.

The in line buffer 401 shown in FIG. 4 is connected to the input data bus I_BUS0 shown in FIG. 3.

The out line buffer 404 is connected to the output data bus O_BUS0 indicated by 34.

The shared function unit 403 and the PE0 to PE15 are connected in parallel between the in line buffer 401 and the out line buffer 404.

The PE0 to PE15 are connected with the PEs adjacent at the left and right in the figure and can transfer data with the adjacent PEs.

In the example shown in FIG. 3 and FIG. 4, each processor unit PU has 16 processor elements PE, while each PU_SIMD processing circuit has four processor units PU, therefore each of the PU arrays 202_0 to 202_3 is configured by 64 PEs in total.

As shown in FIG. 3, the processor units PU are connected the same as the processor elements PE in FIG. 4. Namely, the PE15 on the right end in a certain processor unit PU is connected to the PE0 on the left end in the processor unit on the right side thereof.

Specifically, the PE15 shown in FIG. 4 of the processor unit PU#01 shown in FIG. 3 is connected to the PE0 shown in FIG. 4 of the processor unit PU#02 shown in FIG. 3.

As shown in FIG. 4, by configuring the system so that the processor elements PE0 to PE15 can directly input/output data only with the two adjacent PEs, the interconnect structure can be greatly simplified. Further, by inputting/outputting and sharing the pixel data between adjacent PEs among the PE0 to PE15, the number of times of access to the storage region can be decreased.

The data input from the SCU (Stream Control Unit) 203_0 via the input data bus I_BUS0 to the processor unit PU#00 is written into the in line buffer 401 in the PU#00.

Each of the processor elements PE0 to PE15 performs the processing by using the data read out from the in line buffer 401 and writes the processing results into the out line buffer 404.

The SCU 203_0 reads out the processing results from the out line buffer 404.

As shown in FIG. 3, the PU array 202_0 can operate four PU_SIMD processing circuits #0 to #3 independently in parallel or serially. The operation control is realized by the SCU 203_0 switching the input data buses I_BUS0 to I_BUS3 and output data buses O_BUS0 to O_BUS3.

The control unit 303_0 shown in FIG. 3 has a not shown command storage use memory and outputs control signals obtained by decoding the commands read out from the command storage use memory to all PEs in the PU_SIMD #0.

The control unit 303_0 includes a program flow control use loop register not shown here and a pointer register for accessing the stream register in a PE explained later.

The loop register is a register for controlling the number of loops in a program and can be set by the control processor 201 or can be set by a command at the time of the execution of the program.

When the loop register is set by a command, a register value in a PE can be designated as a source operand. At that time, among a plurality of PEs, use is made of the register value of the previously determined PE, for example, the PE on the left end in the figure, for example, the PE0 of the processor unit PU#00.

For the pointer register as well, a register value in a PE can be designated as the source operand. Use is made of the register value of a specific PE in the same way as the case of the loop register.

The same is true for the control units 303_1 to 303_3.

A case of storing a still image captured by using the camera module 107 will be taken as an example to explain the processing routine and processing distribution in the image processing apparatus 100.

The data captured by the image capturing device in the camera module 107 is read out via the sensor I/F 106 for each horizontal scan line, output to the image processing engine 102, and stored in the memory system 105. At this time, the image processing engine 102 executes part of the wave detection processing.

When one frame's worth of the data is stored in the memory system 105, the image processing engine 102 executes the remaining wave detection processing and various types of camera signal processing and various types of image processing while reading the required rectangular image region in one frame's worth of image data in order to make the internal PU_SIMD processing circuits operate in parallel efficiently.

The processing results of the image processing engine 102 are stored in the memory system 105.

The image processing engine 102 also converts the resolution. The image data converted in resolution is displayed via the built-in display device I/F 110 in the built-in display device 111.

The codec engine 103 performs image compression by using the image data of a plurality of frames processed by the image processing engine 102 stored in the memory system 105. The compressed image data is stored via the storage medium I/F 108 in the storage medium 109.

The image processing engine 102 is configured by a plurality of PU arrays 202_0 to 202_3. The PU arrays 202_0 to 202_3 process different regions in a frame.

Figure 5:
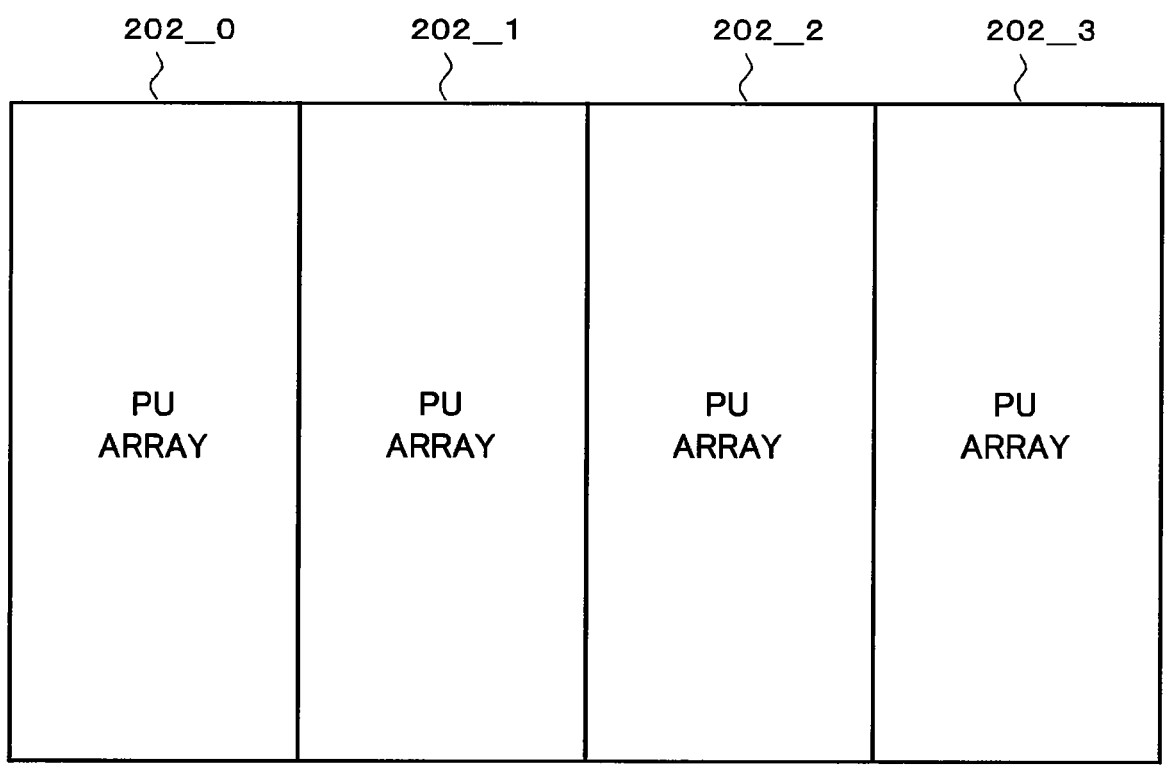
FIG. 5 is a diagram for explaining image regions assigned to PU arrays.

When the image processing engine is configured by four PU arrays 202_0 to 202_3 as in the present embodiment, for example as shown in FIG. 5, regions can be assigned to the PU arrays 202_0 to 202_3.

Figure 6:
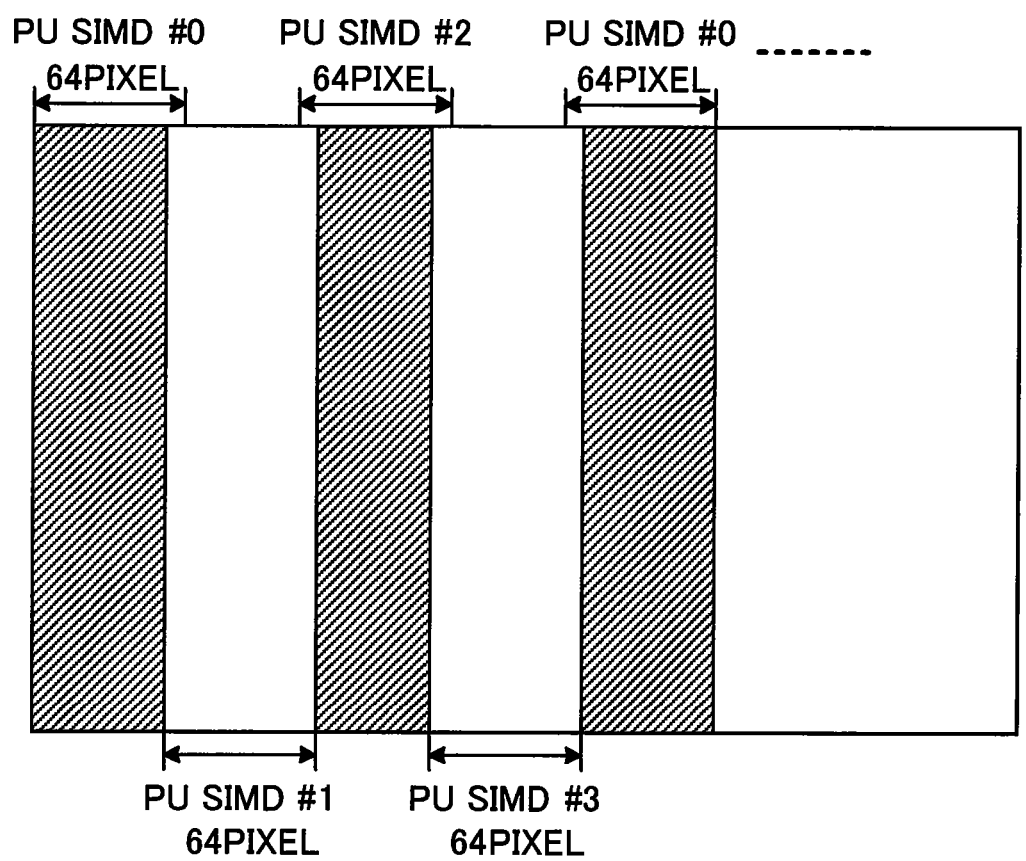
FIG. 6 is a diagram for explaining pixel data assigning processing to a plurality of processor elements (PE).

Each of the PU arrays 202_0 to 202_3 has a plurality of PU_SIMD processing circuits configured by 64 PEs as explained before. For example, as shown in FIG. 6, a region assigned to each of the PU arrays 202_0 to 202_3 is further divided into rectangular image regions each having a lateral 64-pixel width. Each pixel can be assigned to one PE.

Figure 7:
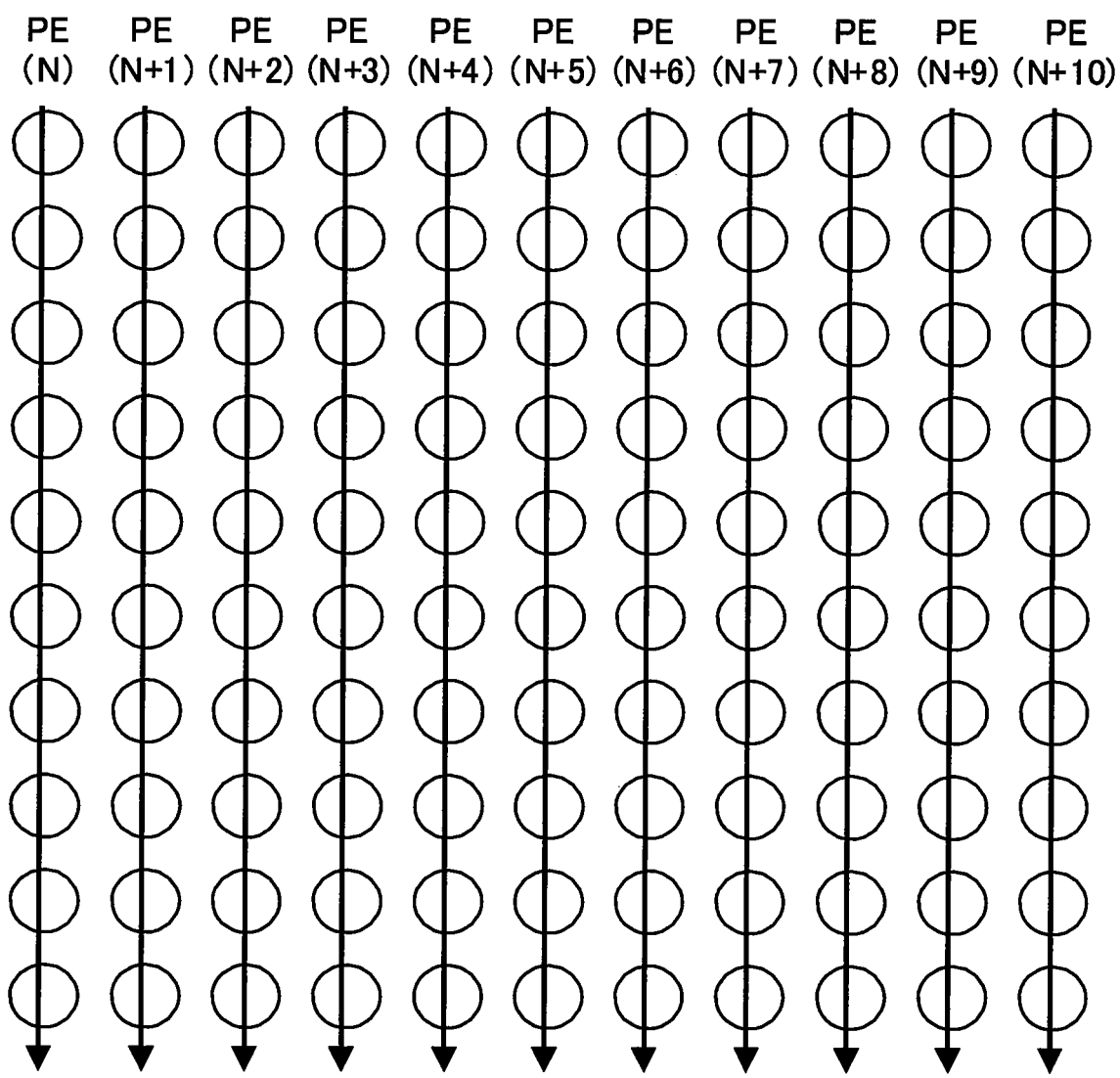
FIG. 7 is a first partial diagram for explaining the assignment of a plurality of PEs in filtering.

At this time, each PE sequentially processes a pixel train in a vertical direction assigned to itself as shown in FIG. 7.

Figure 8:
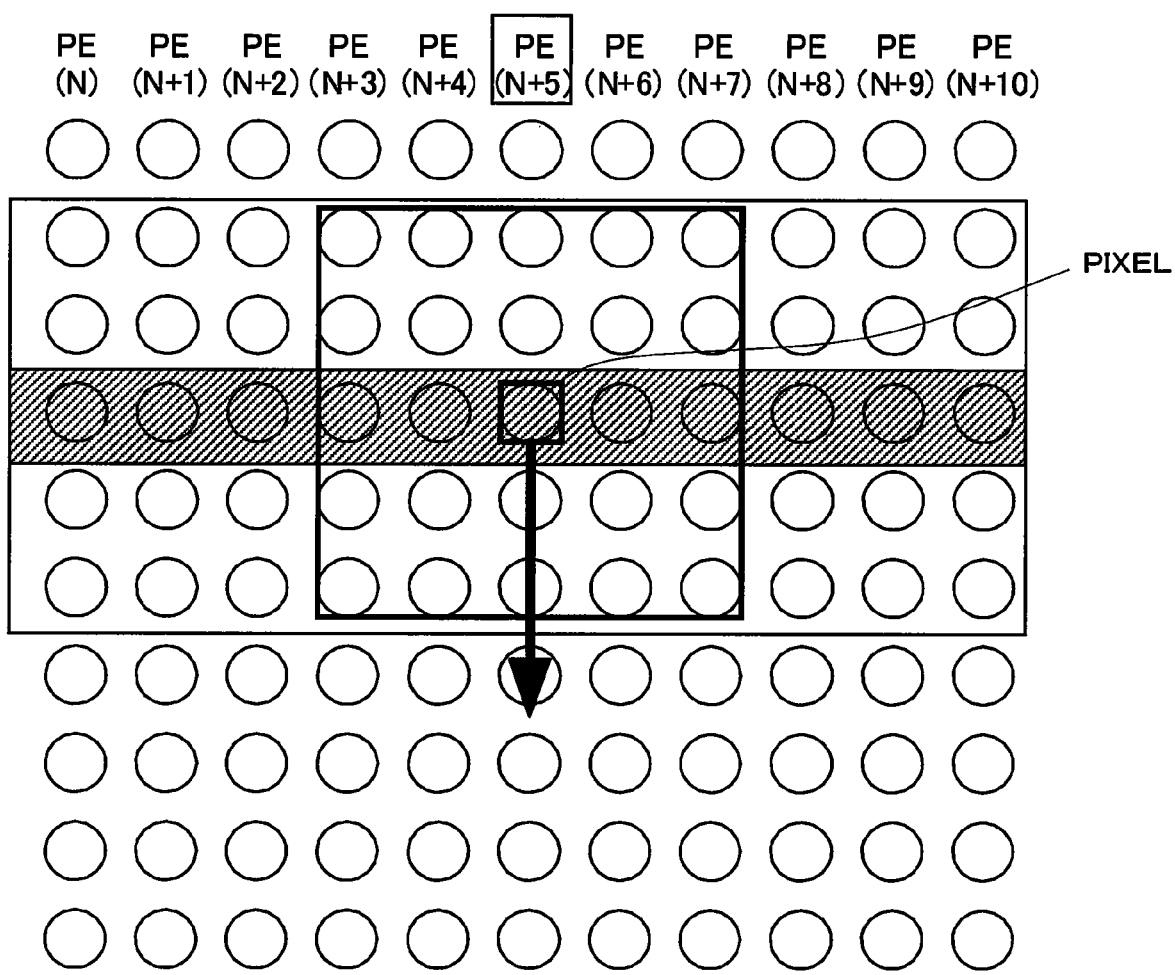
FIG. 8 is a second partial diagram for explaining the assignment of a plurality of PEs in filtering.

For example, consider a case where the PU array 202_0 performs filtering of 5x5 pixels as shown in FIG. 8.

At this time, each PE in the PU array 202_0, as shown in FIG. 8, perform the filtering of pixel data at a pixel position Pixel to be processed by using the pixel data at a 5x5 pixel position centered around the pixel position Pixel.

Each PE in the PU array 202_0 sequentially moves the pixel position to be processed as indicated by an arrow shown in FIG. 8 (downward direction in the figure).

Figure 9:
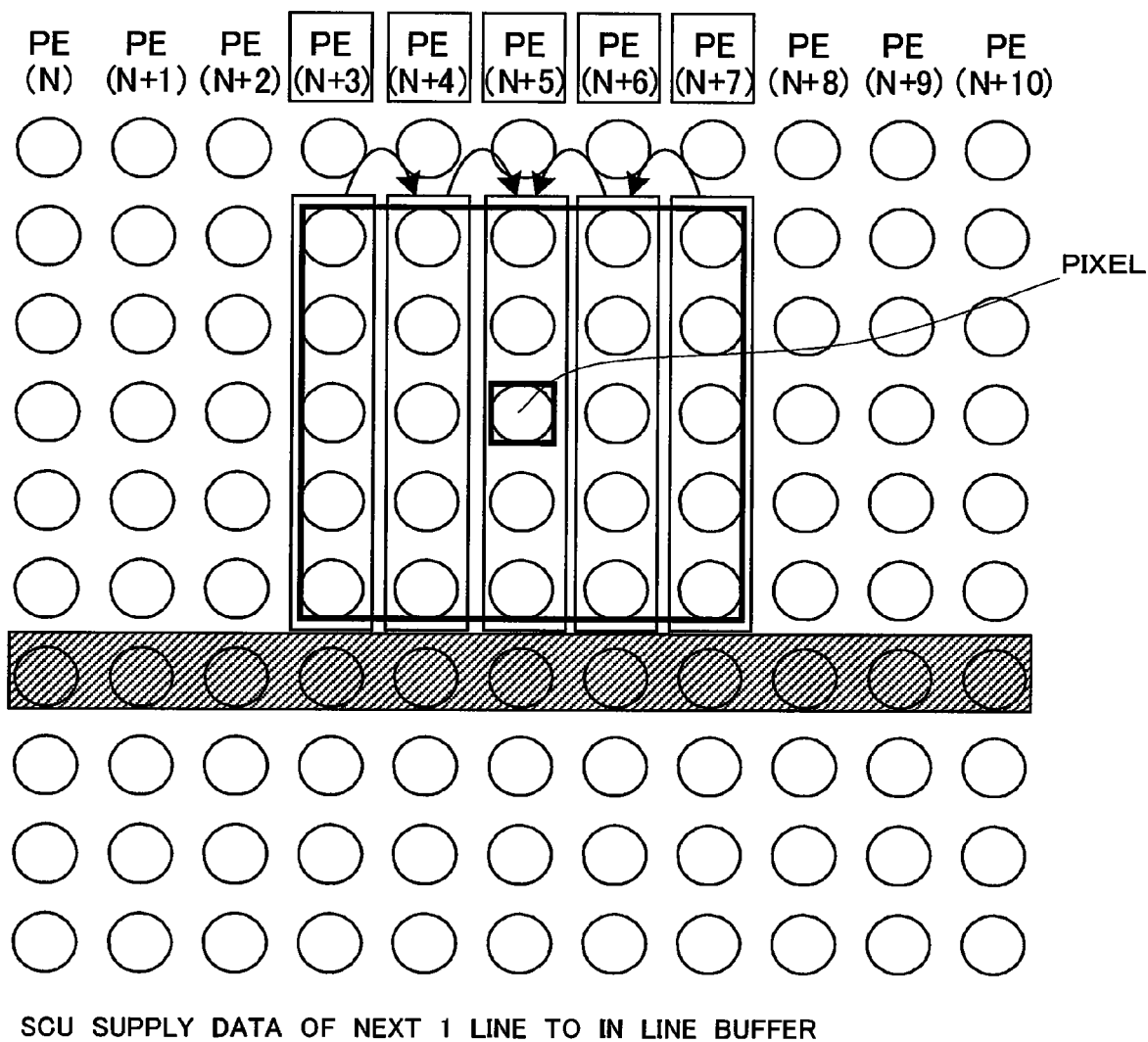
FIG. 9 is a third partial diagram for explaining the assignment of a plurality of PEs in filtering.

When each PE in the PU array 202_0 ends the filtering of 5x5 pixels described above at the pixel position Pixel, the SCU 203_0, as shown in FIG. 9, reads out the next one line's worth of pixel data at the pixel position from the local memory 204_0 or memory system 105 and writes it into the in line buffer 401 of the processor unit PU in the PU array 202_0 shown in FIG. 4.

Figure 10:
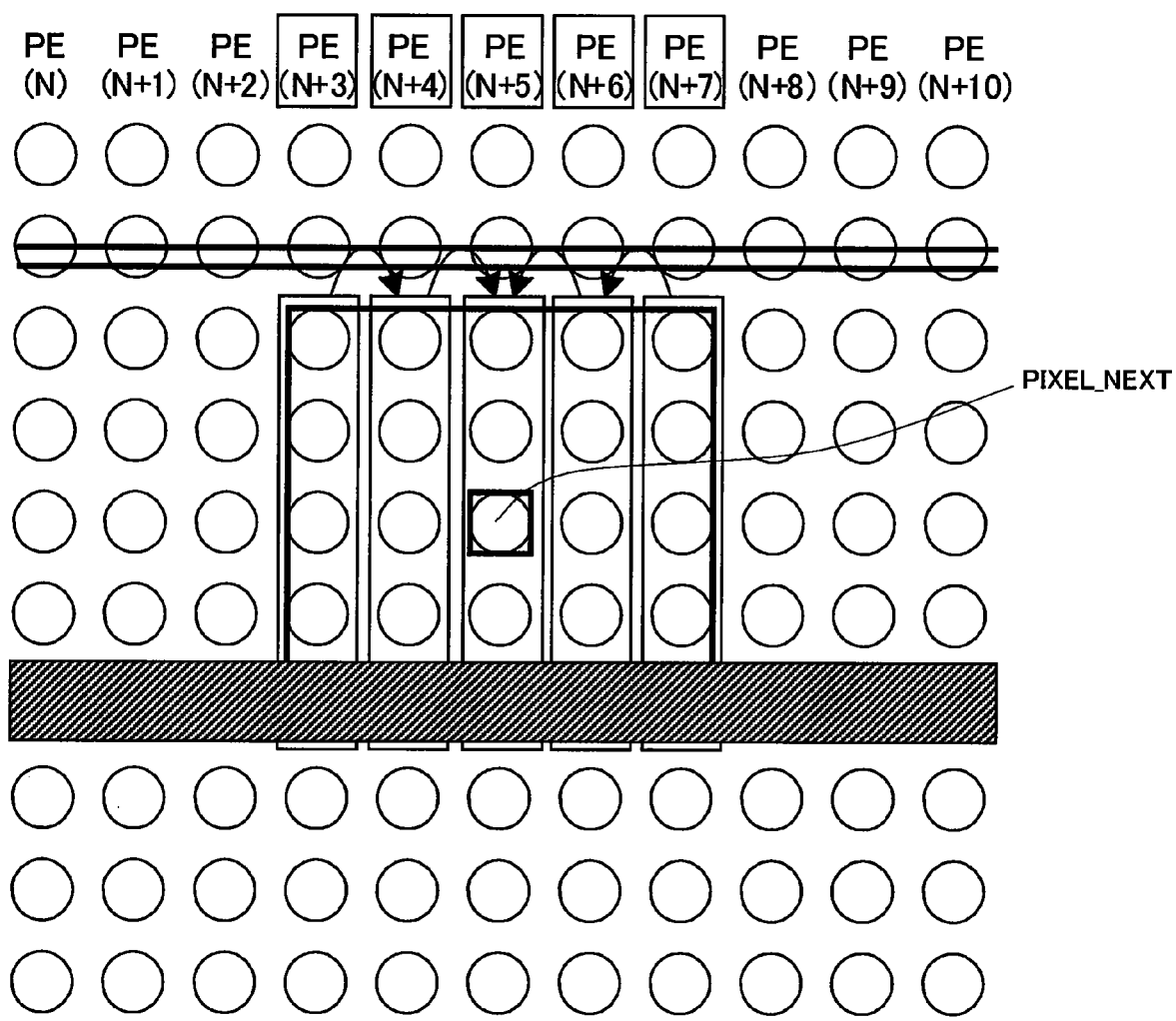
FIG. 10 is a fourth partial diagram for explaining the assignment of a plurality of PEs in filtering.

Then, each PU in the PU array 202_0 performs the filtering of 5x5 pixels of the pixel data at the next pixel position Pixel_next as shown in FIG. 10.

The explanation was given centering on the PU_SIMD #0 shown in FIG. 3, but the PU_SIMD #1 to #3 are the same as PU_SIMD #0.

The PU arrays 202_1 to 202_3 are the same as the PU array 202_0.

[Processor Element PE]

PEn (n=1 to 14) shown in FIG. 4 will be explained.

Note that PE0 is the same as PEn except for the point that it inputs/outputs data only with the PE1 among the PEs, and the PE15 is the same except that it inputs/outputs data only with the PE14.

Figure 11:
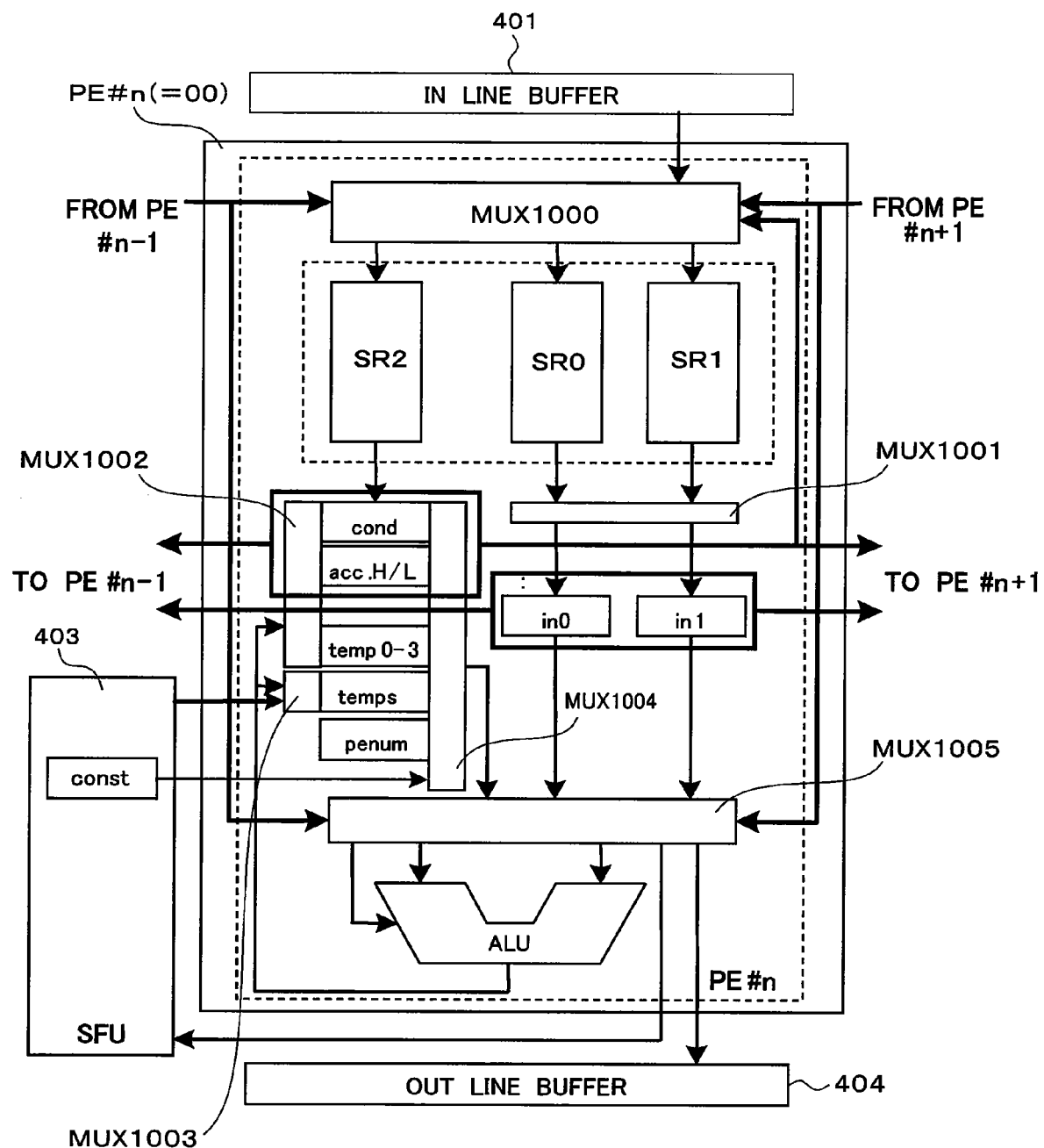
FIG. 11 is a view of the configuration of the PE shown in FIG. 4.
Figure 14:
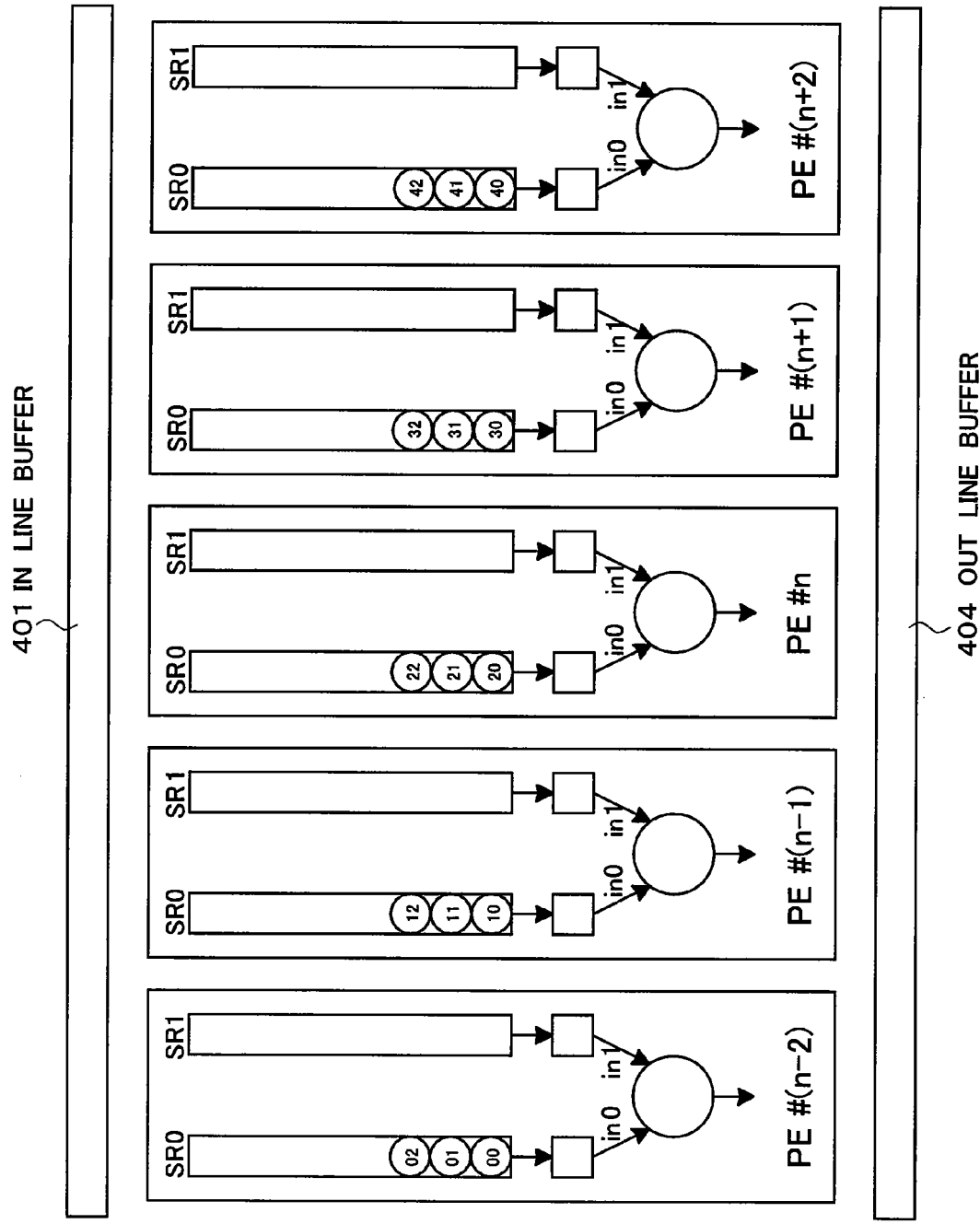
FIG. 14 is a first partial diagram for explaining an operation of a stream register of each PE in the filtering shown in FIG. 13.

FIG. 11 is a view of the configuration of a PEn shown in FIG. 14.

The PEn has multiplexers MUX 1000 to 1005, stream registers SR0, SR1, and SR2, registers in0 and in1, and other various types of registers, and an arithmetic and logical unit ALU.

The PEn transfers the data or control flags from the in line buffer 401 to the stream registers SR0, SR1, and SR2 and fetches the data or control flags from the stream registers SR0, SR1, and SR2 to part of the group of arithmetic and logical unit use registers.

The arithmetic and logical unit ALU performs processing while using the arithmetic and logical unit use register group as a temporary storage destination and writes the processing results into the out line buffer 404. This series of operations is carried out by the simultaneous or sequential execution of commands with individually determined contents.

As the in line buffer 401, there are data use and control flag use buffers. Each is comprised of 16 bits and 4 bits per PE.

Also as the out line buffer 404, in the same way as the in line buffer 401, there are data use and control flag use buffers. Each is comprised of 16 bits and 4 bits per PE.

The number of entries of each of the stream registers SR0, SR1, and SR2 is 16.

The data length of each of the stream registers SR0 and SR1 is 16 bits, while the data length of the stream register SR2 is 4 bits.

Here, the reason why the stream register SR2 has made 4 bits is that the stream register SR2 is mainly used for the storage of the control flags. This is the same as the data length of the cond register of the arithmetic and logical unit use register group.

The stream registers SR0, SR1, and SR2 are used when storing the data supplied mainly from the SCU 203_0 through the in line buffer 401 and required for the processing and for temporary backup of the processing results and may be accessed directly and accessed by a pointer.

Note that a maximum of four pointers can be defined for each stream registers SR0, SR1, and SR2. Each pointer has three values of a "Start value" indicating a start point of the pointer definition region, an "End value" indicating an end point of the pointer definition region, and a "Current value" indicating the current pointer position.

For the operation of the pointer, there are commands for realizing pointer operations as shown in the following (1) to (5).

(1) A command for rewriting one value selected from among three values held by one pointer selected from among four pointers explained before by an immediate value.

(2) A command for rewriting one value selected from among three values held by one pointer selected from among four pointers explained before by any one value of the temporary backup use registers temp0 to temp3 and temps in the PE0. Note, a predetermined latency is applied for the reflection of the designated value.

(3) A command for rewriting the Current value held by one pointer selected from among four pointers explained before by adding a positive/negative immediate value.

(4) A command for rewriting the Current value held by one pointer selected from among four pointers explained before to the Start value of the same pointer.

(5) A command for reading one value selected from among three values held by one pointer selected from among four pointers explained before, and rewriting any one of the temporary backup use register temp0 to temp3 and temps in all PEs in the PU_SIMD by that value.

The stream registers SR0, SR1, and SR2 according to the configuration as described above use for example two types of pointers, define the first pointer as (WRite) pointer and the second pointer as read pointer, repeatedly write the data and increment the write pointer, and repeatedly read the data of the written entry and increment the read pointer. Therefore, the stream registers can be used as FIFO (First-In First-Out) registers.

The number of entries of the stream registers SR0, SR1, and SR2 is 16. Among the three stream registers, the stream registers SR0 and SR1 may be connected and used as a stream register for 32 entries, but since this operates as a stream register SR0 of 32 entries at the time of the linkage mode, only the pointers of the stream register SR0 can be used. The stream register SR1 cannot be accessed.

The normal mode and the linkage mode are set by a predetermined method before the execution of all commands and cannot be changed during the sequential execution of commands.

When the stream registers SR0, SR1, and SR2 are accessed and the pointer operation are carried out, the region defined by [Start, End] or the region of [0, EN−1] is sometimes exceeded. Here, EN is the number of entries of the stream registers SR0, SR1, and SR2 (16 at the time of the normal mode and 32 at the time of the linkage mode). In this case, the following wraparound processing is carried out so that it becomes an entry with a value of the pointers.

The indexes before and after the wraparound processing to the entries of the stream registers SR0, SR1, and SR2 will be defined as idx and idxw. Note that one of two types of wraparound processing is designated by addition to the stream register access command.

Case where the wraparound processing is carried out in the region defined by [Start, End]

```
if(idx>End)idxw =Start+(idx−End−1)%(End−Start+1);
   else if (idx<Start)idxw =End−(Start−idx−1)%(End−Start+1);
   else idxw =idx;
```

Case where the wraparound processing is carried out in the region defined by [0, EN−1]

```
if(idx≧EN) idxw =idx%EN;
   else if (idx≦0)idxw =(EN×(1−idx/EN)+idx)%EN;
   else idxw =idx;
```

A register belonging to the arithmetic and logical unit use register group is a register which can be designated as the source operand or the destination operand of the processing performed in the PE0. The registers in0, in1, temp0 to temp3, temps, acc.H/L, cond, penum, and const of FIG. 11 correspond to those.

The registers in0 and in1 are input registers each having a data length of 16 bits and store the contents read out form the stream registers. Each can be designated as the source operand of an arithmetic and logical processing command, but cannot be designated to a destination operand.

The registers temp0 to temp3 and temps are temporary backup use registers each having a data length of 16 bits.

Among these, the register temps is a register used when utilizing the shared function unit 403 explained later. In a case other than access to the shared function unit 403, this can be used as a working register in exactly the same way as registers temp0 to temp3. The register can be designated as both of a source operand and a destination operand of the arithmetic and logical processing command.

The register acc.H/L is an accumulation register mainly used by an accumulation command and has a data length of 32 bits in total. It can be designated as both of a source operand and a destination operand of an arithmetic and logical processing command. Among the 32 bits, the higher 16 bits are defined as the register acc.H, and lower 16 bits are defined as the register acc.L. The higher or lower bits are designated when this is used as a source operand.

The register cond is a condition register having a data length of 4 bits used mainly for conditional execution. This can be designated as the destination operand of arithmetic and logical processing. At that time, any 1 bit among the processing results, selection of either of a carry flag indicating that a carry stands or a zero flag indicating that the processing result is 0 as a result of processing in the arithmetic and logical unit ALU, and which bit in the condition register it is reflected at are designated.

The register penum is a processor number register having a data length of 6 bits storing processing element numbers (0 to 63) of itself and is dedicated to reading.

The register const is a constant register having a data length of 16 bits for storing the constant values and has 64 entries. The constant register is not provided for each processing element, but is provided in the shared function unit 403.

One entry is designated and used in common for all PEs in the PU_SIMD processing circuit, but this can be directly designated as the source operand of the arithmetic and logical processing, therefore is included in the arithmetic and logical unit use register group.

In the arithmetic and logical unit use register group, a register which can be accessed from the adjacent PE is prepared. Attention will be paid to an n-th PE#n in the PU_SIMD processing circuit.

In this case, the PE#n can access not only the registers in the PE#n, but also registers in0, in1, acc.H, and acc.L of the adjacent PEs #n−1 and #n+1 when performing the processing.

The values of the registers cond, acc.H, and acc.L of PE#n and registers in0, in1, acc.H, and acc.L of the adjacent PEs #n−1 and #n+1 can be written back into stream registers SR0, SR1, and SR2 of the PE#n.

In PE#n, in order to raise the processing efficiency in the arithmetic and logical unit ALU, the processing in the arithmetic and logical unit ALU and the loading into a plurality of registers or storage can be simultaneously executed.

The operations which can be simultaneously executed are the following A to J. Note that, for A to I, conditional execution of the command is possible. The "conditional execution of a command" means mainly an operation designating any bit of the register cond in which the control flag is stored, executing a command when the value is 1, and not executing the command when the value thereof is 0.

A: Writing into stream register SR0
B: Writing into stream register SR1
C: Writing into stream register SR2
D: Writing into register in0

E: Writing into register in1
F: Writing from stream register SR2 into register cond
G: Calling up function at shared function unit 403
H: Writing into out line buffer 404
I: Arithmetic logical processing
J: Flow control command The arithmetic and logical processing which can be executed at the arithmetic and logical unit ALU in the PE#n is shown in the following Table 1. The reciprocal is realized by using a LookUp Table function of the shared function unit 403 explained later.

In Table 1, a "bit number command" means a command for returning a bit number in which 1 appears first when counting from the uppermost bit of 16 bits of the source.

TABLE 1

| Type of command | Destination operand | Source operand |
| --- | --- | --- |
| 16-bit add/subtract command | 16 bits | 16 bits |
| 32-bit add/subtract command | 32 bits | 32 bits |
| Multiplication command | 16 or 32 bits | 16 bits |
| Accumulation command | 16 or 32 bits | 16 bits |
| Absolute value command | 16 bits | 16 bits |
| Clear command | 1 or 16 or 32 bits | |
| Maximum/minimum value command | 16 bits | 16 bits |
| 3 term processing command | 16 bits | 16 bits |
| Copy command | 16 bits | 16 bits |
| Logical processing command | 16 bits | 16 bits |
| 16-bit shift command | 16 bits | 16 bits |
| 32-bit shift command | 32 bits | 32 bits |
| Comparison processing command | 16 bits | 16 bits |
| Bit number command | 16 bits | 16 bits |

Below, an explanation will be given of an example of operations of the processor units PU and PE by taking as an example the filtering of 5x3 pixel data by paying attention to the stream registers SR0 and SR1 shown in FIG. 11.

Figure 12:
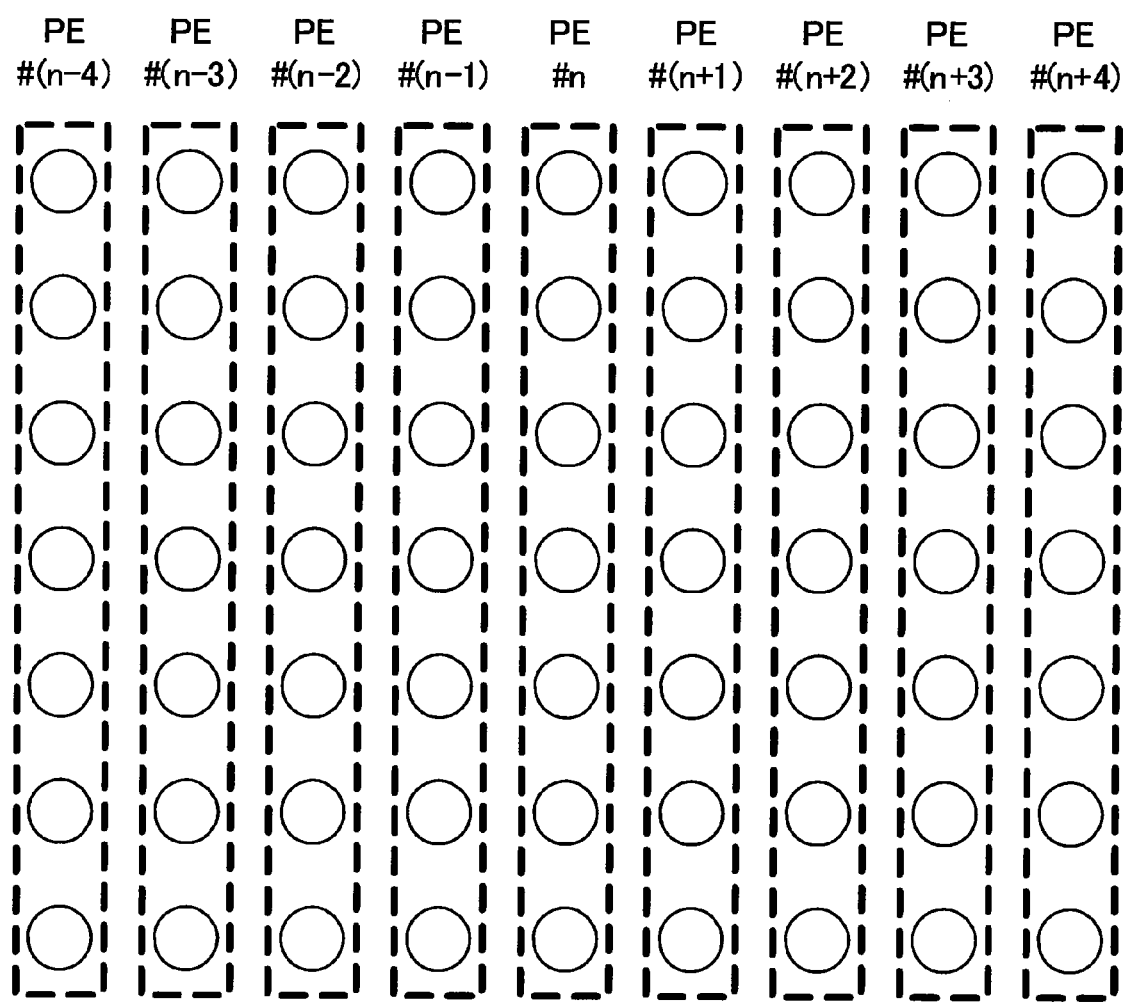
FIG. 12 is a first partial diagram for explaining the filtering performed in a plurality of PEs.

As shown in FIG. 12, each PE takes charge of the vertical pixel data train and writes back the result after weighted addition to the pixel data in the vicinity to the local memory 204 or the memory system 105.

Figure 13:
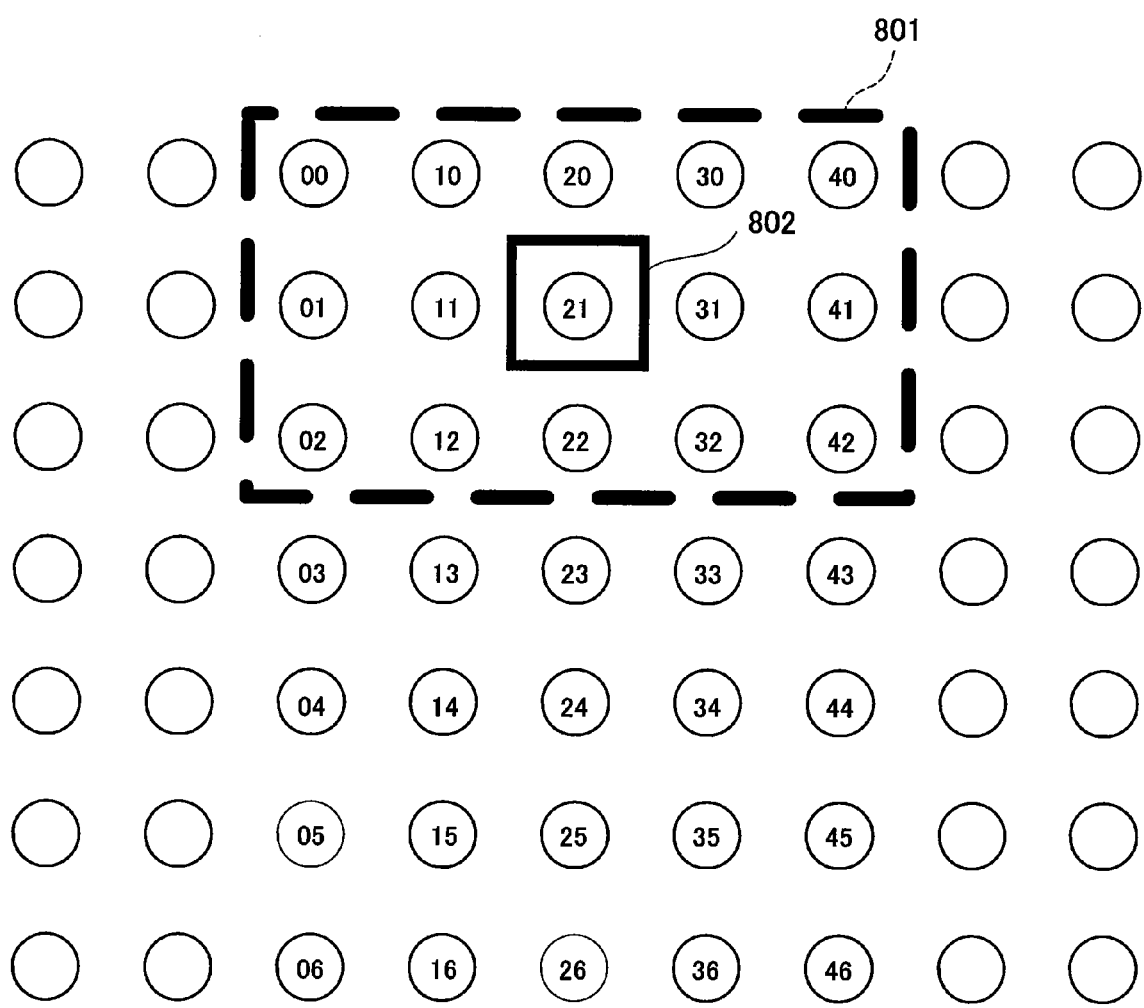
FIG. 13 is a second partial diagram for explaining the filtering performed in a plurality of PEs.

For example, when performing filtering of 5x3, as shown in FIG. 13, weighted addition is carried out with respect to the 15 pixel data of the pixel data 00, 01, 02, 10, 11, 12, 20, 21, 22, 30, 31, 32, 40, 41, and 42 existing in the region of 801 to calculate the pixel data at the position of 802.

Below, an explanation will be given of how the data is transferred between adjacent PEs using the drawings. The drawings used in the following description are schematically shown in order to focus on the transfer of the data.

When the PE in charge of the vertical pixel data train including the pixel data at the position of 802 shown in FIG. 13 is PE#n, as shown in FIG. 14, the three vertical pixel data of the pixel data 20, 21, and 22 are held in the stream register SR0 of PE#n, the pixel data 10, 11, and 12 are held in the adjacent processor element PE#(n−1), and the pixel data 00, 01, and 02 are held in the further adjacent stream register SR0 processor element PE#(n−2).

In the same way, the pixel data 30, 31, and 32 are held in the stream register SR0 of the PE#(n−1), and the pixel data 40, 41, and 42 are held in the stream register SR0 of the PE#(n+2).

In the present embodiment, four pointers at the maximum can be defined for each stream register. Note the same is true for all PEs in the PU_SIMD processing circuits #0 to #3 and included in the control unit 303_0. In the following example, each of the stream registers SR0 and SR1 defines one pointer as the read pointer, defines one pointer as the write pointer, and utilizes the stream register as an FIFO. The figure is schematically shown so that the position of the read pointer becomes the lowermost stage.

In the present embodiment, the data can be loaded in the register in0 from both of the stream registers SR0 and SR1. In the same way, the data can be loaded in the register in1 from both of the stream registers SR0 and SR1. On the other hand, the data from registers in0, in1, and acc.H/L of the adjacent PE can be written in the stream registers SR0, SR1, and SR2, but the data from the register in0 can be written into only the stream register SR0, and data from the register in1 can be written into only the stream register SR1. However, although the circuit scale increases, writing from both is enabled.

Figure 15:
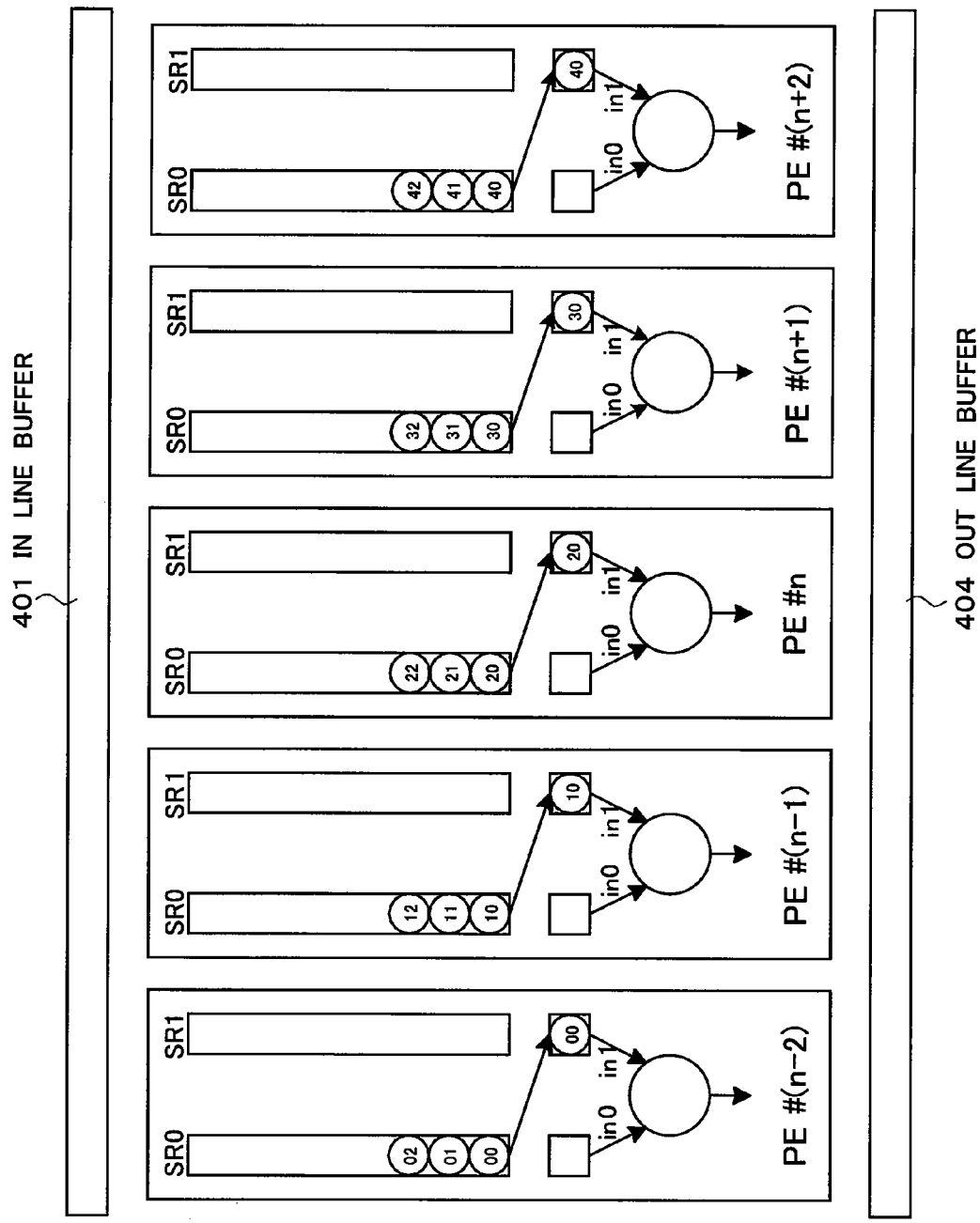
FIG. 15 is a second partial diagram for explaining the operation of a stream register of each PE in the filtering shown in FIG. 13.

In a first cycle, as shown in FIG. 15, the pixel data existing at the Current value of the read pointer in the stream register SR0 is written into the register in1. Namely, in the case of the PE#n, the pixel data 20 is written into the register in1. The arithmetic and logical unit ALU reads out the pixel data value written in the register in1 as the source operand and multiplies it with the coefficient. The coefficient required for the processing is stored in the constant register constituted by the register const.

Figure 16:
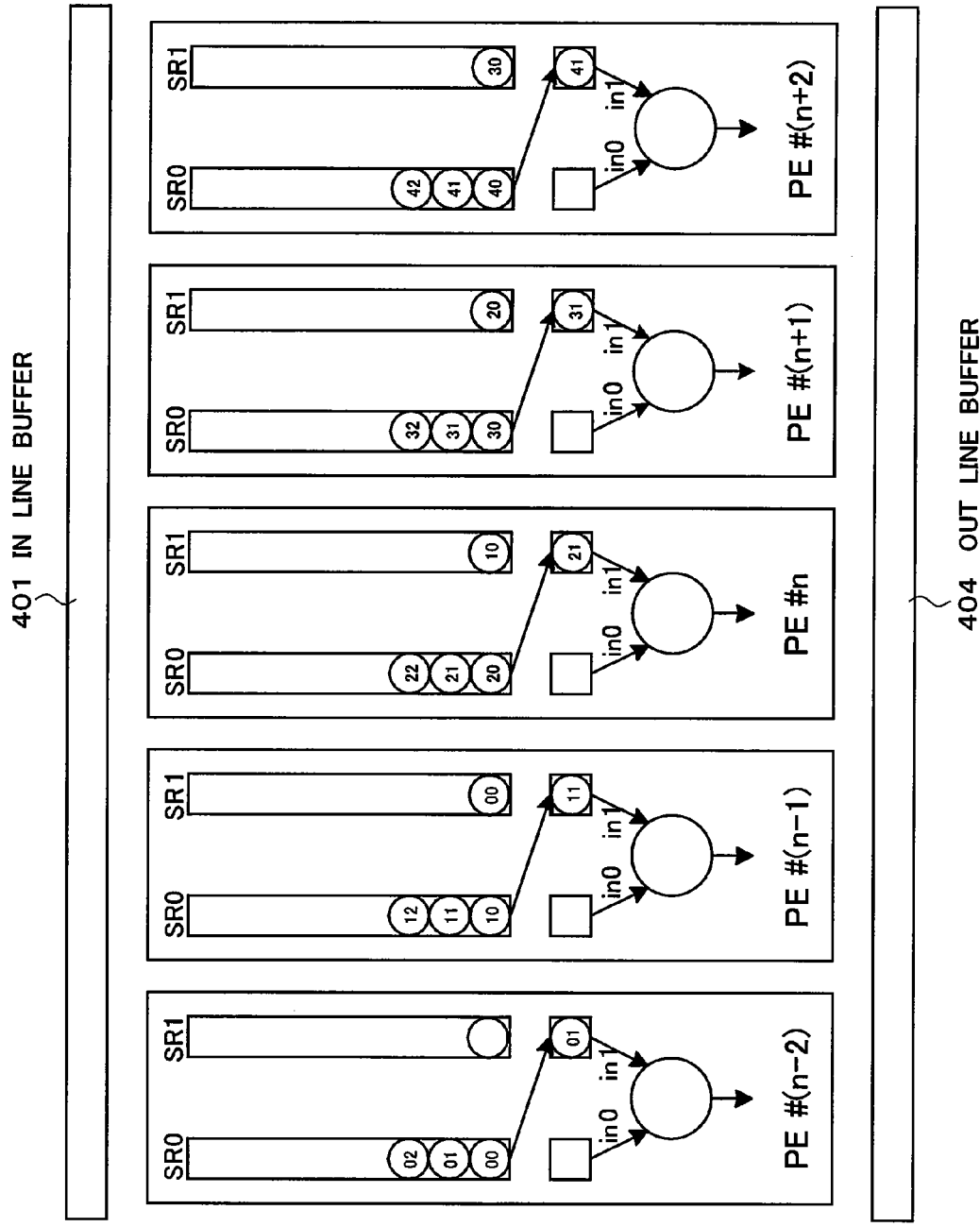
FIG. 16 is a third partial diagram for explaining the operation of a stream register of each PE in the filtering shown in FIG. 13.

When the stream registers SR0, SR1, and SR2 are accessed, the access can be carried out by designating not only the position of the Current value of the pointer register, but also the offset from the Current position. In a second cycle, as shown in FIG. 16, the pixel data existing at the position obtained by adding the offset 1 to the Current value of the read pointer in the stream register SR0 is written into the register in1. Namely, in the case of the PE#n, the pixel data 21 is written into the register in1. The arithmetic and logical unit ALU reads out the pixel data value written in the in1 (1102) as the source operand and multiplies it by the coefficient. Further, the pixel data stored in the register in1 in the previous cycle is written into the stream register SR1 of the right neighboring PE.

Figure 17:
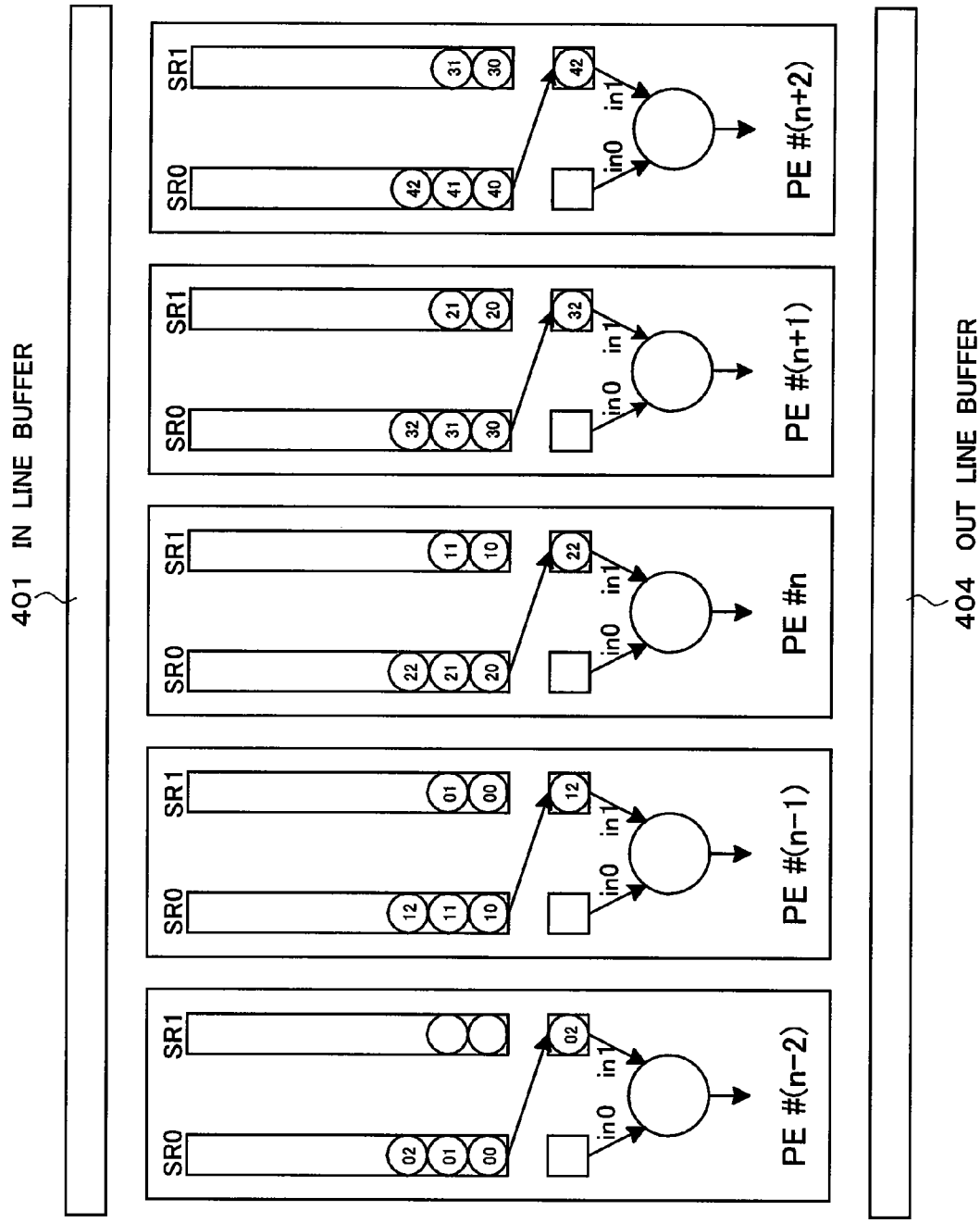
FIG. 17 is a fourth partial diagram for explaining the operation of a stream register of each PE in the filtering shown in FIG. 13.

By then continuing the same operation, the state shown in FIG. 17 is exhibited. At this point of time, the processing of three vertical pixel data stored in the stream register SR0 is completed.

Figure 18:
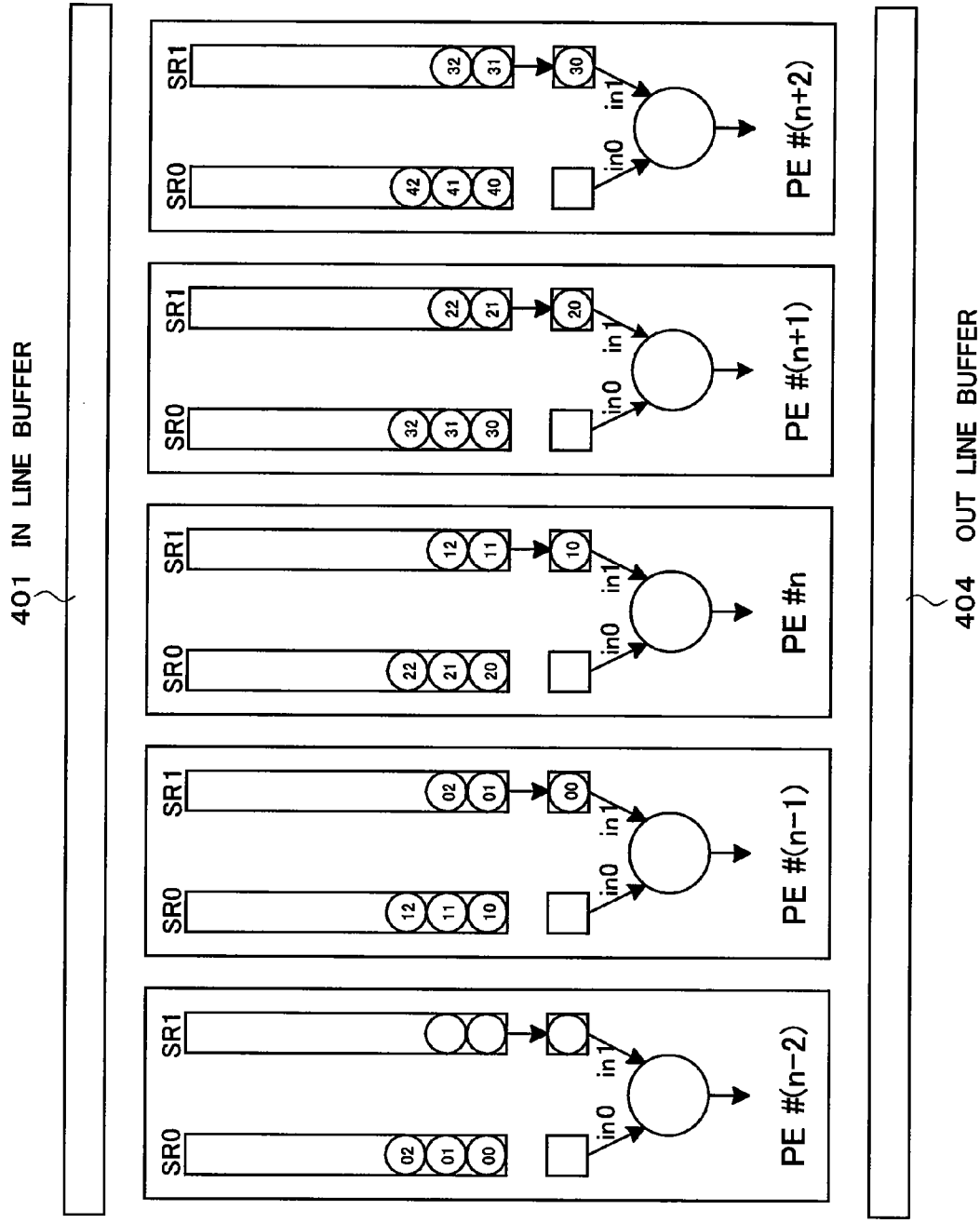
FIG. 18 is a fifth partial diagram for explaining the operation of a stream register of each PE in the filtering shown in FIG. 13.

Further, in the next and following cycles, as shown in FIG. 18, the pixel data stored in the stream register SR1 are sequentially processed. At this time, the read pointer is incremented at the time of the reading from the stream register SR1.

Figure 19:
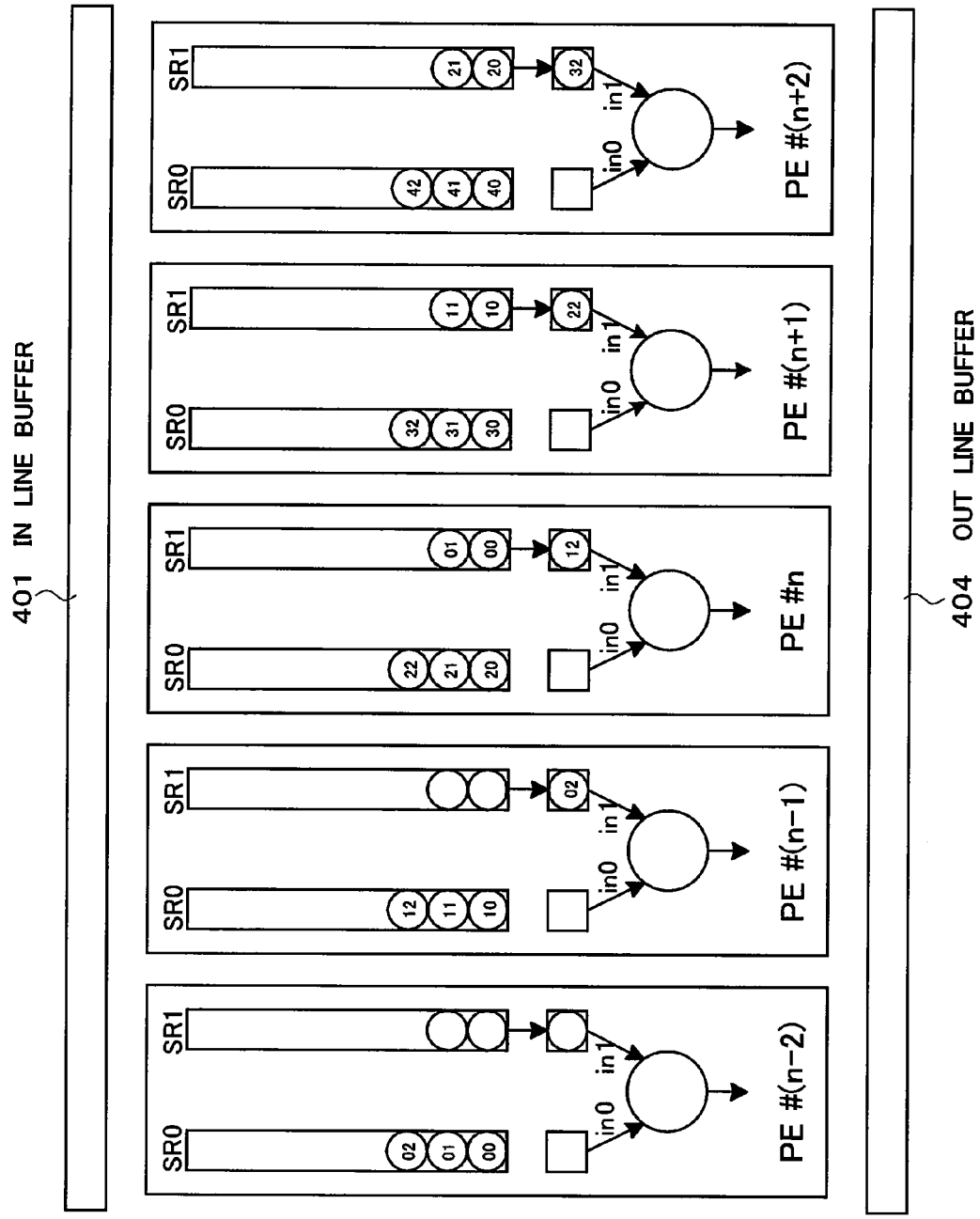
FIG. 19 is a sixth partial diagram for explaining the operation of a stream register of each PE in the filtering shown in FIG. 13.

By then continuing the same operation, the state shown in FIG. 19 is exhibited. At this point of time, the processing of three vertical pixel data originally stored in the stream register SR0 which is held by the left neighboring processor element (PE) 402 is completed.

Figure 20:
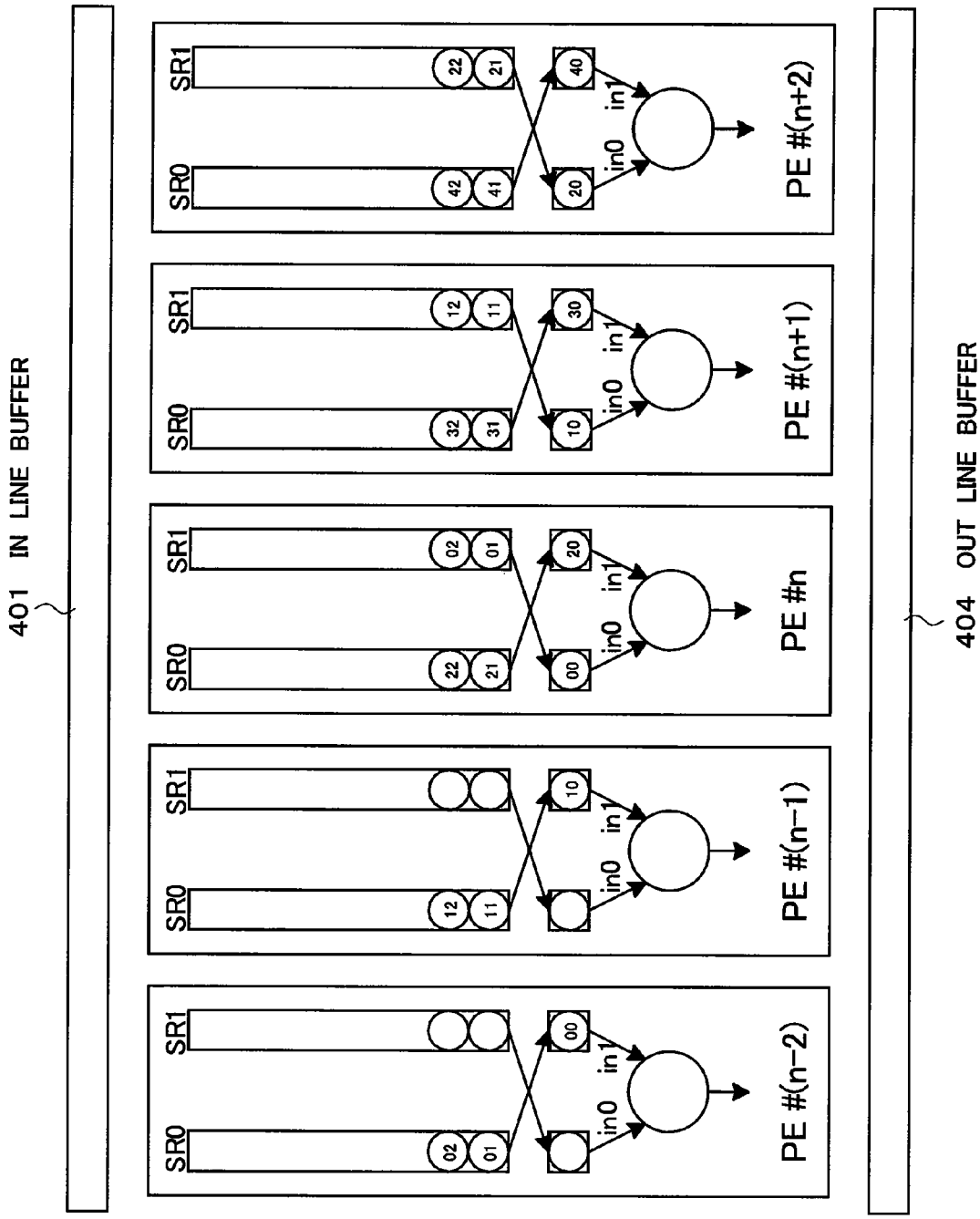
FIG. 20 is a seventh partial diagram for explaining the operation of a stream register of each PE in the filtering shown in FIG. 13.

In the next and following cycles, the same operation is repeated, but as previously explained, the data can not be written from the register in0 into the stream register SR1. Accordingly, the pixel data stored in the stream register SR0 is transferred to the stream register SR1 held by the left neighboring PE while performing the processing of the pixel data stored in the stream register SR1, therefore, as shown in FIG. 20, the pixel data of the stream register SR0 is written into the register in, and the pixel data of the stream register SR1 is written into the register in0. At this time, the read pointers of both of the stream registers SR0 and SR1 are incremented. The arithmetic and logical unit ALU reads out the pixel data value written in the register in0 as the source operand and multiplies it with the coefficient.

Figure 21:
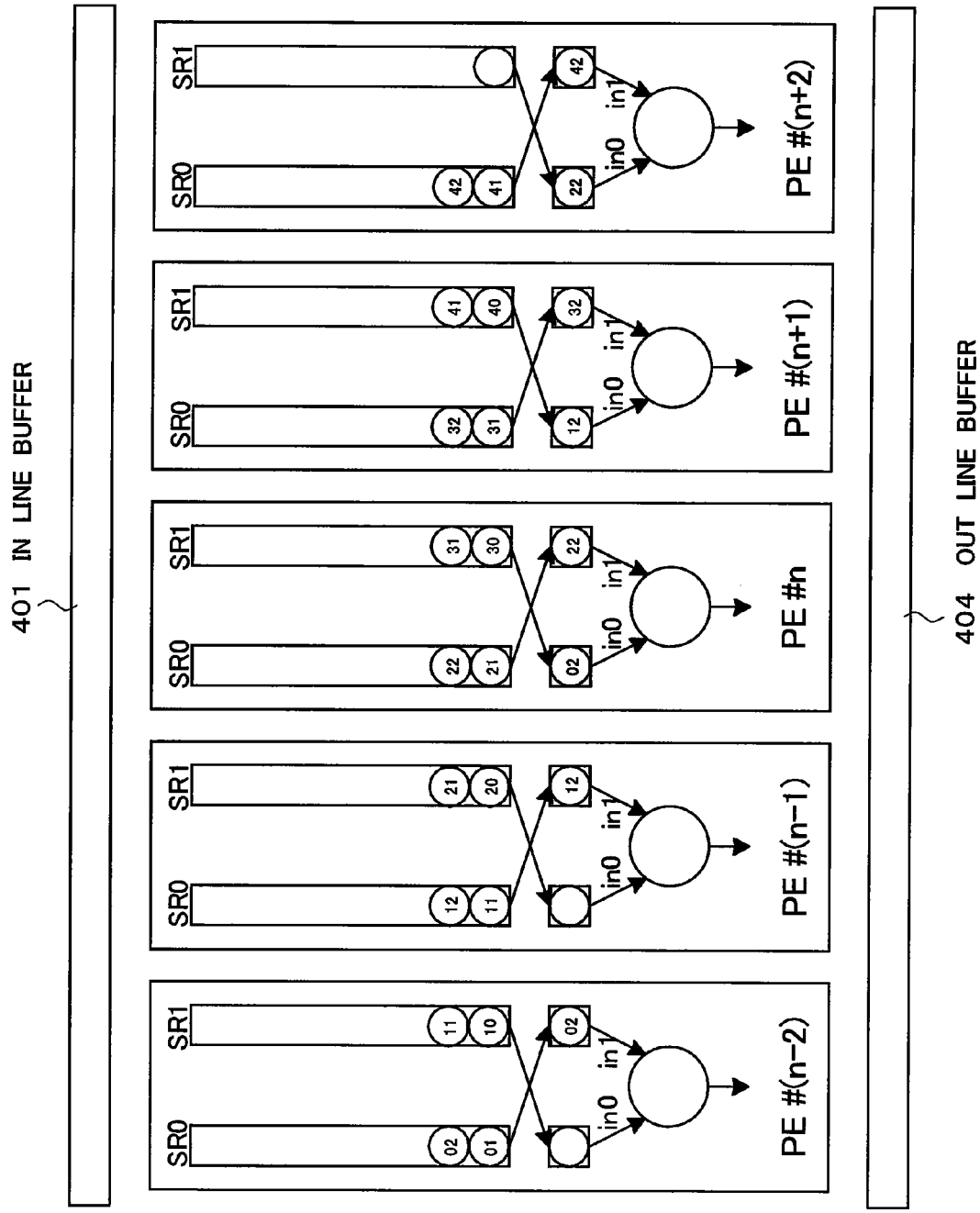
FIG. 21 is an eighth partial diagram for explaining the operation of a stream register of each PE in the filtering shown in FIG. 13.

By then continuing the same operation, the state shown in FIG. 21 is exhibited. At this point of time, the processing of the next three pixel data on the left is completed. Further, the stream register SR1 stores the pixel data stored in the stream register SR0 held by the right neighboring PE.

Figure 22:
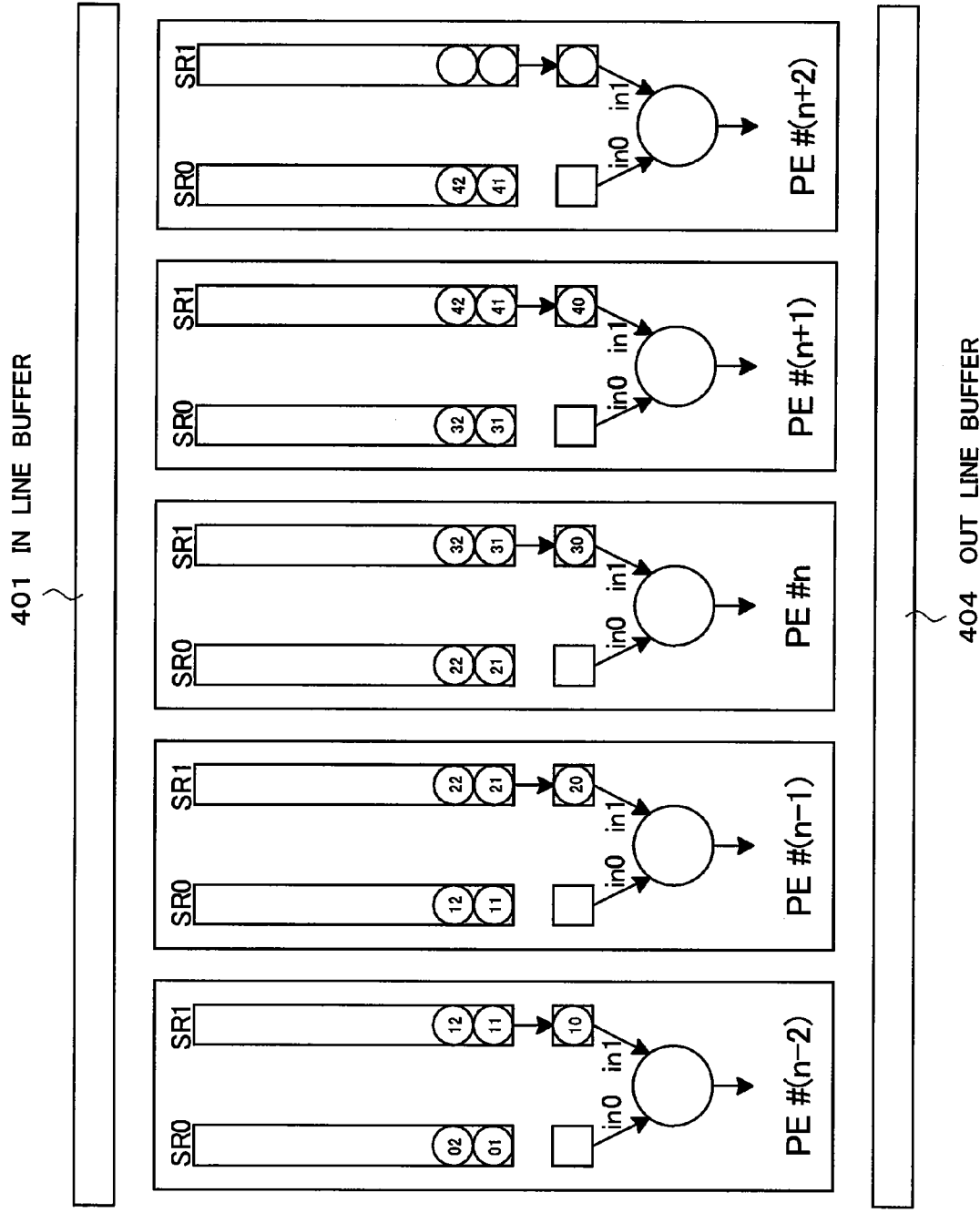
FIG. 22 is a ninth partial diagram for explaining the operation of a stream register of each PE in the filtering shown in FIG. 13.

Hereinafter, as shown in FIG. 22, the writing from the stream register SR1 to the register in, the multiplication of the pixel data value written in the register in1 and the coefficient, and the writing into the stream register SR1 held by the left neighboring PE from the register in1 are carried out again in parallel.

Figure 23:
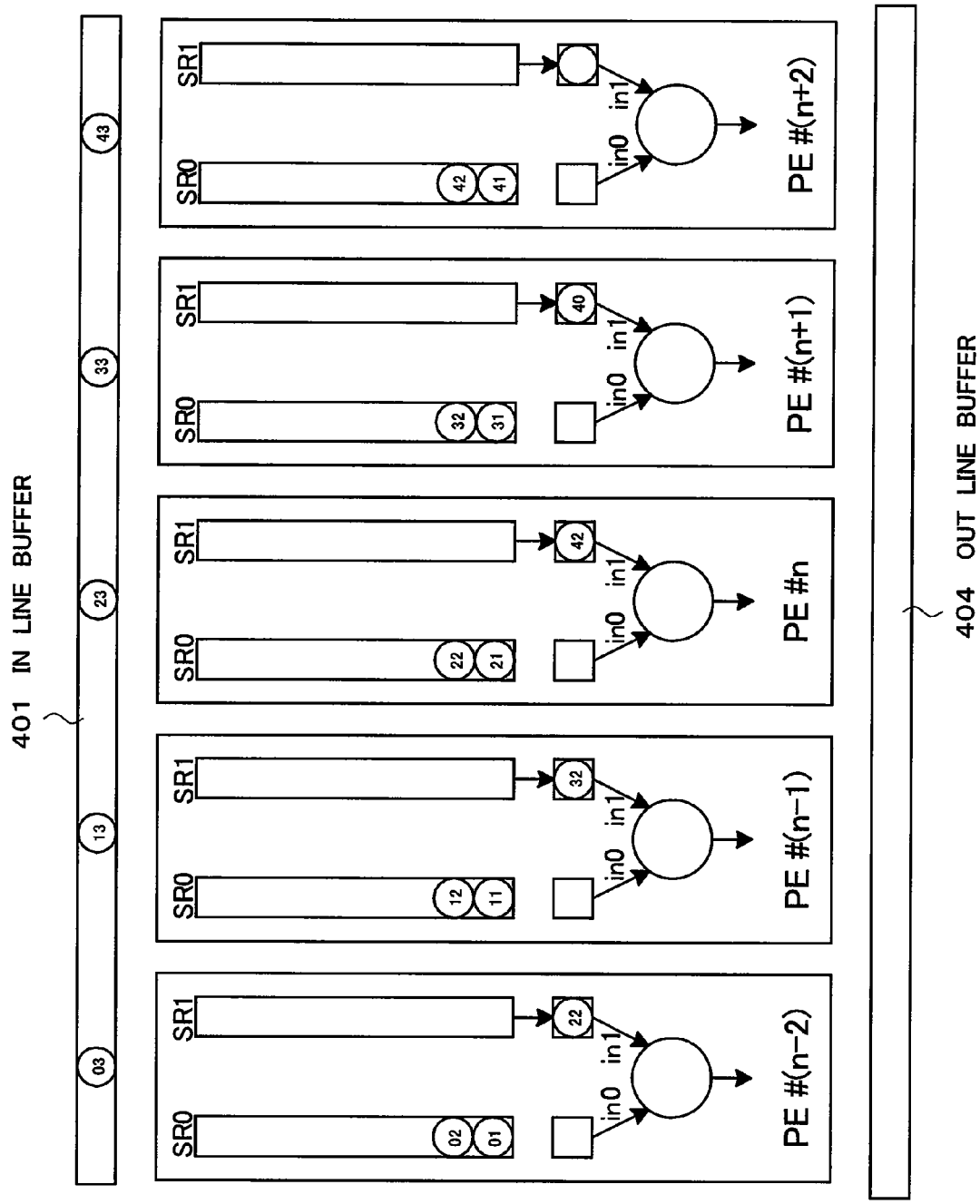
FIG. 23 is a 10th partial diagram for explaining the operation of a stream register of each PE in the filtering shown in FIG. 13.
Figure 24:
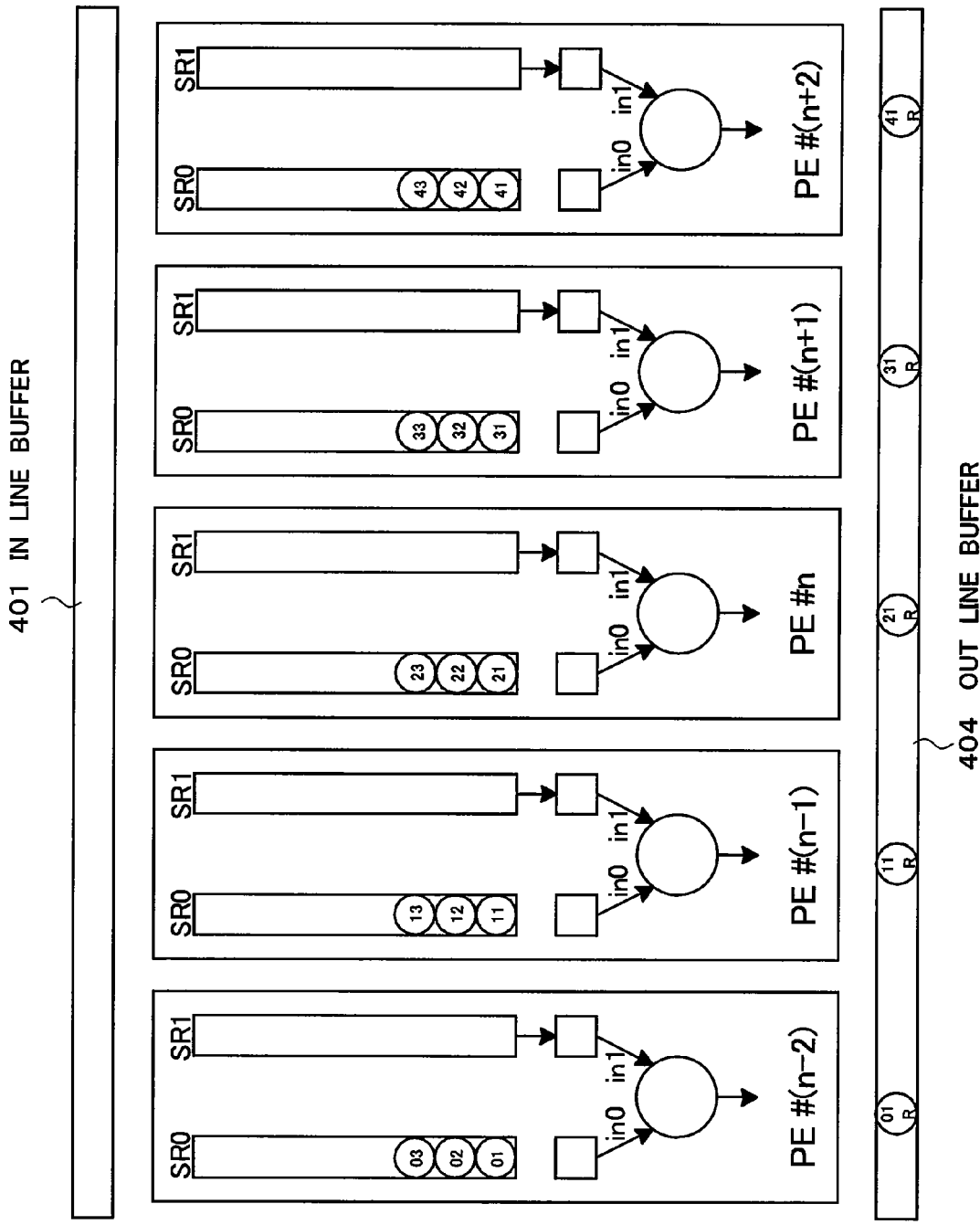
FIG. 24 is an 11th partial diagram for explaining the operation of a stream register of each PE in the filtering shown in FIG. 13.

By then continuing the same operation, the state shown in FIG. 23 is exhibited. At this point of time, the filtering of the pixel data included in the 5x3 region instructed by 801 of FIG. 13 is completed. Further, up to this point of time, in the in line buffer 401, the pixel data of the next line is written from the SCU 203_0.

Finally, the pixel data of the next line is loaded from the in line buffer 401 into the stream register SR0 and, at the same time, the result of the filtering is written into the out line buffer 404. The SCU 203_0 reads out the processing result written in the out line buffer 404 and writes it back into the local memory 204 or the memory system 105.

As described above, according to the present embodiment, in parallel to the processing of the arithmetic and logical unit ALU, the transfer of the data between adjacent PEs using the stream registers SR0 and SR1 can be efficiently carried out, data can be supplied to the arithmetic and logical unit ALU without interruption, and data is shared between adjacent PEs to reduce the reading frequency from the local memory 204_0.

[Shared Function Unit 403]

As explained with reference to FIG. 4, the processor unit PU#00 has a shared function unit 403.

The shared function unit 403 is used for processing other than a processing command which can be executed at the arithmetic and logical unit ALU shown in FIG. 11 of the PEs #0 to #15 shown in FIG. 4.

The processor elements PE #0 to #15 use a function callup command in order to utilize the shared function unit 403. At that time, the PE#0 to PE#15 output to the shared function unit 403 requests designating linkage with the usable functions explained later by adding predetermined function identification numbers to the command.

When setting the data required for the register designated at the source operand and executing the function callup command, the PEs #0 to #15 return the results to the register temps after a predetermined latency. Note that the register designated at the source operand cannot be rewritten until the reference result is written back.

The functions which can be utilized by the shared function unit 403 will be shown below.

Figure 25:
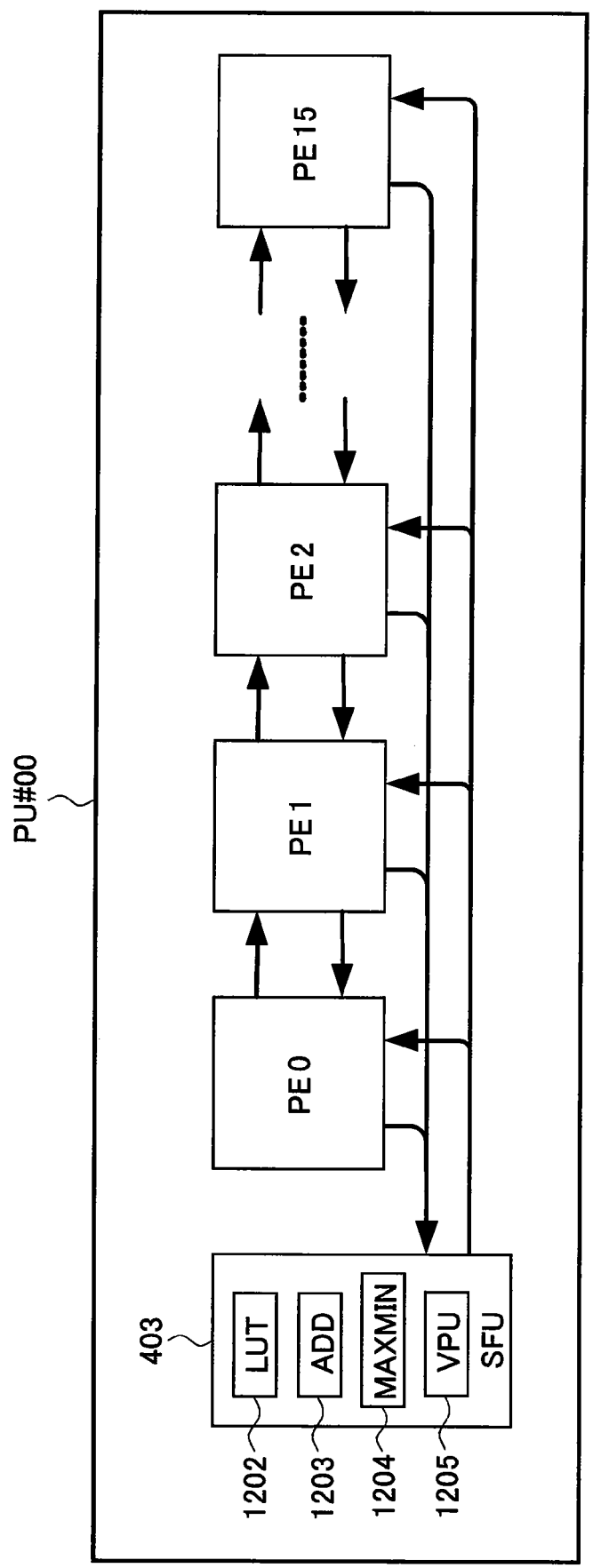
FIG. 25 is a diagram for explaining a shared function unit in a PU.

The shared function unit 403, for example as shown in FIG. 25, has the functions of the LookUp Table 1202, adder processor 1203, maximum/minimum value processor 1204, vector processing unit 1205, etc.

The LookUp Table 1202 is a function which is shared among a plurality of processor elements (PEs) and in which the latency is variable depending upon the number of entries.

The adder processor 1203 is a function receiving as input the data from a plurality of PEs and variable in latency depending upon the number of data.

The maximum/minimum value processor 1204 is a function receiving as input the data from a plurality of PEs and variable in latency depending upon the number of data.

The vector processing unit 1205 is a function variable in latency depending upon the dimension.

The function of the shared function unit 403 as the LookUp Table 1202 will be explained next.

The LookUp Table 1202 not only can be utilized as a single table of 1024 entries, but also can be used by changing the number of entries such as 512 entries and 256 entries.

Further, the LookUp Table 1202 can hold not only one type, but also a plurality of types of tables. For example, the LookUp Table 1202 can store a reciprocal table and logarithm table in different regions in the 1024 entries.

The LookUp Table 1202 is shared by 16 PEs, therefore when 1024 entries are used as a single table, the number of cycles required for access becomes 16.

The 17 obtained by adding an access delay of 1 cycle to this is the latency of the LookUp Table 1202 of the 1024 entries.

When decreasing the number of entries and storing a plurality of the same type of tables, the number of PEs sharing one table is decreased, therefore also the number of cycles required for access is decreased. For example, when the table of 256 entries is employed, this is shared by four PEs, therefore the number of cycles required for the access becomes 4, and the latency becomes 5. Note that the structure of the LookUp Table 1202 is set before the shared function unit 403 executes the program.

The function of the shared function unit 403 as the adder processor 1203 will be explained next.

When receiving as input the data from a plurality of PEs, the adder processor 1203 outputs the total value of the data to the PEs which output the data after a predetermined latency.

The shared function unit 403 includes one adder processor 1203. When this is shared by 16 PEs, the number of cycles required for processing becomes 16. The 17 obtained by adding the access delay of 1 cycle to this is the latency of the adder processor 1203.

The shared function unit 403 includes two adder processors 1203. When each is shared by eight PEs, the number of cycles required for processing is 8. The 9 obtained by adding the access delay of 1 cycle to this is the latency of the adder processor 1203. Note that the structures of the plurality of adder processors 1203 are set before the shared function unit 403 executes the program.

Next, an explanation will be given of the function of the shared function unit 403 as the maximum/minimum value processor 1204.

When receiving as input the data from a plurality of PEs, the maximum/minimum value processor 1204 outputs the maximum value and minimum value of these data to the PEs which output the data after a predetermined latency.

The shared function unit 403 includes one maximum/minimum value processor 1204. When this is shared by 16 PEs, the number of cycles required for the processing becomes 16. The 17 obtained by adding the access delay of 1 cycle to this is the latency of the maximum/minimum value processor 1204.

The shared function unit 403 includes two maximum/minimum value processors 1204. When this is shared by eight PEs, the number of cycles required for the processing becomes 8. The 9 obtained by adding the access delay of 1 cycle to this is the latency of the maximum/minimum value processor 1204. Note that the configurations of the plurality of maximum/minimum value processors 1204 are set before the shared function unit 403 executes the program.

Next, an explanation will be given of the function of the vector processing unit 1205 of the shared function unit 403.

The vector processing unit 1205 performs the vector processing using the number of data input from a plurality of PEs as the dimension and outputs the result to the PEs which output the data after a predetermined latency.

The following Equation (1) is two-dimensional vector processing by two PEs, therefore the number of cycles required for the processing is 3. The 3 obtained by adding the access delay of 1 cycle to this is the latency of the vector processing unit 1205.

[Equation 1]

$$\begin{bmatrix} u \\ v \end{bmatrix} = \begin{bmatrix} a & b \\ c & d \end{bmatrix} \begin{bmatrix} x \\ y \end{bmatrix} \quad (1)$$

In the same way, due to the four-dimensional vector processing by four PEs of the following Equation (2), the number of cycles required for the processing is 4. The 5 obtained by adding the access delay of 1 cycle to this is the latency of the vector processing unit 1205.

[Equation 2]

$$\begin{bmatrix} u \\ v \\ s \\ t \end{bmatrix} = \begin{bmatrix} a & b & c & d \\ e & f & g & h \\ i & j & k & l \\ m & n & o & p \end{bmatrix} \begin{bmatrix} x \\ y \\ z \\ w \end{bmatrix} \quad (2)$$

In both cases, values of elements of the matrix which become the coefficients are stored in advance.

[SCU (Stream Control Units) 203_0 to 203_3]

Below, an explanation will be given of the SCU 203_0. The SCUs 203_1 to 203_3 are the same as SCU 203_0.

The SCU 203_0, as shown in FIG. 3 etc., performs the control for efficiently inputting/outputting the data required for the processing of individual processor elements PE configuring the plurality of PU_SIMD (Single Instruction Multiple Data) processing circuits #0 to #3.

The SCU 203_0 stores the data required for the processing in a storage device such as a semiconductor memory etc.

The PU_SIMD processing circuits #0 to #3 are SIMD type processors, therefore the input/output with respect to all PEs are simultaneously carried out in terms of time. Accordingly, the input/output with respect to the PU_SIMD #0 to #3 by the SCU 203_0 will lead to the simultaneous input/output of the number of PEs' worth of input/output data. Hereinafter, the simultaneously input/output data will be called "stream data".

On the other hand, the PU_SIMD processing circuits #0 to #3 mainly perform the processing of the image information. The image information to be processed is stored in a storage region managed by physical one-dimensional addresses in a memory or other storage device by securing a logical two-dimensional storage region. The basic unit of that image data will be called "pixel data".

The SCU 203_0 is located between the PU_SIMD processing circuits #0 to #3 and the memory system 105 and the local memory 204_0 and has a function of converting a plurality of pixel data to stream data for input/output.

Next, the function of the SCU 203_0 will be concretely shown.

(1) The SCU 203_0 reads out the data group from the local memory 204_0 or the memory system 105 (hereinafter also described as the storage region), converts that data to the stream data required at the PU_SIMD #0 to #3, and outputs the same to the PU_SIMD #0 to #3.

(2) The SCU 203_0 converts the output stream data output by the PU_SIMD #0 to #3 to the data format required inside the storage region and writes and transfers the same to the storage region.

(3) The storage region of the SCU 203_0 is a semiconductor memory used as a working region. Variation can be assumed such as the case where the storage region is included in an SOC (System On Chip) together with the SCU 203_0 and a case where the storage region is included outside the SOC.

(4) When the SCU 203_0 accesses the above storage region, the access can be made from the SCU 203_0 as a one-dimensional physical address.

(5) Inside the SCU 203_0, the data on the storage region can be handled using the pixel data arranged at logical two-dimensional coordinates as units due to the ease of the program development in the PU_SIMD processing circuits #0 to #3 and the ease of handling of the image information.

(6) On the storage region, one word data comprised of a plurality of pixel data becomes the unit of access by a one-dimensional physical address.

(7) The number of the pixel data in one word data and the pixel data array when seen by the two-dimensional coordinates are variable in accordance with the used memory type. The SCU 203_0 can cope with a plurality of pixel data arrays.

(8) The storage region of the SCU 203_0 requires setting for read access to the storage region and data conversion in units of PU_SIMD processing circuits #0 to #3 connected to the SCU 203_0. This setting is possible by writing into the register inside the SCU 203_0 from the host processor 101.

(9) The SCU 203_0 sets the following items in order to perform the read access to the storage region.

a. A first start address for designating a plurality of rectangular image regions included in the storage region.

b. Widths/heights of the second plurality of rectangular image regions included in the storage region starting from the first start address and designated by the two-dimensional logical coordinates.

c. Widths/heights of the third rectangular image regions included hierarchically in the second rectangular image regions and designated by the two-dimensional logical coordinates.

d. Designation of a method for selectively reading data inside the third rectangular image regions, applying rearrangement, computation, and other processing, and converting the result to the stream data required by the PU_SIMD processing circuits #0 to #3.

(10) The SCU 203_0 sets the following execution in order to perform WRite access to the storage region.

e. A fourth start address included in the storage region and designating a plurality of rectangular image regions.

f. Widths/heights of a fifth plurality of rectangular image regions included in the storage region starting from the fourth start address and designated by the two-dimensional logical coordinates.

g. Widths/heights of sixth rectangular image regions designated by the two-dimensional logical coordinates included hierarchically in the fifth rectangular image regions.

h. Designation of the method for selectively reading the data from the stream data output by the PU_SIMD processing circuits #0 to #3 with respect to the data inside the sixth rectangular image regions, applying rearrangement, computation, and other processing, and writing the result in a data format inside the sixth rectangular image regions.

i. The SCU 203_0 realizes the data transfer among a plurality of storage regions.

j. A controller able to control the SCU 203_0 constituted by the host processor 101 is connected to via an interface for communication.

When the PU_SIMD processing circuits #0 to #3 process the stream data, they efficiently perform the processing by multiplexly (hierarchically) designating the rectangular image regions on the storage region and performing the Read/WRite processing of the data while moving each rectangular image region.

For this reason, the rectangular image regions having a multiplex structure are defined inside the SCU 203_0.

Figure 26:
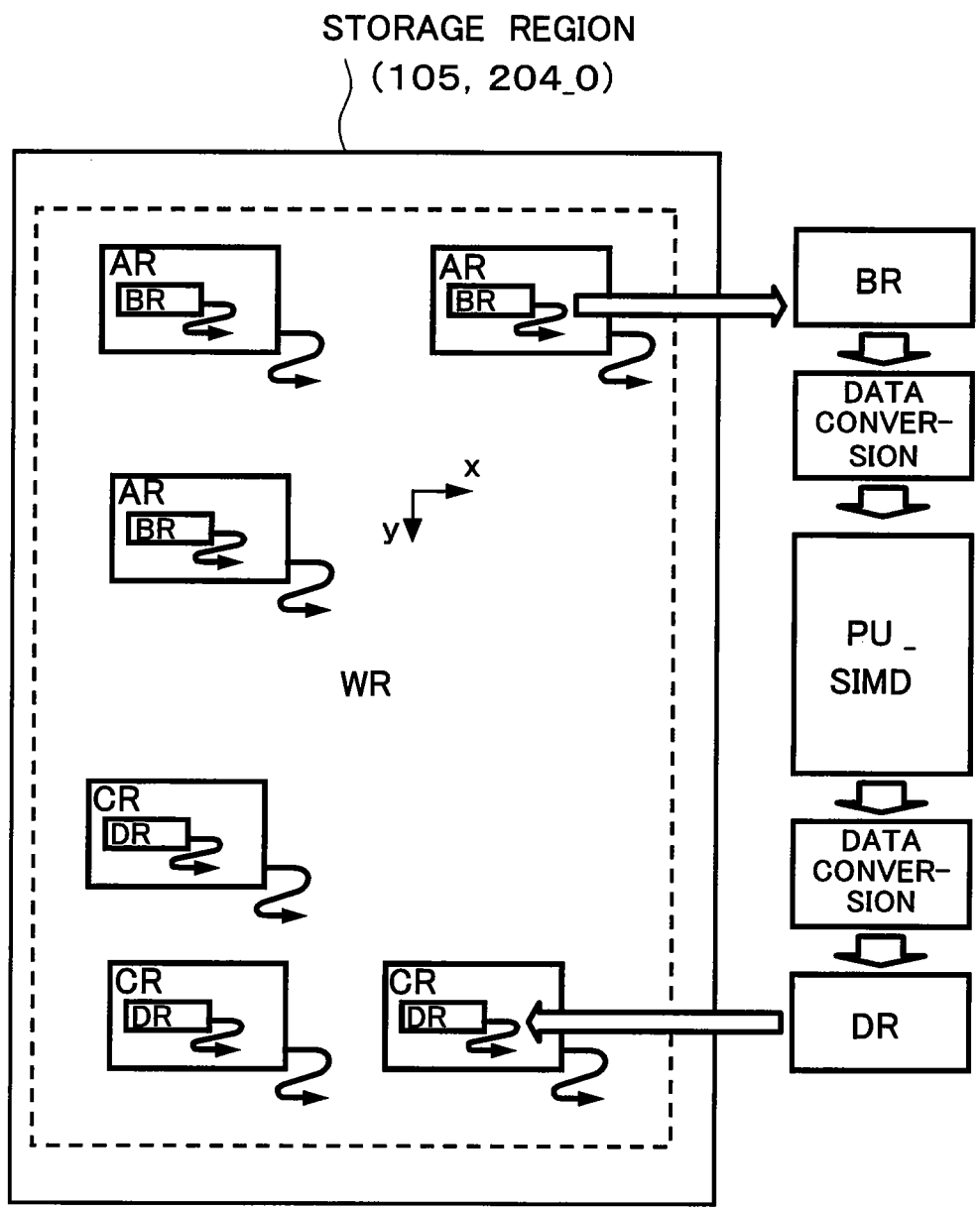
FIG. 26 is a first partial diagram for explaining a method of management of a storage region by a stream control unit (SCU) shown in FIG. 3 etc.

FIG. 26 shows the operation in a case where the stream data are written from the multiplex rectangular image regions on the storage region into the PU_SIMD processing circuits #0 to #3 and a case where the stream data are written from the PU_SIMD processing circuits #0 to #3 into the multiplex rectangular image regions on the storage region.

The hierarchical structure of the rectangular image regions in the storage region handled by the SCU 203_0 will be explained with reference to FIG. 26.

The SCU 203_0 designates the rectangular image region WR as the work region in the storage region.

Further, the SCU 203_0 designates the rectangular image region WR for each of the PU_SIMD processing circuits #0 to #3.

The SCU 203_0 designates the rectangular image region AR as the reading side in the rectangular image region WR.

The SCU 203_0 designates the rectangular image region BR in the rectangular image region AR.

The SCU 203_0 executes (designates) the data conversion command WI#data#op for converting the pixel data read out from the rectangular image region BR to the stream data required by the PU_SIMD processing circuits #0 to #3 based on the program input from the host processor 101.

The SCU 203_0 can program one series of repeated processing of designation of rectangular image regions AR, BR, and WI_data_op as will be explained later.

The SCU 203_0 designates the rectangular image region CR as the write destination of pixel data in the rectangular image region WR.

The SCU 203_0 designates the rectangular image region DR in the rectangular image region CR.

The SCU 203_0 executes the data conversion command WO#data#op from the output stream data of the PU_SIMD #0 to #3 to the rectangular image region DR.

The SCU 203_0 can program one series of repetition processing for the designation of the rectangular image regions CR, DR, and WO_data_op as will be explained later.

The SCU 203_0 can arrange and move the rectangular image regions AR, BR, CR, and DR to any position in the rectangular image region WR.

The SCU 203_0 can designate the rectangular image regions AR, BR, CR, and DR by the two-dimensional logical coordinates in the rectangular image region WR.

The SCU 203_0 can designate the rectangular image region WR by the physical address with respect to the storage region.

When the pixel data inside the rectangular image regions WR, AR, DR, CR, and DR are accessed, access to the storage region becomes unnecessary, therefore the SCU 203_0 performs the conversion from the logical address to a physical address and accesses the storage region.

Figure 27:
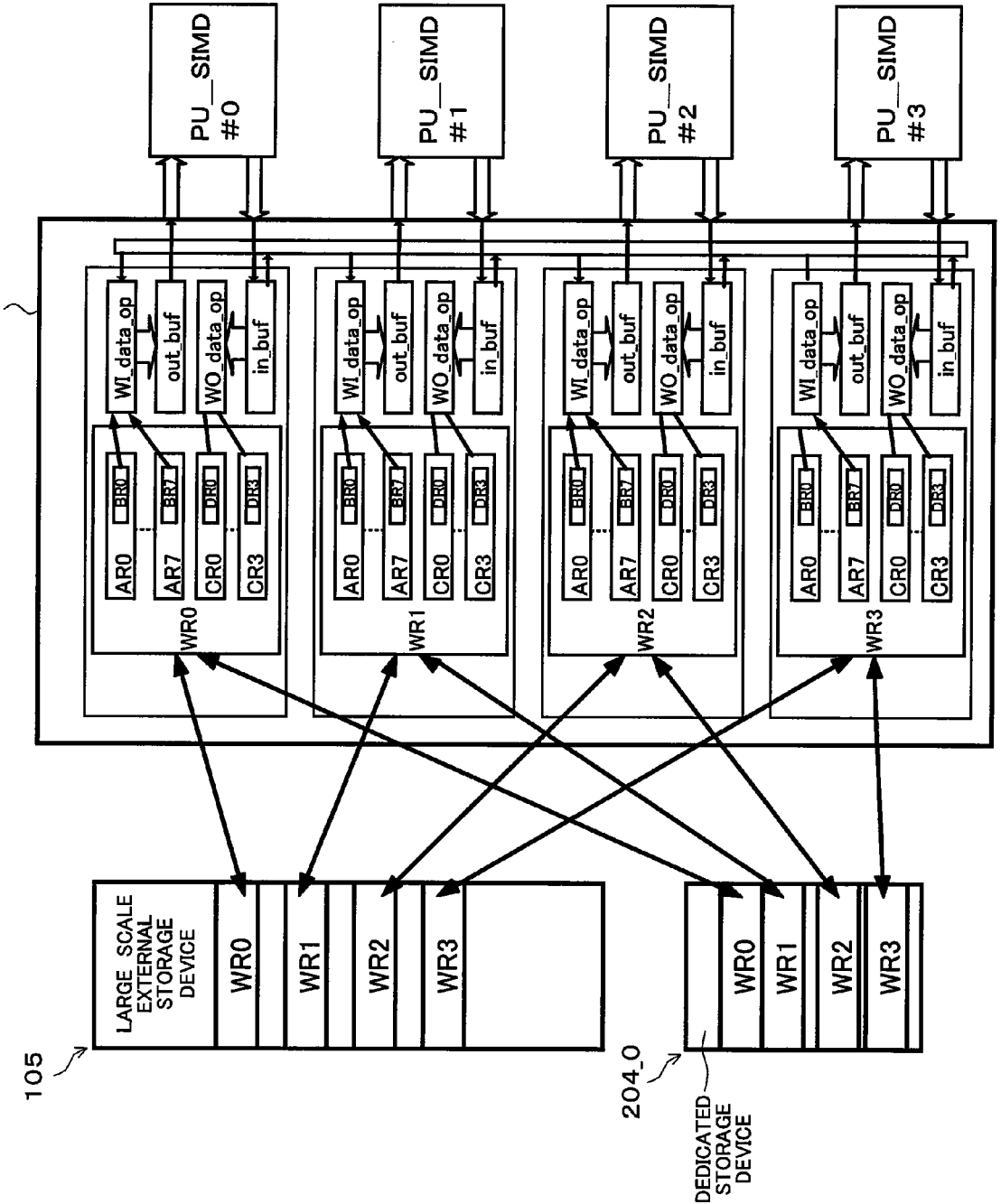
FIG. 27 is a second partial diagram for explaining a method of management of the storage region by an SCU shown in FIG. 3 etc.

FIG. 27 is a diagram for explaining the function for performing processing concerning the multiplex rectangular image regions designated inside the SCU 203_0.

As shown in FIG. 27, the SCU 203_0 assigns each of the rectangular image regions WR0 to WR3 in the storage region to each of the PU_SIMD processing circuits #0 to #3.

The rectangular image regions WR0 to WR3 are defined in the storage region of the memory system 105 and local memory 204_0 etc.

In the rectangular image regions WR0 to WR3, rectangular image regions AR0 to AR7, BR0 to BR7, CR0 to CR7, and DR0 to DR3 are defined.

The SCU 203_0 shown in FIG. 27 converts the data in the rectangular image region BR to stream data by WI_data_op and writes the same into the output buffer out_buf.

Further, the SCU 203_0 data converts the stream data input from the PU_SIMD processing circuits #0 to #3 and stored in the input buffer in#buf by the data conversion command WO#data#op and WRites the same into the rectangular image region DR.

As explained above with reference to FIG. 26, by defining the rectangular image regions AR, BR, CR, and DR in the rectangular image region WR by the hierarchical structure, for example, when the rectangular image regions BR and DR are relatively moved in the rectangular image regions AR and CR, address expression in a form adding standard coordinates to local coordinates in the rectangular image regions AR, BR, CR, and DR becomes possible, and the programming becomes easy.

In the present embodiment, the number of the rectangular image regions, the number of classes of the multiplex designation, etc. are expressed by specific numerals, but the structures and numbers thereof can be freely combined. It is possible to change the structure in accordance with the necessity of broad image processing.

The connection performed by the SCU 203_0 for the data transfer will be explained next.

[System Bus Connection]

The system bus 113 shown in FIG. 1 is a bus for connecting the SCU 203_0 to the host processor 101 and memory system 105 and other processing modules and has the following characteristic features.

(1) The system bus 113 can employ a standardized bus standard inside the LSI or SOC.

(2) The bus width of the system bus 113 is 128 bits. By employing a configuration in which continuous data transfer (burst transfer) is possible, the bus efficiency can be improved.

(3) The SCU 203_0 accesses the storage device (for example, the memory system 105) on the system bus 113 as a bus master.

(4) The bus master other than the SCU 203_0 on the system bus 113 accesses the internal register of the SCU 203_0 or SCU dedicated storage device (for example local memory 204_0).

(5) The system bus 113 can be selected with regard as to the bus standard so long as the data transfer efficiency and function are satisfied.

[Dedicated Storage Region Connection of SCU 203_0]

The SCU 203_0 can be connected to a dedicated storage device as a dedicated storage region.

The dedicated storage device can be a SRAM, DRAM, or other semiconductor memory either inside or outside of the SOC.

The above dedicated storage device is connected to a bus having a broader band than the system bus 113.

The dedicated storage device is prepared for the purpose of the use exclusively by one SCU 203_0.

The bus master on the system bus 113 can access the dedicated storage device.

[PU_SIMD #0 to #3 Connection]

The SCU 203_0 has four PU_SIMD processing circuits #0 to #3 connected to it over a bus.

The stream data is input from the SCU 203_0 to the PU_SIMD processing circuits #0 to #3 by using the 256 bit unidirection bus in each PU_SIMD processing circuit. The transfer efficiency is 256 bits/clock.

As data/transfer protocol, a two-line type handshake is employed.

Inside the SCU 203_0, the output buffer out_buf is prepared.

When the output is carried out from the SCU 203_0, the PU_SIMD processing circuit internal register is identified by designating addresses with respect to the PU_SIMD processing circuits #0 to #3.

The stream data is input from the PU_SIMD processing circuits #0 to #3 to the SCU 203_0 using the 256 bit unidirection bus in each PU_SIMD. The transfer efficiency is 256 bits/clock.

Further, a two-line type handshake is employed as the data/transfer protocol.

The input use input buffer in_buf is prepared inside the SCU 203_0.

When the input is carried out from the PU_SIMD processing circuits #0 to #3 to the SCU 203_0, the PU_SIMD processing circuit internal register is identified by designating the address with respect to the PU_SIMD.

[Physical Logical Address Conversion of SCU 203_0]

A pixel corresponding position Pixel inside the rectangular image region WR in the storage region explained by using FIG. 26 and FIG. 27 accessed by the SCU 203_0 is expressed by a two-dimensional logical address, but the memory system 105 and the local memory 204_0 are expressed by physical addresses. Accordingly, when performing a Read or WRite with respect to the pixel corresponding positions Pixel designated inside the rectangular image regions AR, BR, CR, and DR in the rectangular image region WR, the SCU 203_0 performs the address conversion from two-dimensional logical addresses to physical addresses.

Here, the pixel corresponding position in the rectangular image region WR is defined as pixel(x, y). Note, x, y is the two-dimensional logical address.

The physical address (adrs) of the pixel corresponding position L_pixel(x, y) is computed in the following way.

Further, among the address designated words, the bit position occupied by the pixel corresponding position L_Pixel(x, y) is expressed as Word[a:b]. (Note, a, b is the bit range forming a pixel in a word.)

In the following Equations (3) to (4), ww is the width (X direction) of the rectangular image region WR in units of the pixel positions.

Note that the number of the pixels in the x-direction in 1 word data (1 word) is defined as pw.

ph is the number of pixels in the y-direction in 1 word.

n is the value for calculating the bit position in 1 word.

WR#bp is an address indicating the start of the rectangular image region WR inside the storage region.

This is expressed by one pixel=16 bits, but as the bit length, it is also possible to employ another value.

Int( ) indicates an integer not exceeding the parenthesized value.

X mod y is a remainder obtained by dividing the integer x by the integer y.

[Equation 3]

$$adrs = WR\#bp + int[y/ph] * ww/pw + int(x/pw) \quad (3)$$

[Equation 4]

$$n = (y \bmod ph) * pw + (x \bmod pw) \quad (4)$$

[Equation 5]

$$L\#Pixel(x,y)[15:0] = word[16*(n+1)-1:16*n] \quad (5)$$

Figure 28:
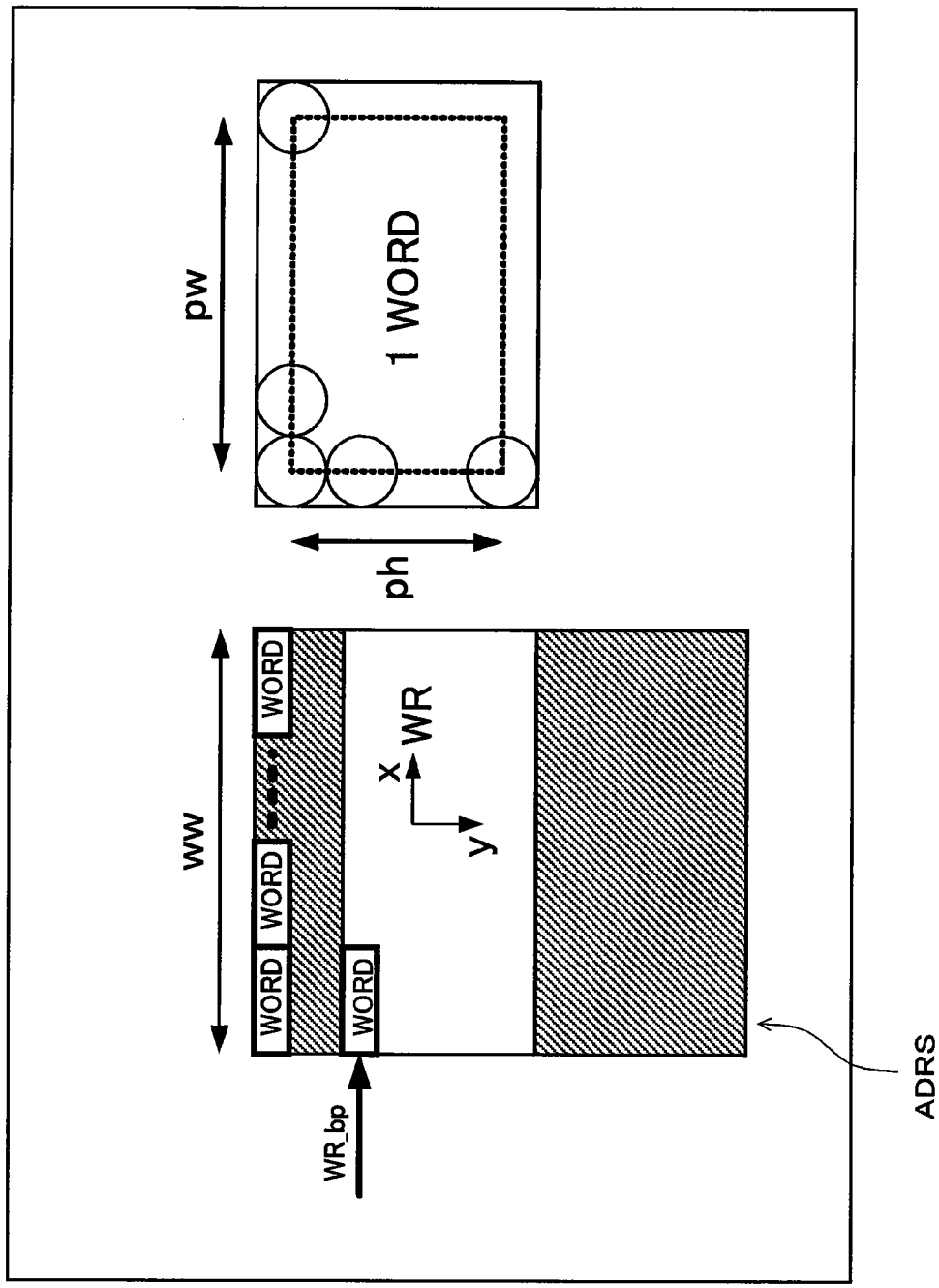
FIG. 28 is a third partial diagram for explaining a method of management of the storage region by an SCU shown in FIG. 3 etc.

FIG. 28 is a diagram for explaining the physical/logical address conversion by the SCU 203_0.

As shown in FIG. 28, the rectangular image region WR is defined in the physical address space ADRS of the memory system 105 and the local memory 204_0.

The SCU 203_0 determines the access unit by one physical address as 1 word.

WR#bp+ is the start address of the rectangular image region WR.

ww is the width of the rectangular image region WR, the pixel corresponding position Pixel unit, and a multiple of pw.

As shown in FIG. 28, the pixel corresponding position L_Pixel of the address space ADRS can be designated by a two-dimensional logical address.

pw shown in FIG. 28 indicates the number of pixels (number of pixel data) in the x-direction in 1 word.

ph shown in FIG. 28 indicates the number of pixels in the y-direction in 1 word.

When the amount of information included in 1 pixel is made n bits and the total bit capacity included in 1 word is wordsize, the following relationship stands.

[Equation 6]

$$wordsize = n * pw * ph \quad (6)$$

In the present embodiment, by managing the storage region by two-dimensional logical addresses as explained above, where any rectangular image region in the storage region is accessed, the count processing (processing for detection of dead line) etc. as in the conventional scan line method become unnecessary and the programming becomes easy.

In the present embodiment, the explanation is given by the configuration of 1 pixel=16b bits, but the amount of information of 1 pixel is not particularly limited and may be 8 bits or 32 bits etc.

[Access to Storage Region by SCU 203_0]

The SCU 203_0, as explained above, can use the memory system 105 as a large scale external storage device and the local memory 204_0 as a small scale dedicated storage device connected to the system bus 113 as the storage device.

The memory system 105 is for example a DRAM chip connected to the outside of the SOC including the SCU 203_0. It is a general DDR, RAMBUS, or other memory chip.

The local memory 204_0 is, for example, an SRAM inside a SOC including the SCU 203_0 or eDRAM (Embedded-DRAM: ON-chip DRAM included in the same SOC as SCU).

In general, the DRAM has a hierarchical structure of addresses such as row/column/bank. It is characterized in that continuous data access included in the same row is high speed, but continuous data access bridging row boundaries and continuous access of far away rows requires processing such as page precharging, therefore the speed becomes low.

In the present embodiment, the SCU 203_0 uses for example RAMs as the memory system 105 and the local memory 204_0, but there is no problem even in the case of SRAMs. Further, when using DRAMs, by arranging rectangular images of pixel data in a storage region on the same page as much as possible at the time of generation of stream data for the purpose of avoiding discontinuity of the above access performance, the discontinuity of the DRAM access can be reduced as much as possible.

This can be easily realized for example by giving the following restrictions to values of bp and ww in the previously explained physical/logical address conversion.

(Restriction example 1) ww is a multiple of the columns of the DRAM and a multiple of pw.

(Restriction example 2) The value of WR#bp is a row unit of the DRAM.

[Definition of Multiplex Rectangular Image Region by SCU 203_0 (Time of Reading)]

Figure 29:
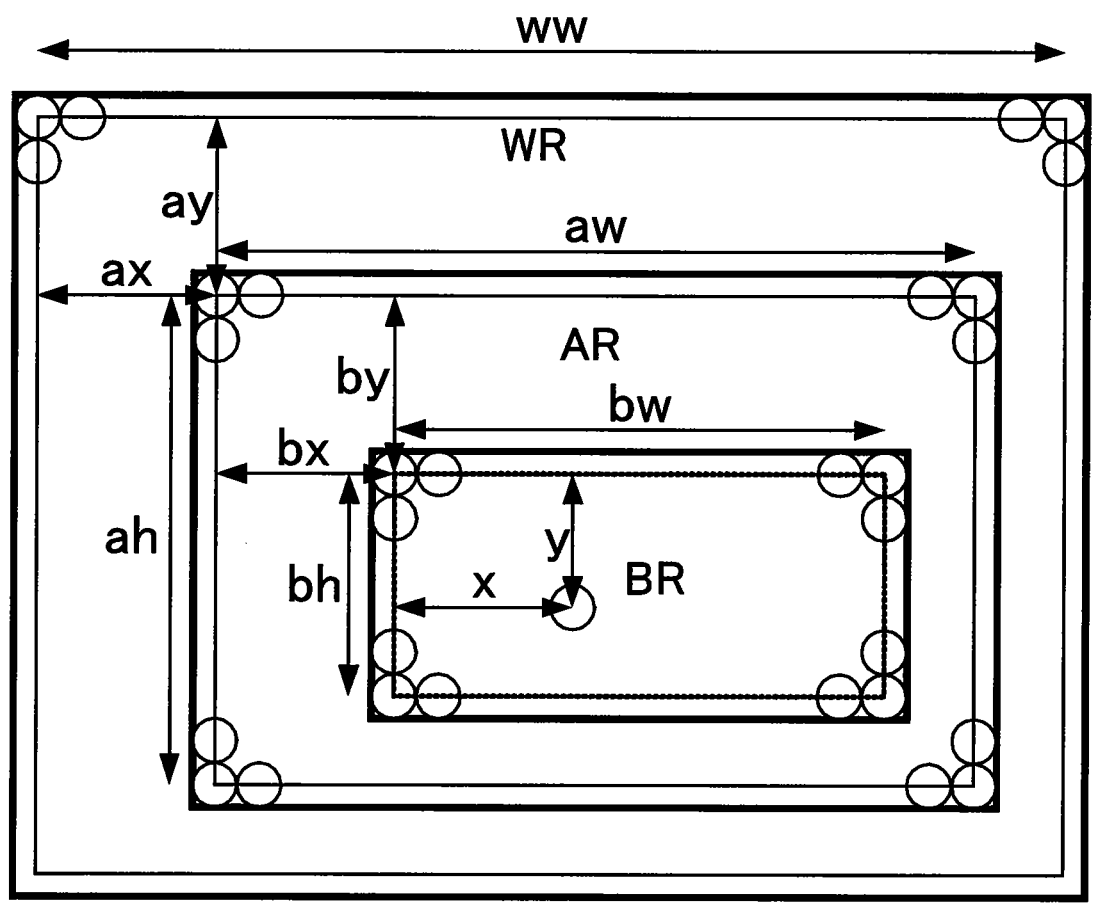
FIG. 29 is a fourth partial diagram for explaining a method of management of the storage region by an SCU shown in FIG. 3 etc.

The SCU 203_0, as explained above, can define the rectangular image regions AR and BR in the rectangular image region WR in the storage region as multiplex rectangular image regions by the two-dimensional logical address expression as shown in FIG. 29.

As values indicating positional relationships, the following coordinate values are used.

ww is the width of the rectangular image region in the x-direction of the rectangular image region WR.

ax, ay indicates the two-dimensional coordinates of the rectangular image region AR in the rectangular image region WR. This indicates the coordinates of the pixel corresponding position Pixel on the top left of the rectangular image region AR in the coordinate system having the top left of the rectangular image region WR as an origin (0, 0).

aw and ah indicate the width and height of the rectangular image region AR.

bx and by indicate the two-dimensional coordinates of the rectangular image region BR in the rectangular image region AR. These indicate the coordinates of the pixel corresponding position Pixel on the top left of the rectangular image region BR in the coordinate system having the top left of the rectangular image region AR as the origin (0, 0).

bw and bh indicate the width and height of the rectangular image region BR.

x and y indicate the two-dimensional coordinates of the pixel corresponding position Pixel in the rectangular image region BR. These are coordinates of the coordinate system having the top left of the rectangular image region BR as the origin (0, 0).

[Mode of Definition of Rectangular Image Region BR by SCU 203_0]

Figure 30:
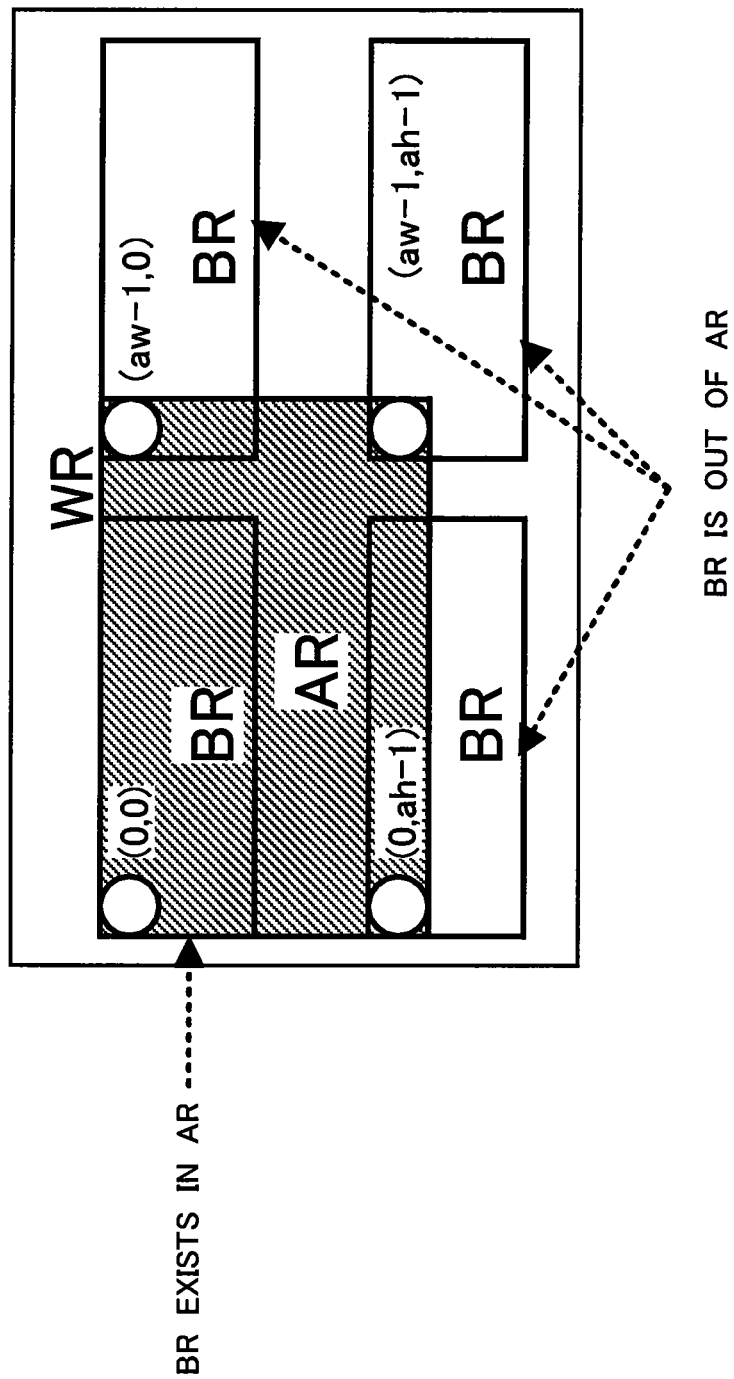
FIG. 30 is a fifth partial diagram for explaining a method of management of the storage region by an SCU shown in FIG. 3 etc.

The SCU 203_0 can designate the rectangular image region BR so that it is outside of the rectangular image region AR as shown in FIG. 30 by adjusting the values of bx, by and bw, bh.

Due to this, the SCU 203_0 can output the stream data to the PU_SIMD processing circuits #0 to #3 in a variety of formats.

Below, an explanation will be given of various types of BR modes indicating the form of designation of the rectangular image region BR by the SCU 203_0.

(Rectangular Image Region) BR Mode 1:

The SCU 203_0 can set the rectangular image region BR so that it is outside of the rectangular image region AR in the case of setting the BR mode 1.

When the rectangular image region BR is outside of the rectangular image region AR, the SCU 203_0 changes the value of the pixel data Pixel corresponding to the outside region to the previously set value (COL).

The SCU 203_0 determines the pixel data Pixel (x, y) in the rectangular image region BR as in the following Equation (7) by using the pixel data AR( ) in the rectangular image region AR.

[Equation 7]

if$((x+bx>=aw)|(y+by>ah))$pixel$(x,y)=COL$ else pixel$(x,y)=AR(x+bx,y+by)$ (7)

(Rectangular Image Region) BR Mode 2:

When set in the BR mode 2, the SCU 203_0 can set the rectangular image region BR outside of the rectangular image region AR.

Figure 31:
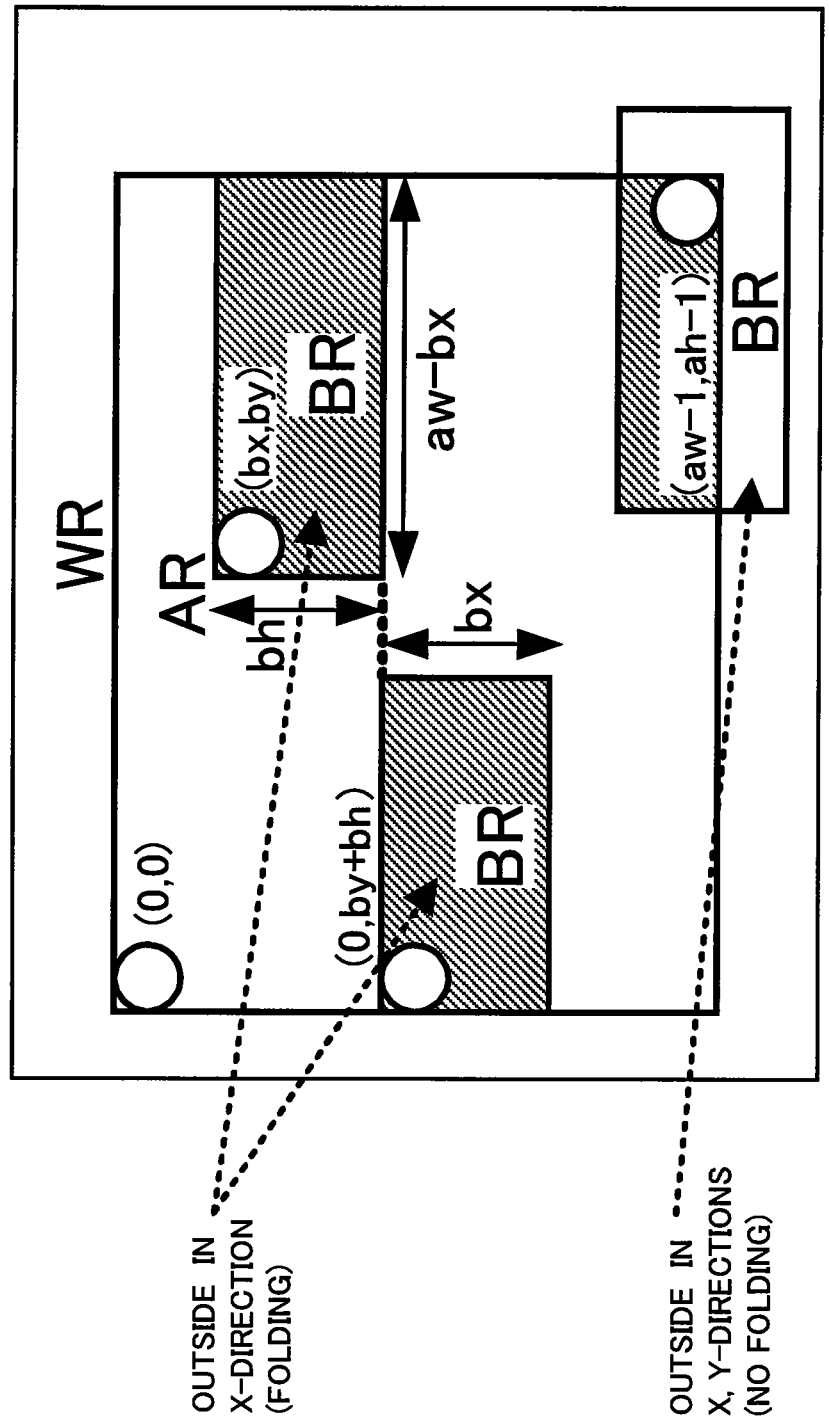
FIG. 31 is a sixth partial diagram for explaining a method of management of the storage region by an SCU shown in FIG. 3 etc.

As shown in FIG. 31, when the rectangular image region BR is outside the rectangular image region AR in the X-direction, the SCU 203_0 controls the outside region to be folded back inside the rectangular image region AR.

As shown in FIG. 31, when the rectangular image region BR is outside the rectangular image region AR in the X-direction and the Y-direction, the SCU 203_0 does not fold it back in the rectangular image region AR and sets the value of the pixel data Pixel as (COL).

The SCU 203_0 determines the pixel data Pixel (x, y) in the rectangular image region BR as in the following Equation (8) by using the pixel data AR( ) in the rectangular image region AR.

[Equation 8]

if$(aw<=x+bx)\&(y+by<=ah-bh)$pixel$(x,y)=AR(x+bx-aw,y+by+bh)$ else if$(aw<=x+bx)\&(ah-bh<y+by)$pixel$(x,y)=COL$ else if$(ah<y+bx)$pixel$(x,y)=COL$ else pixel$(x,y)=AR(x+bx,y+by)$ (8)

(Rectangular Image Region) BR Mode 3:

The SCU 203_0 cannot set the rectangular image region BR outside of the rectangular image region AR when it is set in the BR mode 3.

When a rectangular image region BR outside from the rectangular image region AR is designated, the SCU 203_0 does not guarantee the value of the pixel data Pixel (x, y) of the outside region.

Figure 32:
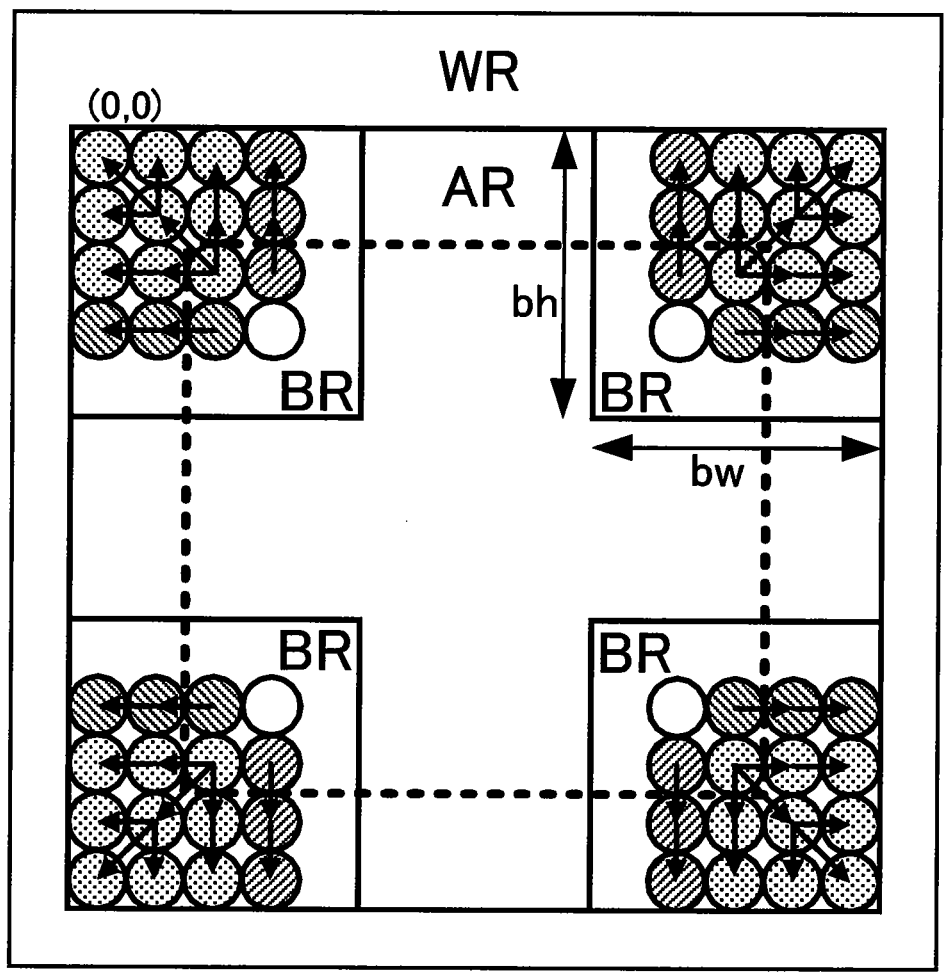
FIG. 32 is a seventh partial diagram for explaining a method of management of the storage region by an SCU shown in FIG. 3 etc.

As shown in FIG. 32, when the rectangular image region BR is set in a region at two pixel corresponding positions from the outer circumference of the rectangular image region AR, the SCU 203_0 performs a clamp operation setting the pixel data Pixel (x, y) at a pixel corresponding position in the rectangular image region BR three pixel corresponding positions inward from the outer circumference of the rectangular image region AR as the pixel data Pixel(x, y) two pixel corresponding positions from the outer circumference of the rectangular image region BR.

The pixel data Pixel (x, y) in the rectangular image region BR is defined by the following Equation (9).

For simplification, xp=x+bx; and yp=y+by are set.

[Equation 9]

if$((xp<2)\&(yp<2))$pixel$(x,y)=AR(2,2)$ else if$((2<=xp<aw-2)\&(yp<2))$pixel$(x,y)=AR(xp,2)$ else if$((aw-2<=xp)\&(yp<2))$pixel$(x,y)=AR(aw-3,2)$ else if$((xp<2)\&(2<=yp<ah-2))$pixel$(x,y)=AR(2,yp)$ else if$((aw-2<xp)\&(2<=yp<ah-2))$pixel$(x,y)=AR(aw-3,yp)$ else if$((xp<2)\&(ah-2<=yp))$pixel$(x,y)=AR(2,ah-3)$ else if$((2<=xp<aw-2)\&(ah-2<=yp))$pixel$(x,y)=AR(xp,ah-3)$ else if$((aw-2<=xp)\&(ah-2<=yp))$pixel$(x,y)=AR(aw-3,ah-3)$ else pixel$(x,y)=AR(xp,yp)$ (9)

Figure 33:
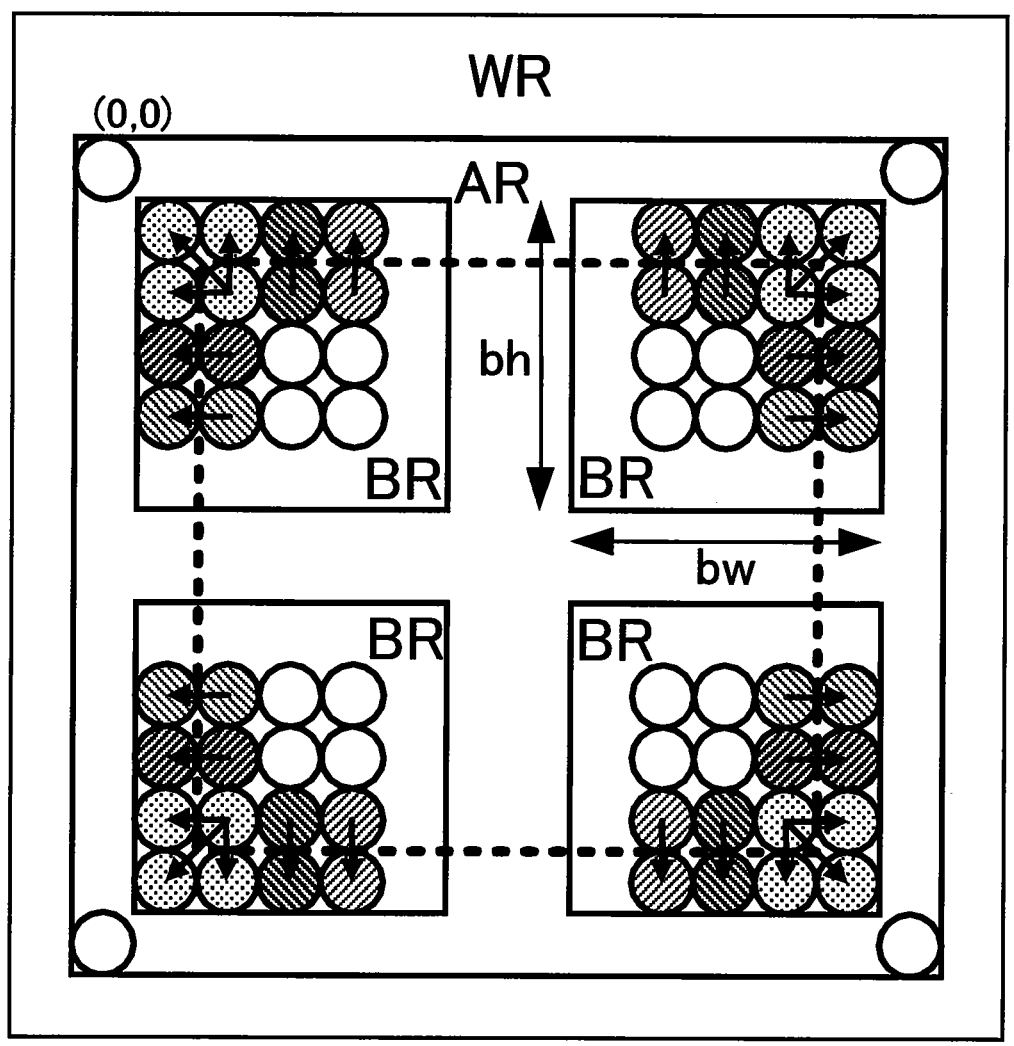
FIG. 33 is an eighth partial diagram for explaining a method of management of the storage region by an SCU shown in FIG. 3 etc.

When the rectangular image region BR is located inside from the outer circumference of the rectangular image region AR by exactly 1 pixel corresponding position, the SCU 203_0 performs the clamp operation as shown in FIG. 33.

In the present embodiment, by performing the clamp operation (processing) as explained above, when filtering etc. any rectangular image region, the pixel data outside of the rectangular image region can be suitably used instead at the outer circumference of the rectangular image region.

[Data Input Processing to PU_SIMD by SCU 203_0]

The SCU 203_0 reads out the pixel data Pixel (x, y) from the rectangular image region BR, converts this to the data stream data (performs the input data conversion processing), and inputs the same to the PU_SIMD processing circuits #0 to #3 shown in FIG. 3.

Here, the SCU 203_0 can designate the content of the conversion described above for each of the PU_SIMD #0 to #3.

The SCU 203_0 is provided with an output buffer out_buf corresponding to each of the PU_SIMD #0 to #3.

The SCU 203_0 is provided with a register for designating a rectangular image region BR.

The SCU 203_0 is provided with an input buffer in_buf corresponding to each of the PU_SIMD #0 to #3.

The SCU 203_0 reads out the pixel data Pixel(x, y) from the rectangular image region BR, applies rearrangement or other data conversion processing to this, and then writes it into the output buffer out_buf shown in FIG. 27 as stream data.

The SCU 203_0 writes the register value for designating the rectangular image region BR into the output buffer out_buf as the stream data.

The SCU 203_0 reads out the pixel data Pixel (x, y) from the rectangular image region BR, applies rearrangement or other data conversion processing to this, then writes it into the register for designating the rectangular image region BR existing in the SCU 203_0.

The SCU 203_0 applies the data conversion processing to the data read out from the input buffer in_buf, then writes the result as the stream data into the output buffer out_buf.

The SCU 203_0 performs, as the above input data conversion processing, that is, the conversion processing to the data stream for writing the data into the PU_SIMD #0 to #3, for example, the input data conversion processing in accordance with the input data conversion command shown in the following Table 2.

The SCU 203_0 receives as input and executes the input data conversion command from the host processor 101 shown in FIG. 1.

The SCU 203_0 can designate the tributary parameter shown in Table 3 in each input data conversion command shown in Table 2.

TABLE 2

| Input data conversion command. | BR region width bw | BR region height bh |
| --- | --- | --- |
| set_BR_1of4x4_same | 4 | 4 |
| set_bxy | 4 | 4 |
| set_BR_8x1_to_bxy | 8 | 1 |
| set_BR4567_1of4x4 | 4 | 4 |
| set_in_buf_straight | Definition is unnecessary | Definition is unnecessary |
| set_in_buf_with_BR_2x1 | 2 | 1 |
| set_in_buf_with_BR_4x1 | 4 | 1 |
| set_BR_16x1 | 16 | 1 |
| set_BR_32x1 | 32 | 1 |
| set_BR_64x1 | 64 | 1 |
| set_BR_64x2 | 128 | 1 |
| set_BR_64x2x2 | 128 | 2 |

TABLE 2-continued

| Input data conversion command. | BR region width bw | BR region height bh |
| --- | --- | --- |
| set_BR_64x3 | 192 | 1 |
| set_BR_64x3x3 | 192 | 3 |
| set_BR_64x4 | 256 | 1 |
| set_BR_64x4x4 | 256 | 4 |
| set_BR_64x9 | 576 | 3 |
| set_BR_64x9x3 | 576 | 6 |

TABLE 3

| Tributary parameter of input data conversion command | Remarks |
| --- | --- |
| BR_num | BR number (0 . . . 7) |
| csel[1:0] | Pixel designation in BR region, selection of 1 pixel from among 4 pixels continuing in x-direction at maximum |
| xsel[3:0] | Pixel designation in BR region, selection of 1 pixel from among 16 pixels in x-direction at maximum |
| ysel[2:0] | Pixel designation in BR region, selection of 1 pixel from among 8 pixels in y-direction at maximum |
| Wsel | Format designation of 64 pixels written into out_buf Case of 0: 64 pixels generated by input data conversion are loaded as they are to out_buf Case of 1: LSB4 bits of each pixel in 64 pixels generated by input data conversion are packed and only 16 pixels are loaded onto out_buf |
| ld[15:0] | Load control dividing 64 pixels of out_buf for each 4 pixels Control simultaneous load of 4 pixels by 1 bit of load Load of ld[n]: pixel (4(n − 1): 4n − 1), note, 0 <= n <= 16 |

The input data conversion processings based on the data conversion commands shown in Table 2 will be explained next.

[set#BR#lof4x4#same]

Figure 34:
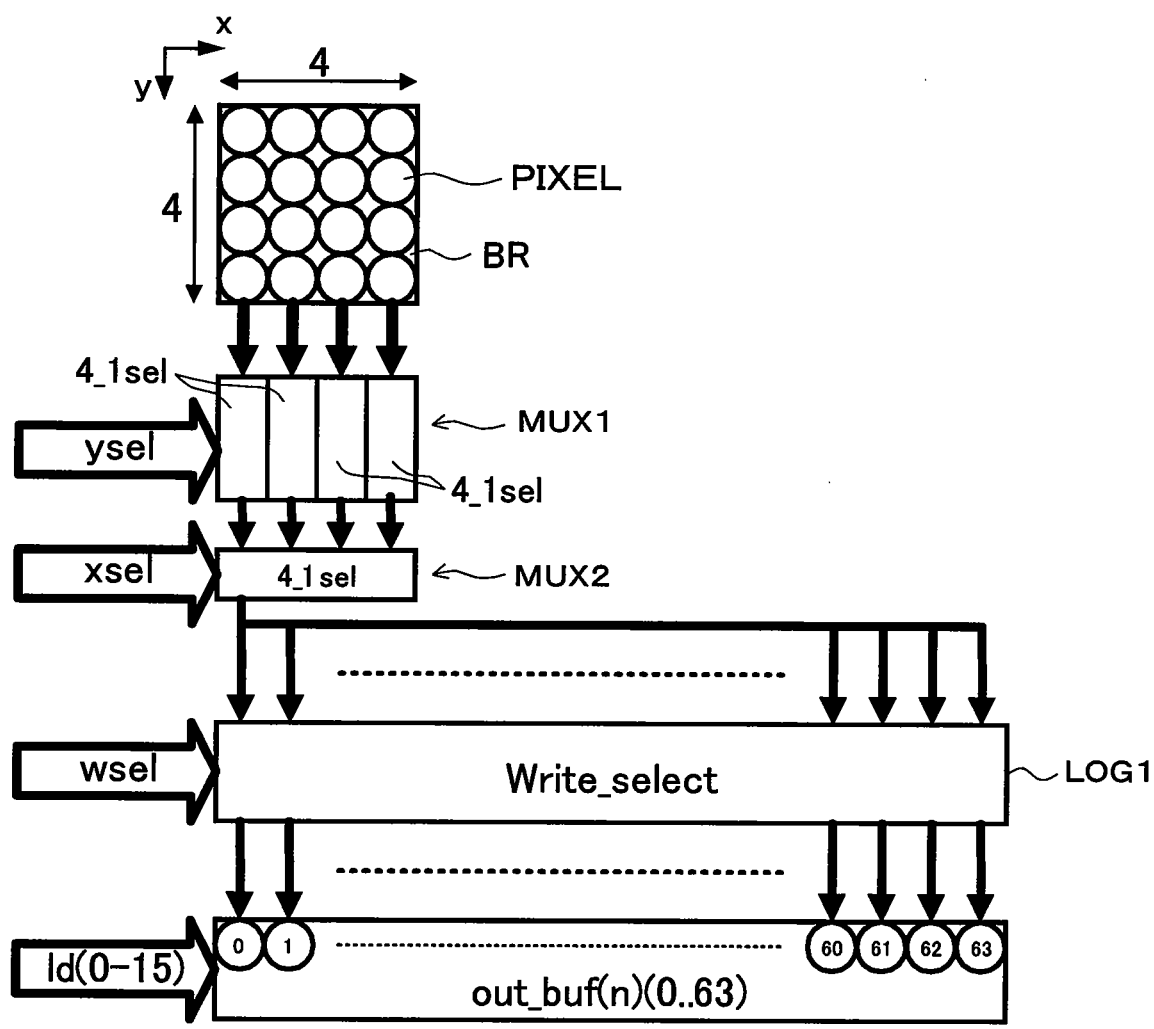
FIG. 34 is a diagram for explaining processing for execution of a command "set_BR_lof4x4_sam" by an SCU shown in FIG. 3 etc.

The SCU 203_0, when executing for example the input data conversion command "set#BR#lof4x4#same" from the host processor 101, as shown in FIG. 34, reads out the pixel data Pixel from 1 pixel corresponding position in the rectangular image region BR designated by the tributary parameter thereof, copies 64 pixel data to generate pixel data Pixel (0, . . . , 63), and inputs these via the output buffer out_buf to the PU_SIMD processing circuits #0 to #3 after the bit selection inside the pixel data.

The SCU 203_0 specifies the rectangular image region BR of the 4x4 pixel corresponding positions by the tributary parameter BR#num.

The SCU 203_0 has multiplexers MUX1 and MUX2 and a logical circuit LOG1.

The multiplexer MUX1 reads out the pixel data Pixel of 4 pixel corresponding positions in the x-direction from the above specified rectangular image region BR by the tributary parameter ysel.

Then, the multiplexer MUX2 selects one pixel data Pixel from among the read four pixel data Pixel in the x-direction described above according to the tributary parameter xsel and outputs the same to the logical circuit LOG1.

The logical circuit LOG1 writes 64 pixel data Pixel each indicating the above selected one pixel data Pixel into the output buffer out_buf by the tributary parameter wsel.

The logical circuit LOG1 determines whether to write the 64 pixel data Pixel into the output buffer out_buf as they are or to pack 4 bits from the LSB of each pixel data Pixel and store the same in the 16 pixel data Pixel according to the tributary parameter wsel.

The SCU 203_0 performs the load control for each 4 pixel data Pixel by the tributary parameter ld.

[set#bxy]

Figure 35:
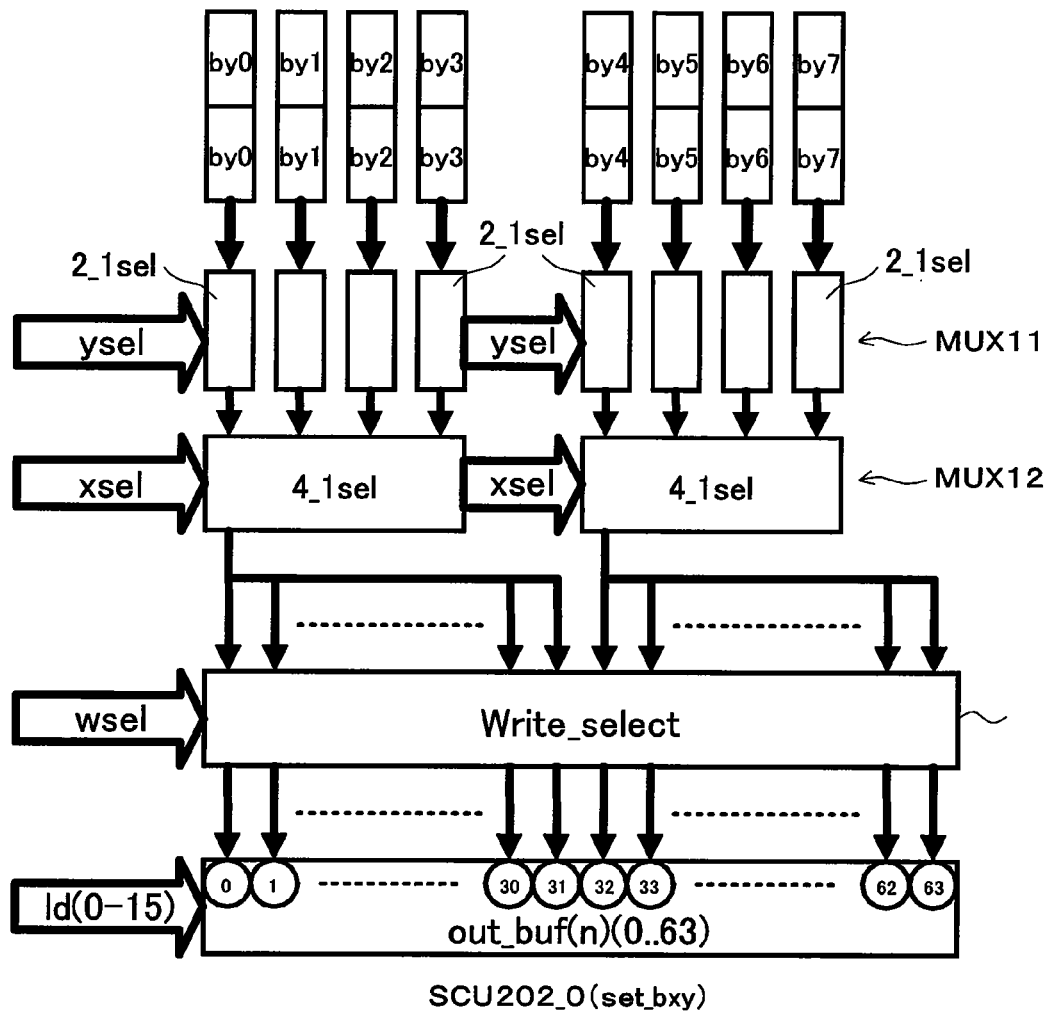
FIG. 35 is a diagram for explaining processing for execution of a command "Set_bxy" by an SCU shown in FIG. 3 etc.

The SCU 203_0, when executing for example the input data conversion command "set#bxy" from the host processor 101, as shown in FIG. 35, copies 32 left end coordinates (bx, by) of the rectangular image region BR selected by the tributary parameter xsel, ysel to generate stream data of 64 pixel data and, after the bit selection inside the pixel data by the tributary parameter wsel, sets the same in the output buffer out_buf by the tributary parameter ld.

In the present embodiment, as the rectangular image region BR, 8 types in which left end coordinates are different are prepared.

The SCU 203_0 is provided with registers by0 to by7 for designating values in the y-direction of the rectangular image region BR and registers bx0 to bx7 for designating the values in the x-direction.

The SCU 203_0 has eight multiplexers MUX11.

Each of the multiplexers MUX11 selects one of the value of the register by and the value of the register xy corresponding to each by the tributary parameter yel and outputs the same to the multiplexer MUX12.

The SCU 203_0 is provided with two multiplexers MUX12.

The multiplexer MUX12 selects one among values input from the four multiplexers MUX11 by the tributary parameter xsel and outputs the same to the logical circuit LGO31.

The logical circuit LOG31 determines whether to write 64 pixel data into the output buffer out_buf as they are or to pack 4 bits from the LSB of each pixel data Pixel and store the same in the 16 pixel data Pixel by the tributary parameter wsel.

The SCU 203_0 performs the load control into the PU_SIMD processing circuits #0 to #3 from the output buffer out_buf for each 4 pixel data Pixel according to the tributary parameter ld.

In this way, the reason why the left end coordinates of the rectangular image region BR are output to the PU_SIMD processing circuits #0 to #3 is that the related coordinates are used for the processing in the filtering etc. in the PEs of the PU_SIMD processing circuits #0 to #3.

[set#BR#8x1#t0#bxy]

Figure 36:
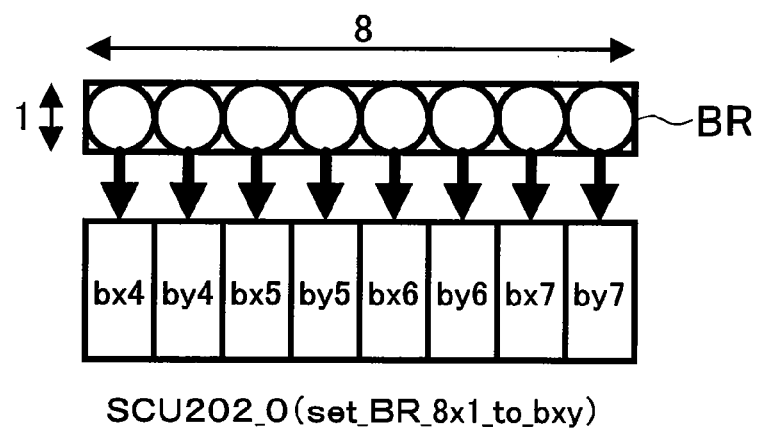
FIG. 36 is a diagram for explaining processing for execution of a command "set_BR__8x1#to#bxy" by an SCU shown in FIG. 3 etc.

The SCU 203_0, when executing the input data conversion command "set#BR#8x1#t0#bxy" from the host processor 101, for example, as shown in FIG. 36, handles 2 pixels continuing in the x-direction in the rectangular image region BR as coordinates, therefore selects 8 pixel data Pixel from among the rectangular image regions BR4 to BR7 selected by BR#num and sets the same in the left end coordinates (bx, by) of the rectangular image region BR.

This is to accomplish the memory indirect address by designation by combination with the input data conversion command "WI#data#op=set#BR4567#lof4x4" explained later.

Namely, in this example, in the rectangular image region BR, the left end coordinates of the rectangular image region BR are stored as the pixel data.

[set#BR4567#lof4x4]

Figure 37:
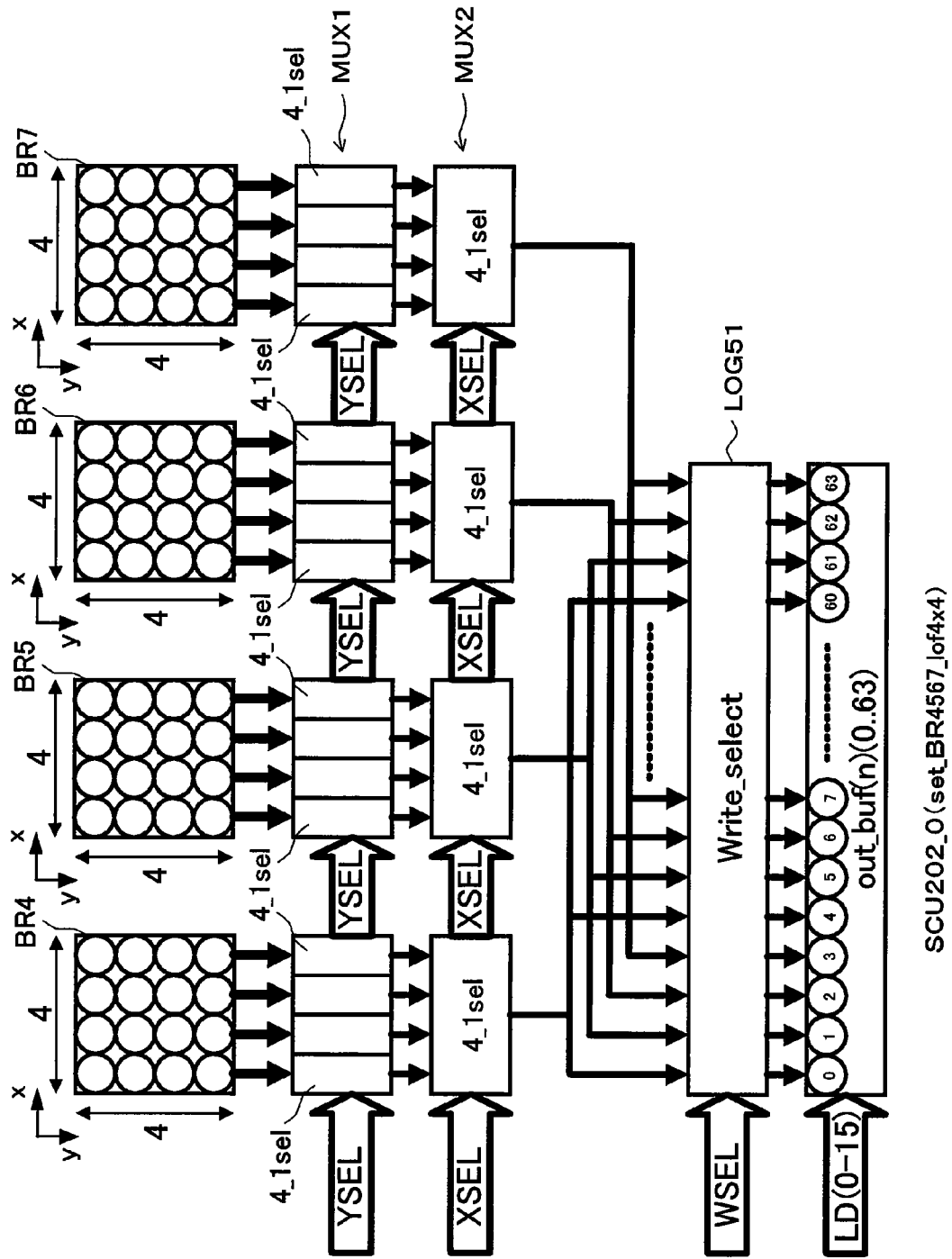
FIG. 37 is a diagram for explaining processing for execution of a command "set_BR4567#lof4x4" by an SCU shown in FIG. 3 etc.

The SCU (Stream Control Unit) 203_0, when executing the input data conversion command "set#BR4567#lof4x4" from the host processor 101, for example, as shown in FIG. 37, uses the tributary parameter xsel, ysel to read out each pixel data from four rectangular image regions BR by the multiplexers MUX1 and MUX2 and outputs them to the logical circuit LOG51.

The logical circuit LOG51 writes the pixel data input from the SCU 203_0 to the predetermined bit position of the output buffer out_buf by the tributary parameter wsel.

The logical circuit LOG51 determines whether to write 64 pixel data into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD #0 to #3 for each 4 pixel data by the tributary parameter ld.

In this example, the above memory indirect address is realized by using as the left end coordinates of the above four rectangular image regions BR those set by the above "set#BR#8x1#t0#bxy".

[set#in#buf#straight]

Figure 38:
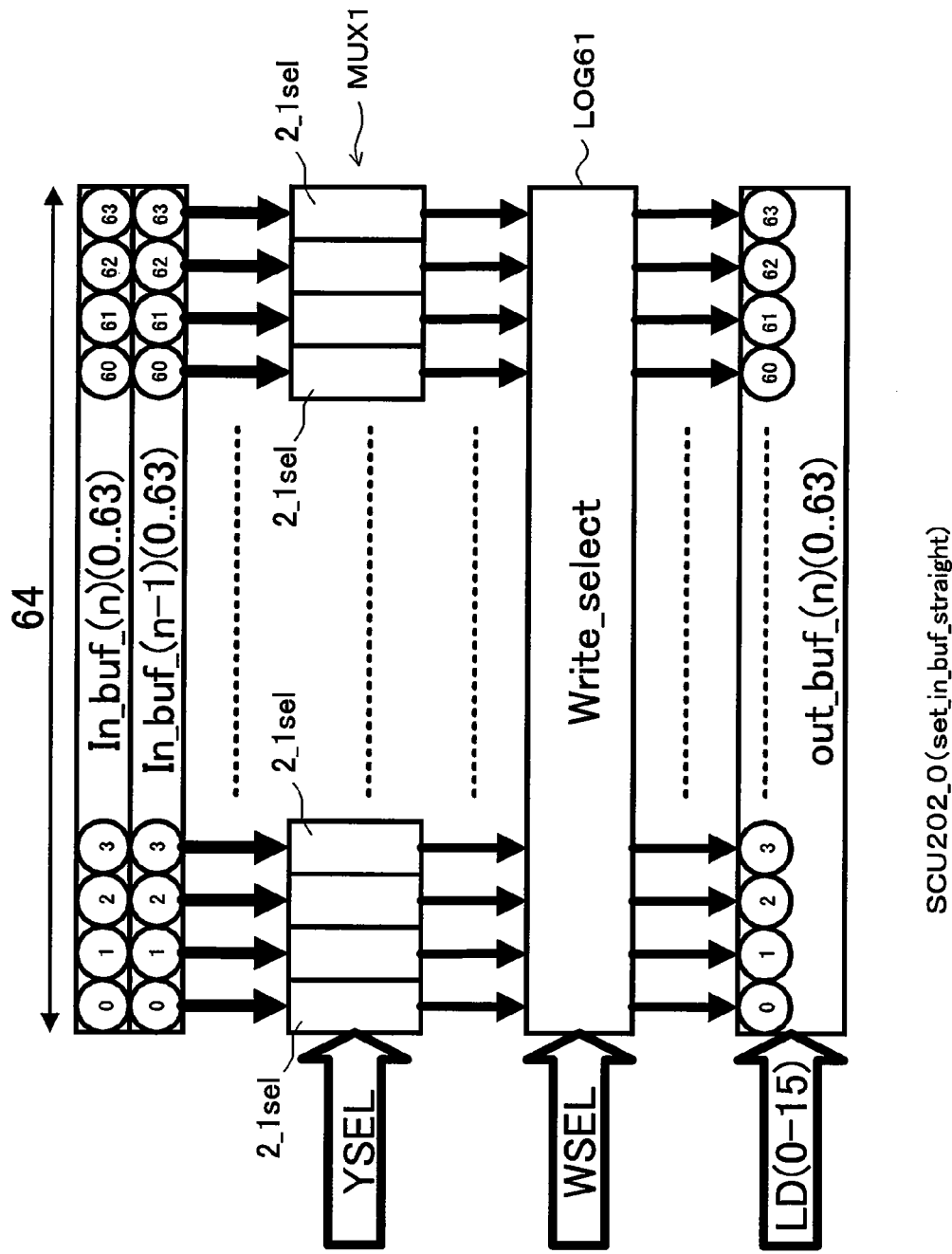
FIG. 38 is a diagram for explaining processing for execution of a command "set_in#buf#straight" by an SCU shown in FIG. 3 etc.

The SCU 203_0, when executing the input data conversion command "set#in#buf#straight" from the host processor 101, for example, as shown in FIG. 38, selects two input buffers in_buf(n), (n−1) from among the four input buffers in_buf provided for each of the PU_SIMD s #0 to #3.

Each of the input buffers in_buf(n), (n−1) has a size of 1 (height)x64 (width) pixel data.

The SCU 203_0 is provided with 64 multiplexers MUX1.

Each of the 64 multiplexers MUX1 selects one pixel data from between corresponding two pixel data of the input buffers in_buf(n), (n−1) by the tributary parameter ysel and outputs the same to the logical circuit LOG61.

The logical circuit LOG61 determines whether to write 64 pixel data into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD processing circuits #0 to #3 for each 4 pixel data by the tributary parameter ld.

By the input data conversion command "set#in#buf#straight", the input/output of data among the PU_SIMD processing circuits #0 to #3 shown in FIG. 3 becomes possible. Further, by the related input data conversion command "set#in#buf#straight", it can be programmed (defined) whether the PU_SIMD #0 to #3 are connected in series or in parallel.

[set#in#buf#with#BR#2x1]

Figure 39:
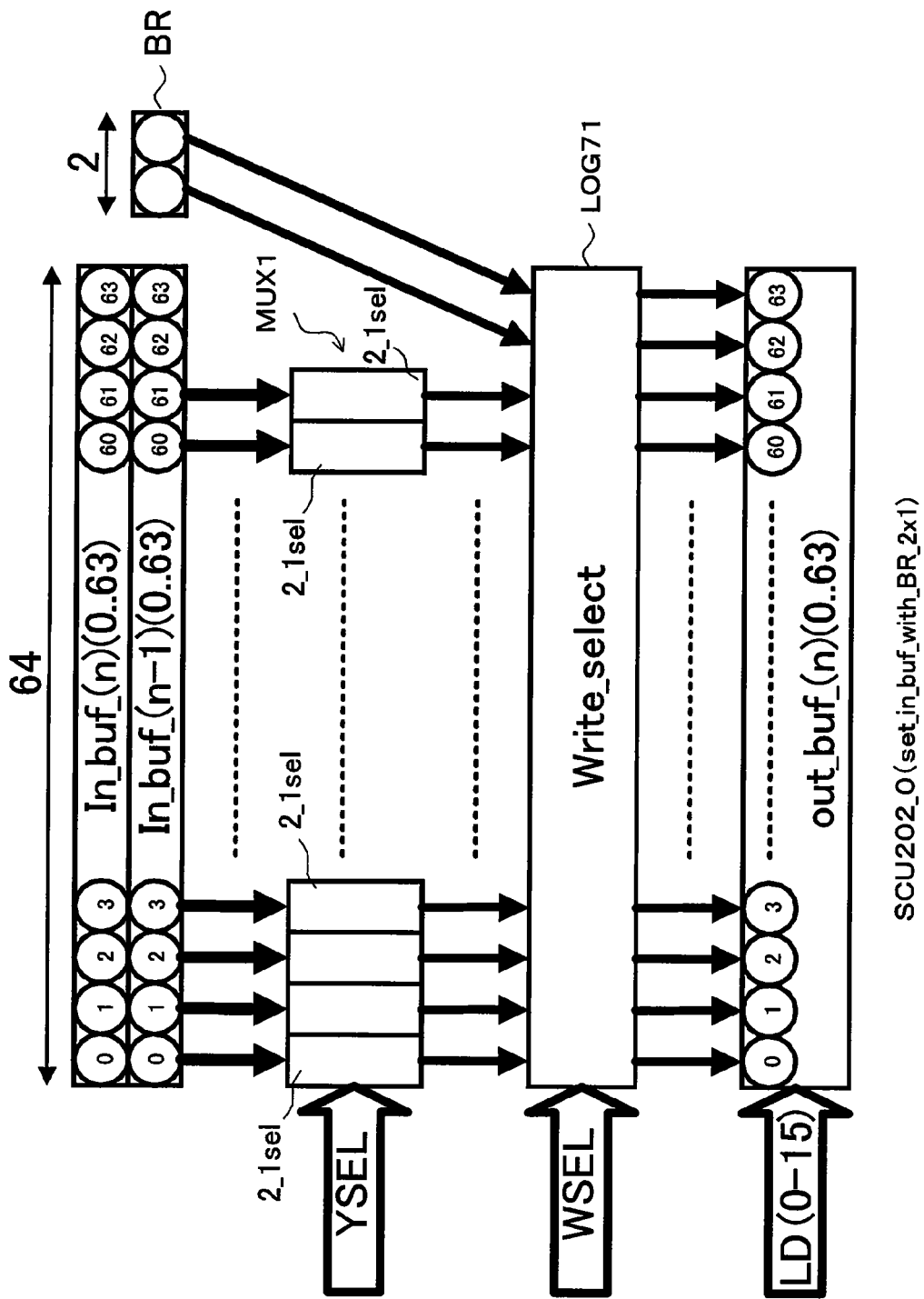
FIG. 39 is a diagram for explaining processing for execution of a command "set_in#buf#with#BR#2x1" by an SCU shown in FIG. 3 etc.

The SCU 203_0, when executing the input data conversion command "set#in#buf#with#BR#2x1", for example, as shown in FIG. 39, selects two input buffers in_buf(n), (n−1) from among four input buffers in_buf provided for each of the PU_SIMD s #0 to #3.

Each of the input buffers in_buf(n), (n−1) has a size of 1 (height)x64 (width) pixel data.

The SCU 203_0 is provided with 62 multiplexers MUX1.

Each of the 62 multiplexers MUX1 selects one pixel data between corresponding two pixel data of the input buffers in_buf(n), (n−1) by the tributary parameter ysel and outputs the same to the logical circuit LOG71.

The logical circuit LOG71 determines whether to write 64 pixel data in total of 62 pixel data and 2 pixel data read out from the rectangular image region BR selected by the tributary parameter BR#num into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD processing circuits #0 to #3 for each 4 pixel data by the tributary parameter ld.

[set#in#buf#with#BR#4x1]

Figure 40:
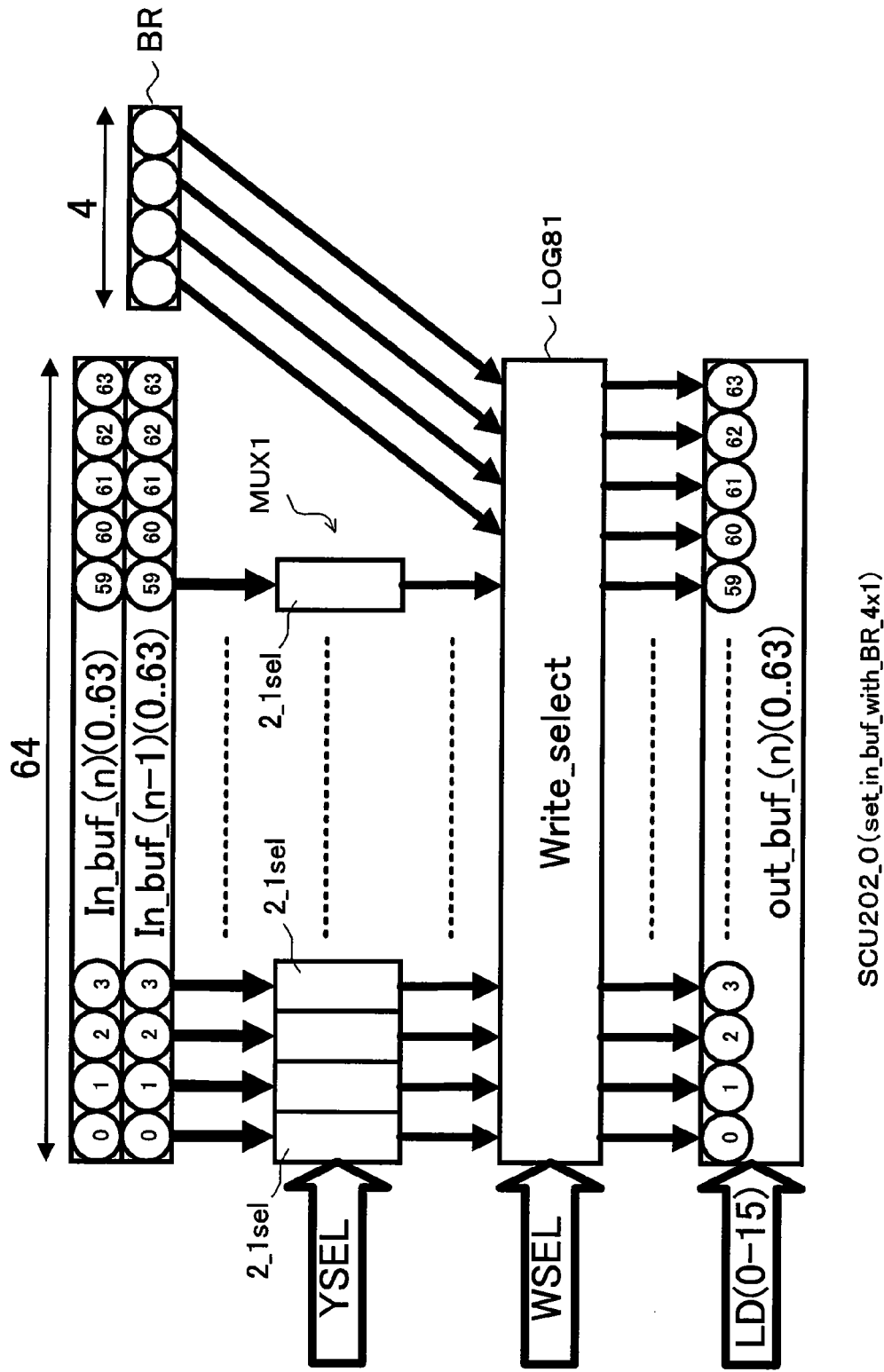
FIG. 40 is a diagram for explaining processing for execution of a command "set_in#buf# with#BR#4x1" by an SCU shown in FIG. 3 etc.

The SCU 203_0, when executing the input data conversion command "set#in#buf#with#BR#4x1", for example, as shown in FIG. 40, selects two input buffers in_buf(n), (n−1) from among the four input buffers in_buf provided for each of the PU_SIMDs #0 to #3.

Each of the input buffers in_buf(n), (n−1) has a size of 1 (height)x64 (width) pixel data.

The SCU 203_0 is provided with 60 multiplexers MUX1.

Each of the 60 multiplexers MUX1 selects one pixel data between corresponding two pixel data of the input buffers in_buf(n), (n−1) by the tributary parameter ysel and outputs the same to the logical circuit LOG81.

The logical circuit LOG81 determines whether to write 64 pixel data in total of 60 pixel data and 4 pixel data read out from the rectangular image region BR selected by the tributary parameter BR#num into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD processing circuits #0 to #3 for each 4 pixel data by the tributary parameter ld.

[set#BR#16x1]

Figure 41:
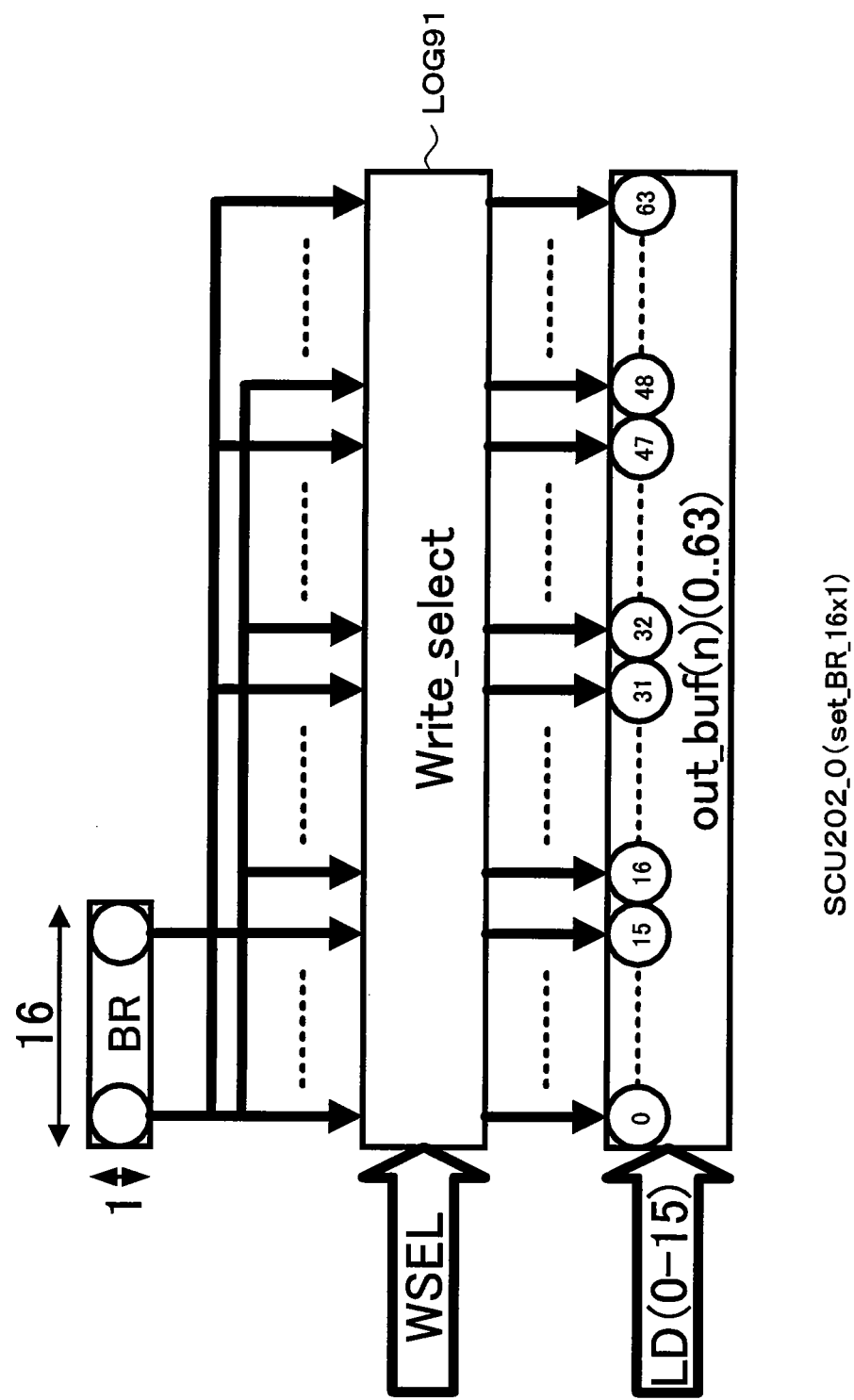
FIG. 41 is a diagram for explaining processing for execution of a command "set_BR#16x1" by an SCU shown in FIG. 3 etc.

The SCU 203_0, when executing the input data conversion command "set#BR#16x1" from the host processor 101, for example, as shown in FIG. 41, copies 16 pixel data in the rectangular image region BR selected by the tributary parameter BR#num 4 times to generate the stream data of 64 pixel data and writes this into the output buffer out_buf after undergoing the predetermined pixel data selection processing.

The logical circuit LOG91 receives as input the 64 pixel data obtained by copying 16 pixel data in the rectangular image region BR selected by the tributary parameter BR#num 4 times and determines whether to write 64 pixel data into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD processing circuits #0 to #3 for each 4 pixel data by the tributary parameter ld. Accordingly, it is also possible to write the data copied 4 times for each of the 16 pixels with respect to out#buf.

[set#BR#32x1]

Figure 42:
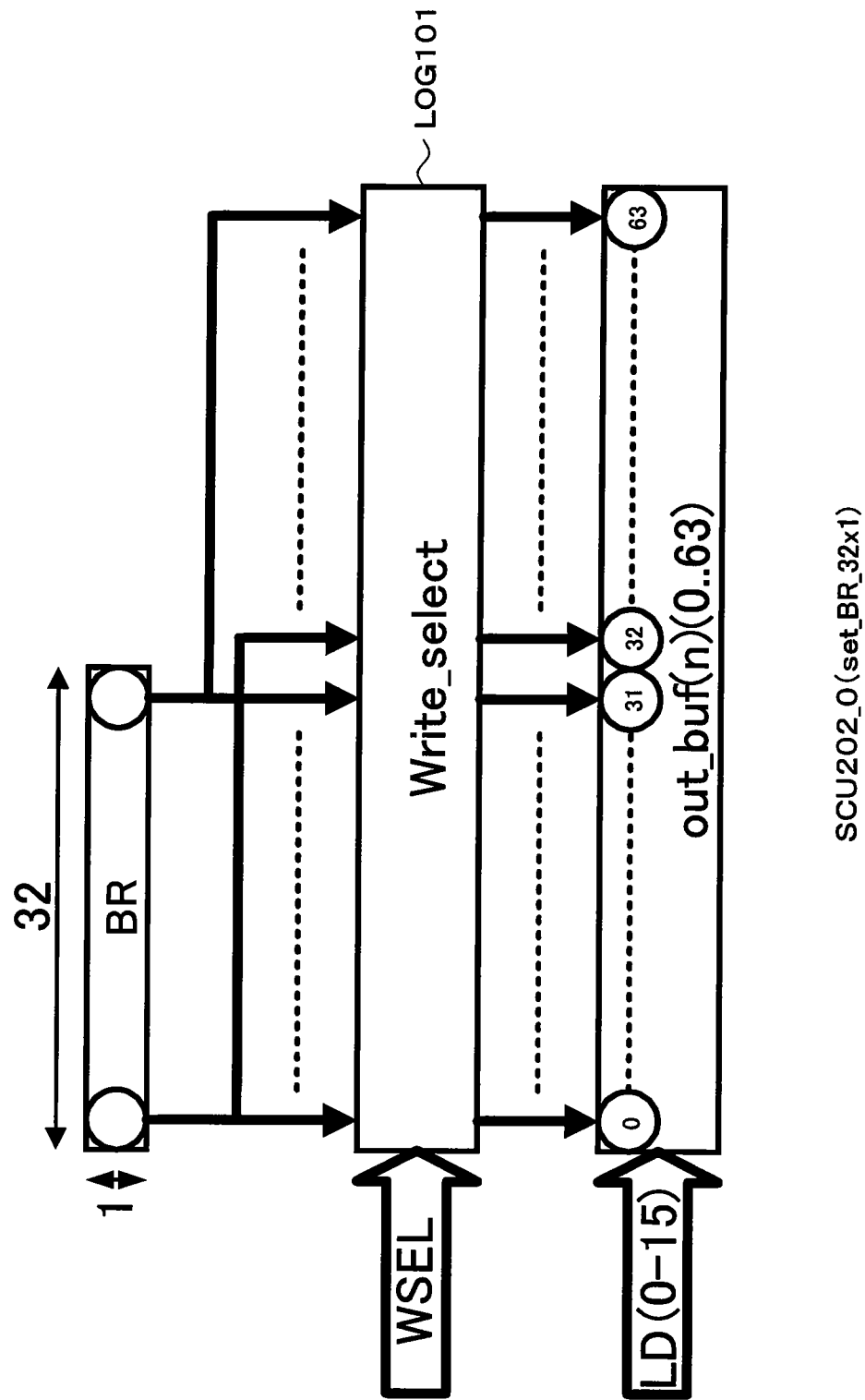
FIG. 42 is a diagram for explaining processing for execution of a command "set_BR#32x1" by an SCU shown in FIG. 3 etc.

The SCU 203_0, when executing the input data conversion command "set#BR#32x1" from the host processor 101, for example, as shown in FIG. 42, copies 32 pixel data in the rectangular image region BR selected by the tributary parameter BR#num 2 times to generate the stream data of 64 pixel data and writes this into the output buffer out_buf after undergoing the predetermined pixel data selection processing.

The logical circuit LOG101 receives as input 64 pixel data obtained by copying 36 pixel data in the rectangular image region BR selected by the tributary parameter BR#num 2 times and determines whether to write 64 pixel data into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD processing circuits #0 to #3 for each 4 pixel data by the tributary parameter ld. Accordingly, it is also possible to write the data copied 2 times for each 32 pixels with respect to out#buf.

[set#BR#64x1]

Figure 43:
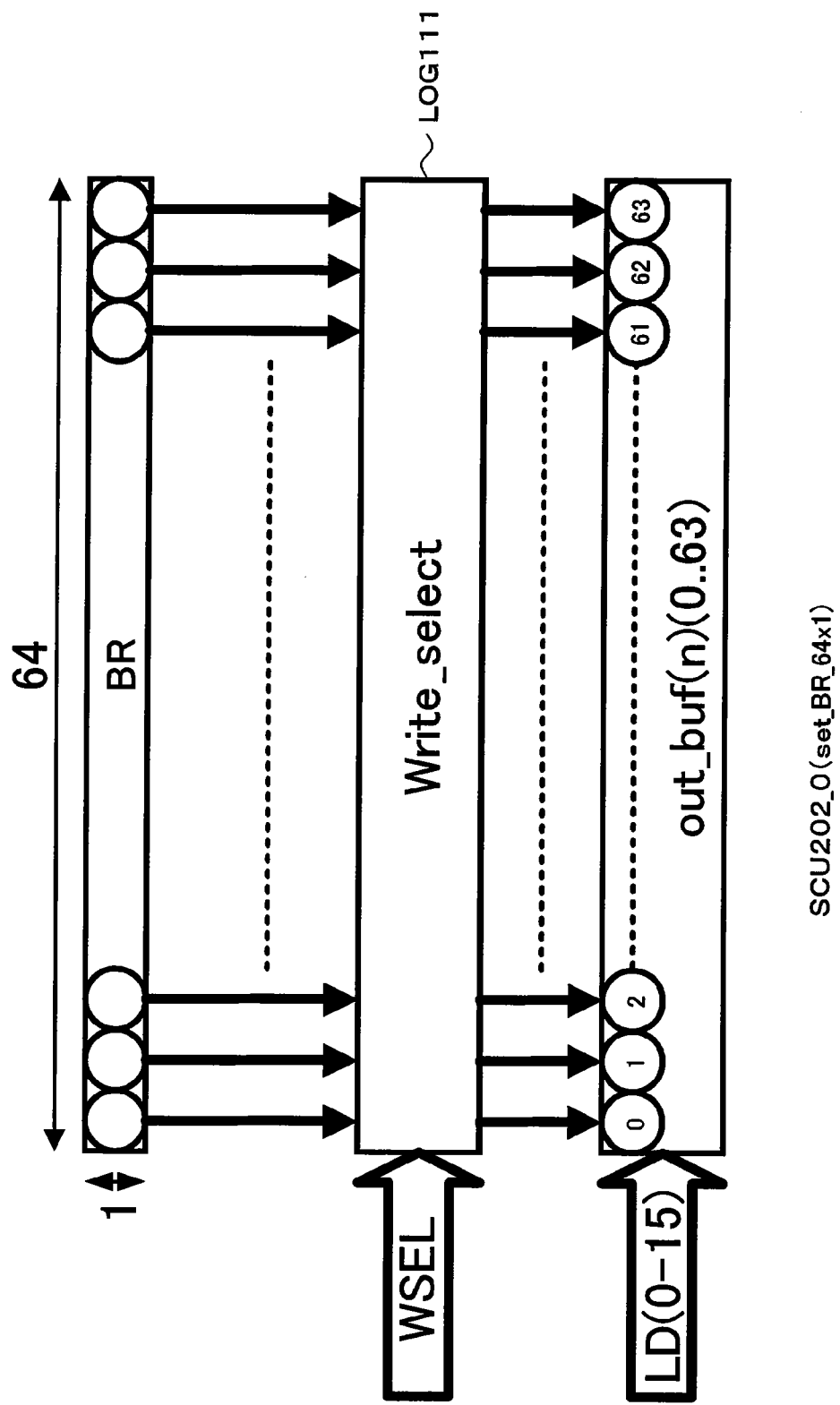
FIG. 43 is a diagram for explaining processing for execution of a command "set_BR#64x1" by an SCU shown in FIG. 3 etc.

The SCU 203_0, when executing the input data conversion command "set#BR#64x1" from the host processor 101, for example, as shown in FIG. 43, generates the stream data of 64 pixel data in the rectangular image region BR selected by the tributary parameter BR#num and writes this into the output buffer out_buf after undergoing the predetermined pixel data selection processing.

The logical circuit LOG111 receives as input 64 pixel data in the rectangular image region BR selected by the tributary parameter BR#num and determines whether to write 64 pixel data into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD processing circuits #0 to #3 for each 4 pixel data by the tributary parameter ld.

[set#BR#64x2]

Figure 44:
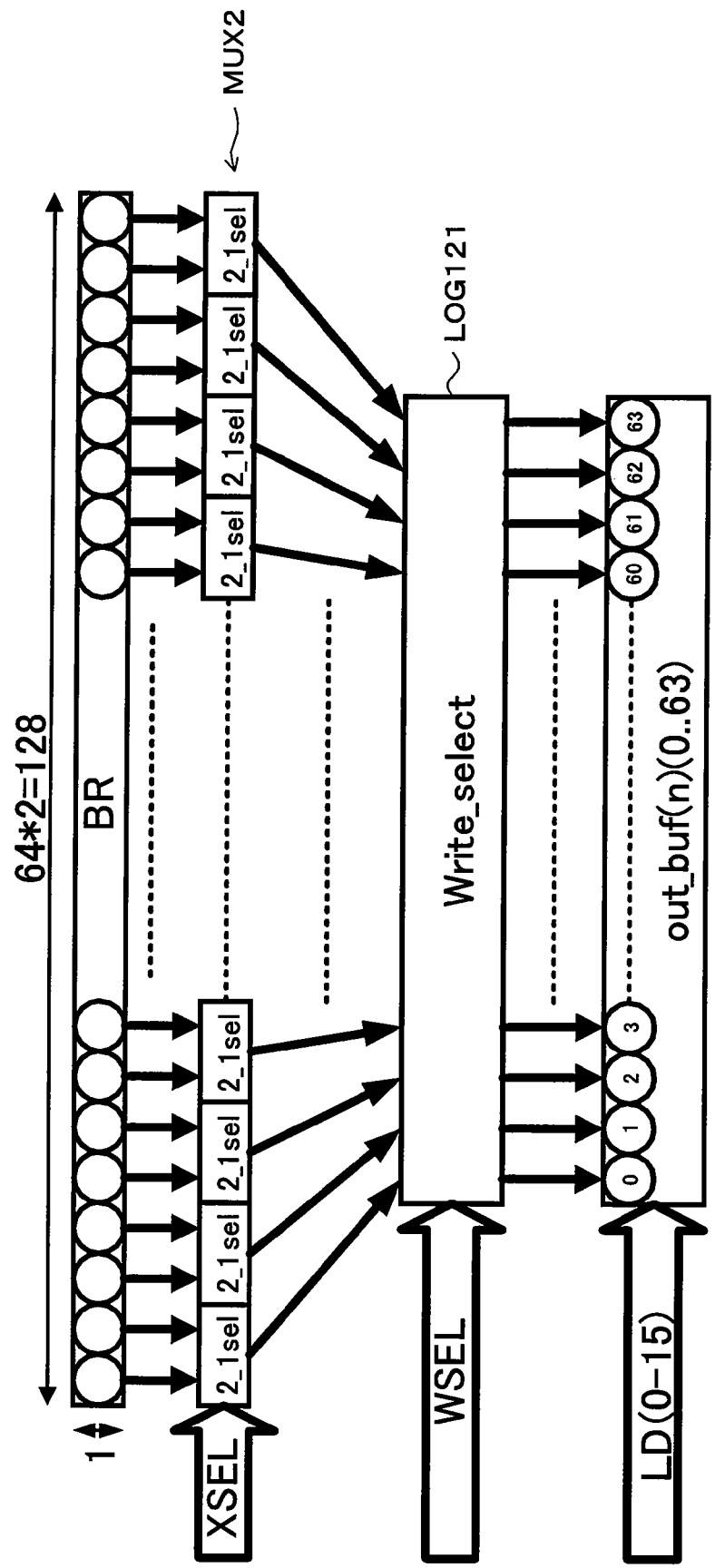
FIG. 44 is a diagram for explaining processing for execution of a command "set_BR#64x2" by an SCU shown in FIG. 3 etc.

The SCU 203_0, when executing the input data conversion command "set#BR#64x2" from the host processor 101, for example, as shown in FIG. 44, selects 64 pixel data from among 128x1 pixel data in the rectangular image region BR selected by the tributary parameter BR#num by the tributary parameter xsel to generate the stream data and writes this into the output buffer out_buf after undergoing the predetermined pixel data selection processing.

Each of the 64 multiplexers MUX2 receives as input 2 pixel data adjacent in the x-direction in the rectangular image region BR selected by the tributary parameter BR#num, selects 1 pixel data by the tributary parameter xsel, and outputs the same to the logical circuit LOG121.

The logical circuit LOG121 determines whether to write the 64 pixel data input from 64 multiplexers MUX2 into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD #0 to #3 for each 4 pixel data by the tributary parameter ld.

[set#BR#64x2x2]

Figure 45:
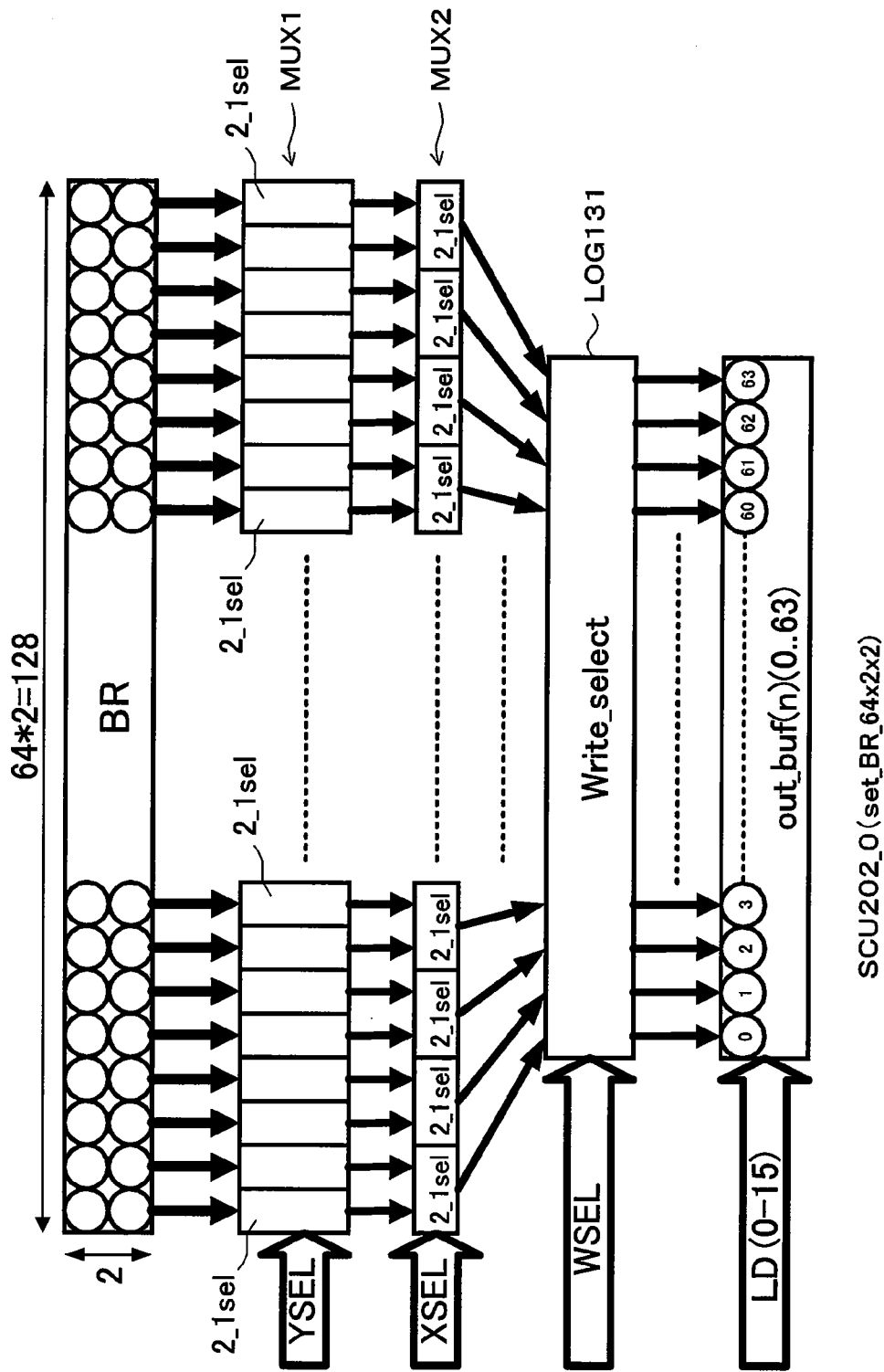
FIG. 45 is a diagram for explaining processing for execution of a command "set_BR#64x2x2" by an SCU shown in FIG. 3 etc.

The SCU 203_0, when executing the input data conversion command "set#BR#64x2x2" from the host processor 101, for example, as shown in FIG. 45, selects 64 pixel data from among the 128x2 pixel data in the rectangular image region BR selected by the tributary parameter BR#num by the tributary parameter xsel to generate the stream data and writes this into the output buffer out_buf after undergoing the predetermined pixel data selection processing.

Each of the 128 multiplexers MUX1 receives as input 2 pixel data adjacent in the y-direction in the rectangular image region BR selected by the tributary parameter BR#num, selects 1 pixel data by the tributary parameter ysel, and outputs the same to 64 multiplexers MUX2.

Each of the 64 multiplexers MUX2 selects one pixel data between two pixel data adjacent in the x-direction by the tributary parameter xsel and outputs the same to the logical circuit LOG131.

The logical circuit LOG131 determines whether to write the 64 pixel data input from 64 multiplexers MUX2 into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD processing circuits #0 to #3 for each 4 pixel data by the tributary parameter ld.

[set#BR#64x3]

Figure 46:
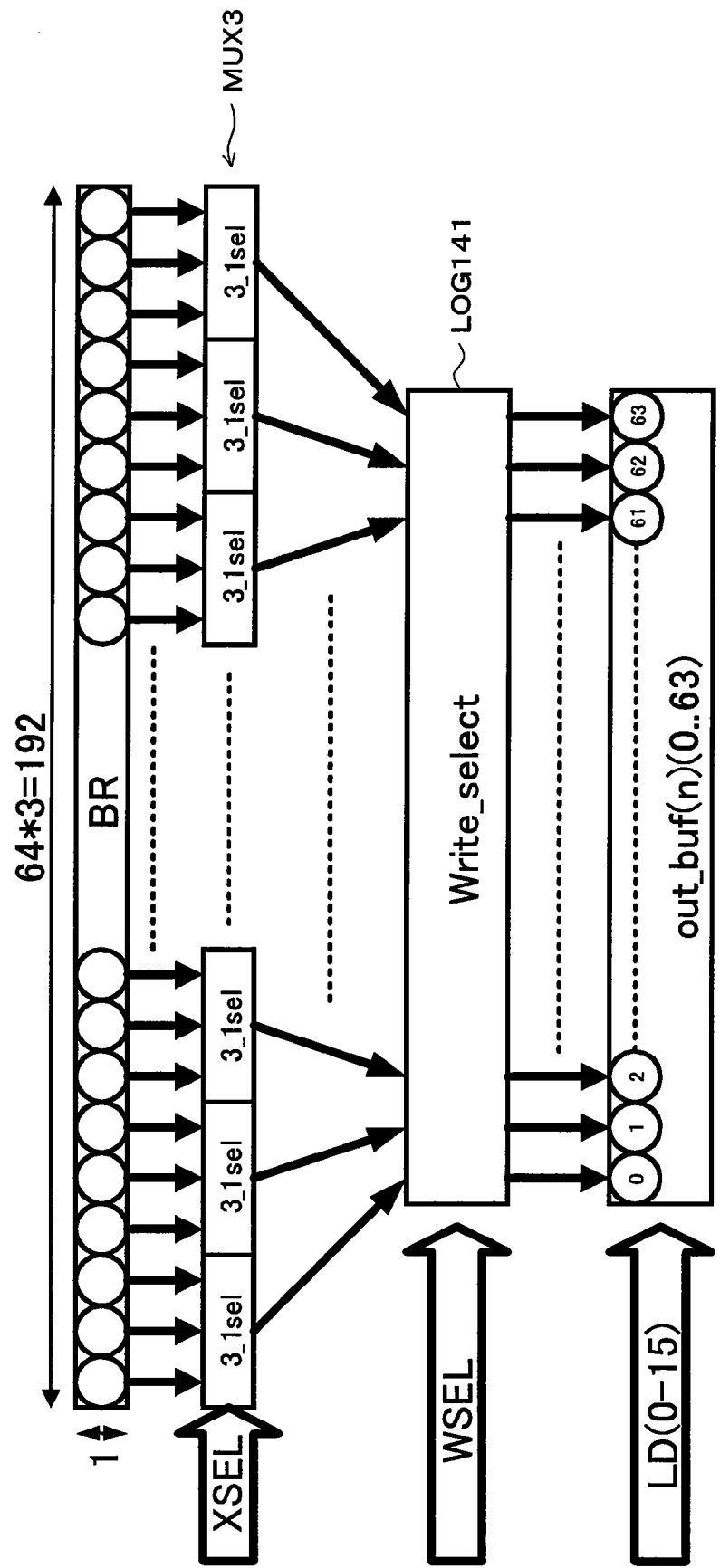
FIG. 46 is a diagram for explaining processing for execution of a command "set_BR#64x3" by an SCU shown in FIG. 3 etc.

The SCU 203_0, when executing the input data conversion command "set#BR#64x3" from the host processor 101, for example, as shown in FIG. 46, selects 64 pixel data from among the 129x1 pixel data in the rectangular image region BR selected by the tributary parameter BR#num by the tributary parameter xsel to generate the stream data and writes this into the output buffer out_buf after undergoing the predetermined pixel data selection processing.

Each of the 64 multiplexers MUX3 receives as input 3 pixel data adjacent in the x-direction in the rectangular image region BR selected by the tributary parameter BR#num, selects 1 pixel data by the tributary parameter xsel, and outputs the same to the logical circuit LOG141.

The logical circuit LOG141 determines whether to write 64 pixel data input from 64 multiplexers MUX3 into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD #0 to #3 for each 4 pixel data by the tributary parameter ld.

[set#BR#64x3x3]

Figure 47:
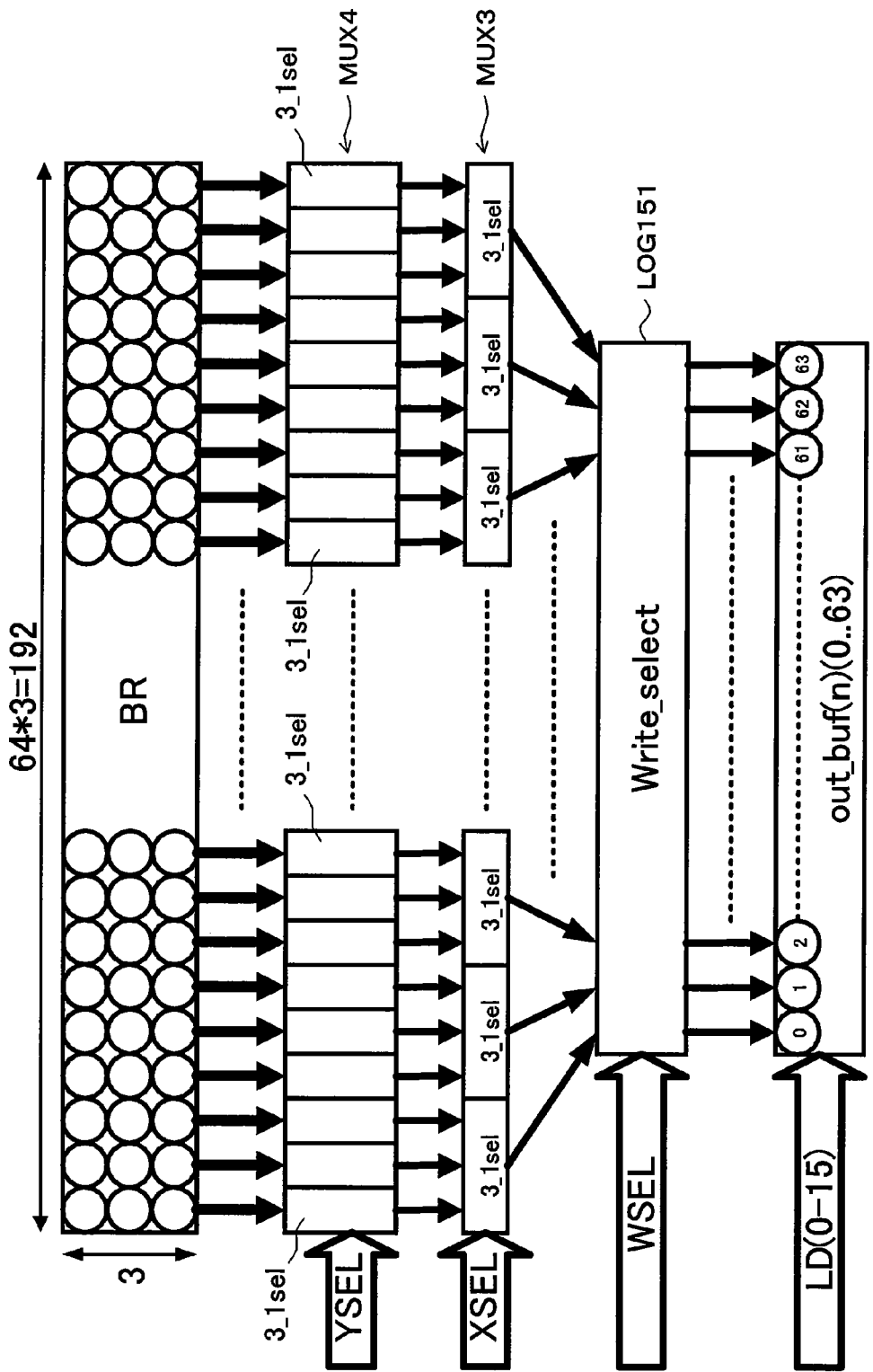
FIG. 47 is a diagram for explaining processing for execution of a command "set_BR#64x3x3" by an SCU shown in FIG. 3 etc.

The SCU 203_0, when executing the input data conversion command "set#BR#64x3x3" from the host processor 101, for example, as shown in FIG. 47, selects 64 pixel data from among the 192x3 pixel data in the rectangular image region BR selected by the tributary parameter BR#num by the tributary parameter xsel to generate the stream data and writes this into the output buffer out_buf after undergoing the predetermined pixel data selection processing.

Each of the 192 multiplexers MUX4 receives as input 3 pixel data adjacent in the y-direction in the rectangular image region BR selected by the tributary parameter BR#num, selects 1 pixel data by the tributary parameter ysel, and outputs the same to 64 multiplexers MUX3.

Each of the 64 multiplexers MUX3 selects one pixel data among three pixel data adjacent in the x-direction input from the multiplexer MUX4 by the tributary parameter xsel and outputs the same to the logical circuit LOG151.

The logical circuit LOG151 determines whether to write 64 pixel data input from 64 multiplexers MUX3 into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD processing circuits #0 to #3 for each 4 pixel data by the tributary parameter ld.

[set#BR#64x4]

Figure 48:
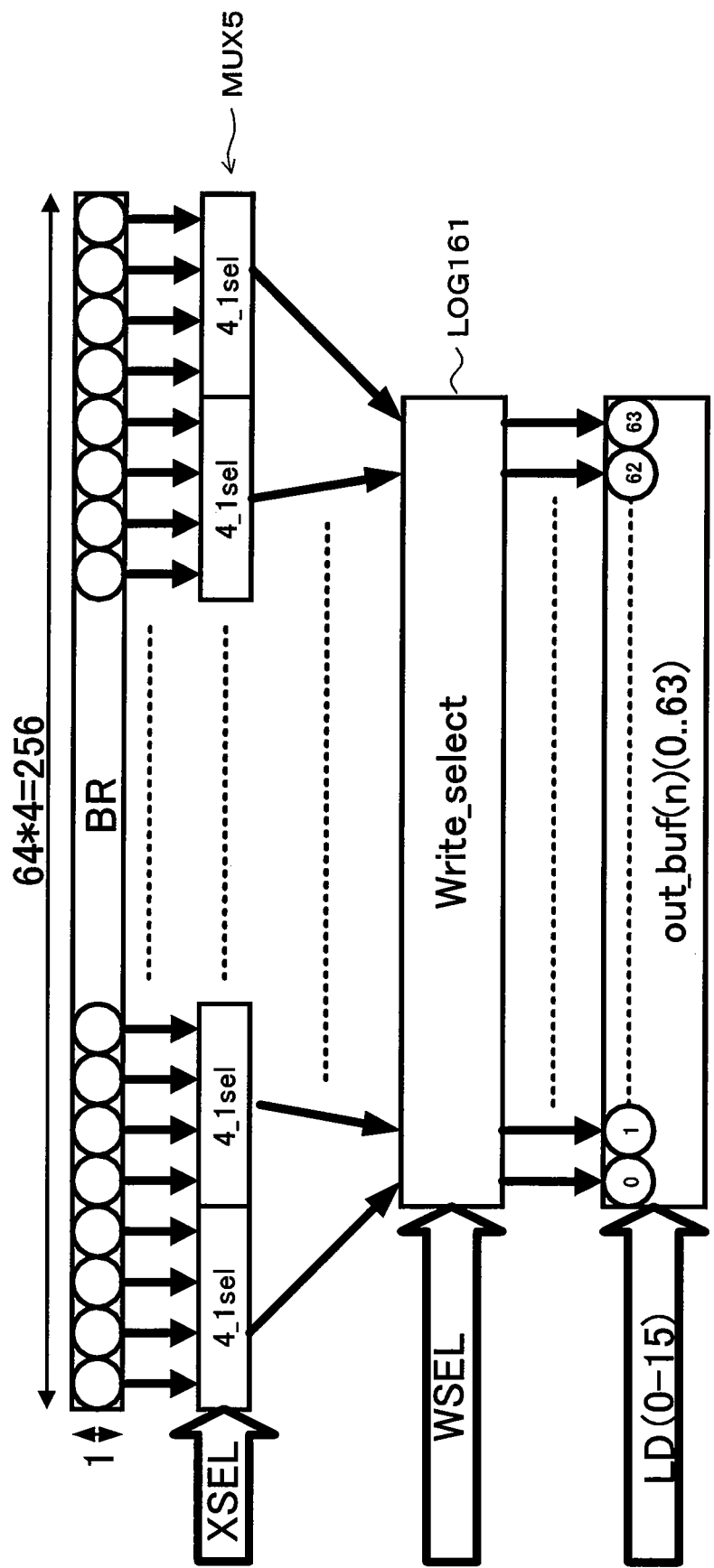
FIG. 48 is a diagram for explaining processing for execution of a command "set_BR#64x4" by an SCU shown in FIG. 3 etc.

The SCU 203_0, when executing the input data conversion command "set#BR#64x4" from the host processor 101, for example, as shown in FIG. 48, selects 64 pixel data from among the 256x1 pixel data in the rectangular image region BR selected by the tributary parameter BR#num by the tributary parameter xsel to generate the stream data and writes this into the output buffer out_buf after undergoing the predetermined pixel data selection processing.

Each of the 64 multiplexers MUX5 receives as input 4 pixel data adjacent in the x-direction in the rectangular image region BR selected by the tributary parameter BR#num, selects 1 pixel data by the tributary parameter xsel, and outputs the same to the logical circuit LOG161.

The logical circuit LOG161 determines whether to write 64 pixel data input from 64 multiplexers MUX5 into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD processing circuits #0 to #3 for each 4 pixel data by the tributary parameter ld.

[set#BR#64x4x4]

Figure 49:
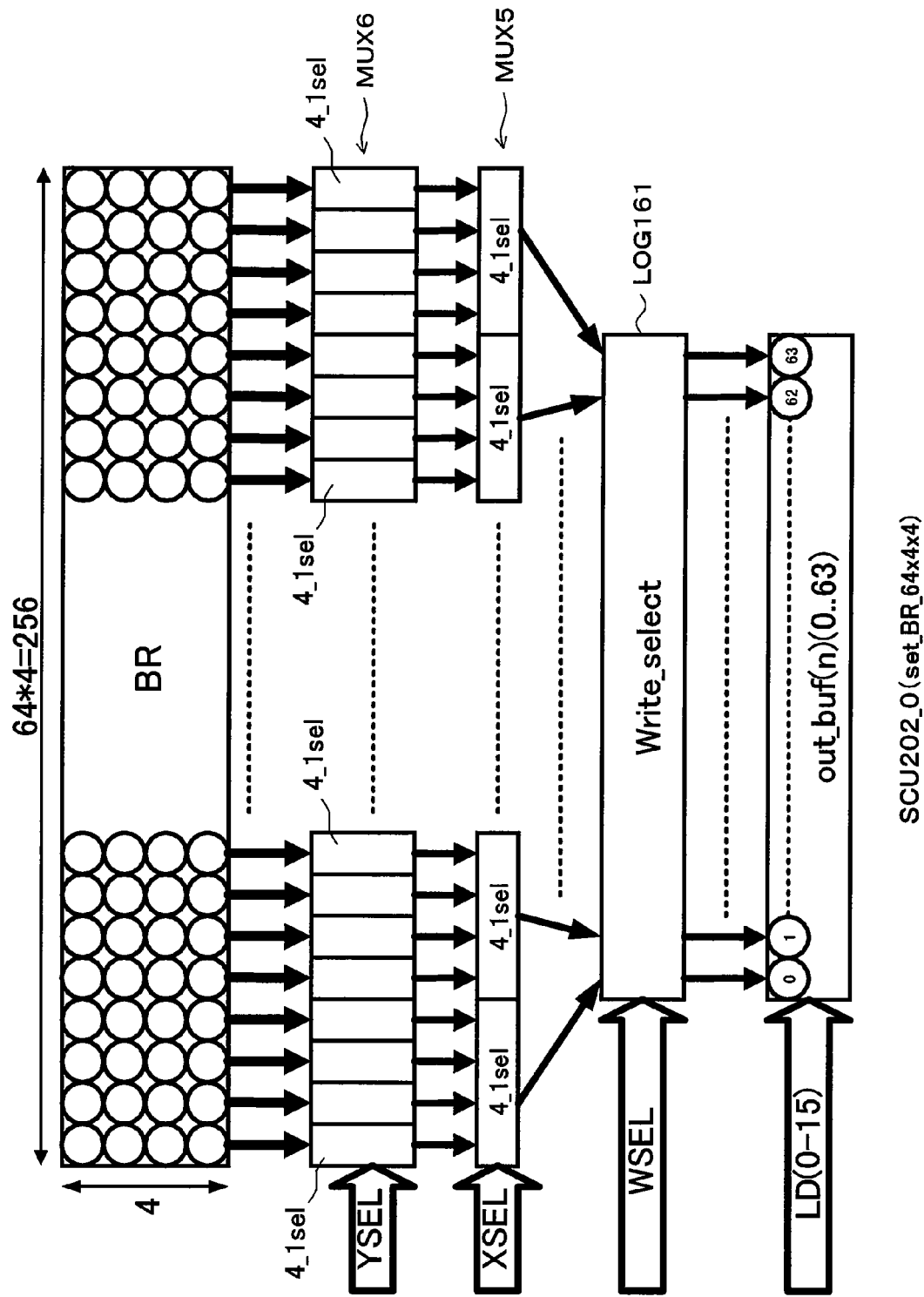
FIG. 49 is a diagram for explaining processing for execution of a command "set_BR#64x4x4" by an SCU shown in FIG. 3 etc.

The SCU 203_0, when executing the input data conversion command "set#BR#64x4x4" from the host processor 101, for example, as shown in FIG. 49, selects 64 pixel data from among the 256x4 pixel data in the rectangular image region BR selected by the tributary parameter BR#num by the tributary parameter xsel to generate the stream data and writes this into the output buffer out_buf after undergoing the predetermined pixel data selection processing.

Each of the 256 multiplexers MUX6 receives as input 4 pixel data adjacent in the y-direction in the rectangular image region BR selected by the tributary parameter BR#num, selects 1 pixel data by the tributary parameter ysel, and outputs the same to 64 multiplexers MUX5.

Each of the 64 multiplexers MUX5 selects one pixel data between four pixel data adjacent in the x-direction input from the multiplexer MUX4 by the tributary parameter xsel and outputs the same to the logical circuit LOG161.

The logical circuit LOG161 determines whether to write the 64 pixel data input from 64 multiplexers MUX5 into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD processing circuits #0 to #3 for each 4 pixel data by the tributary parameter ld.

[set#BR#64x9]

Figure 50:
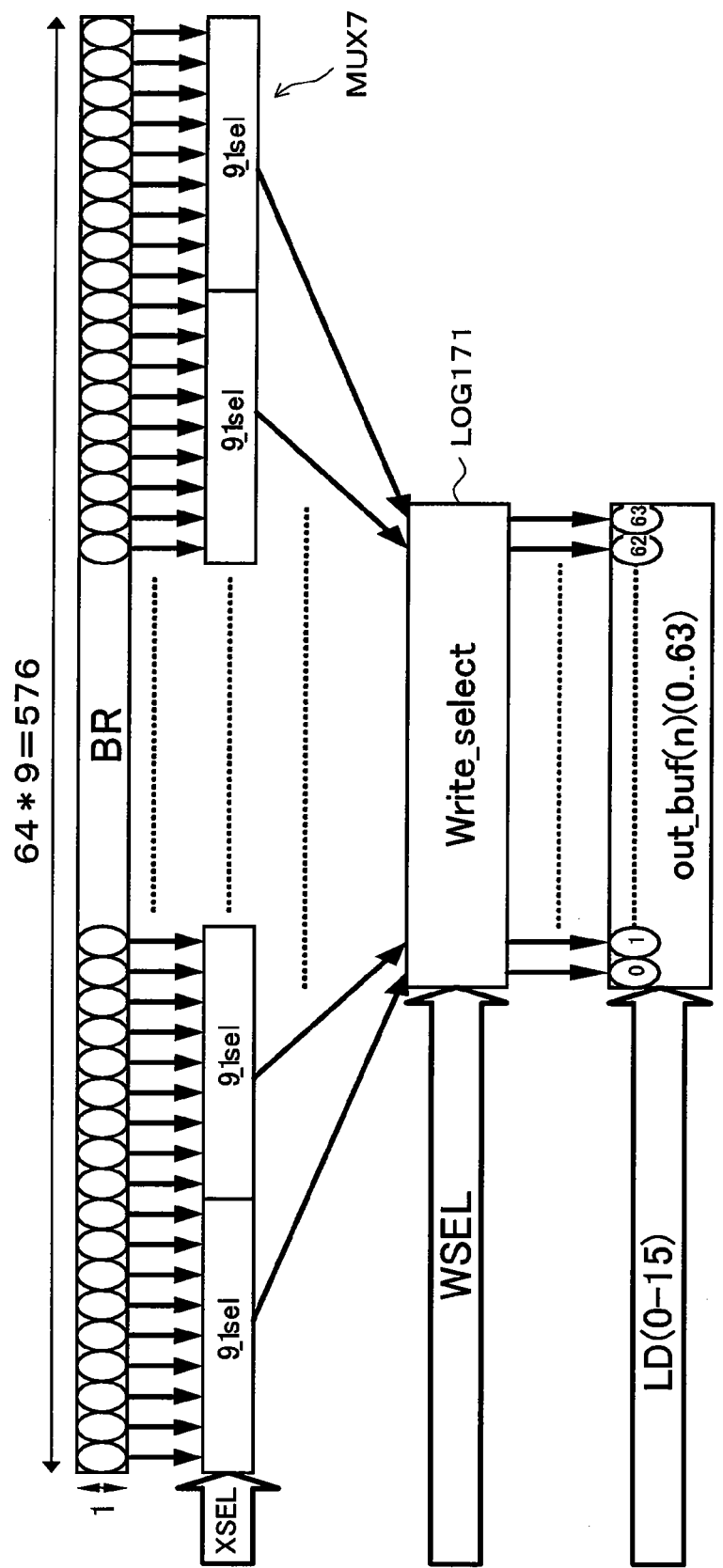
FIG. 50 is a diagram for explaining processing for execution of a command "set_BR#64x9" by an SCU shown in FIG. 3 etc.

The SCU 203_0, when executing the input data conversion command "set#BR#64x9" from the host processor 101, for example, as shown in FIG. 50, selects 64 pixel data from among the 576x1 pixel data in the rectangular image region BR selected by the tributary parameter BR#num by the tributary parameter xsel to generate the stream data and writes this into the output buffer out_buf after undergoing the predetermined pixel data selection processing.

Each of the 64 multiplexers MUX7 receives as input 9 pixel data adjacent in the x-direction in the rectangular image region BR selected by the tributary parameter BR#num, selects 1 pixel data by the tributary parameter xsel, and outputs the same to the logical circuit LOG171.

The logical circuit LOG171 determines whether to write the 64 pixel data input from the 64 multiplexers MUX7 into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD processing circuits #0 to #3 for each 4 pixel data by the tributary parameter ld.

[set#BR#64x9x3]

Figure 51:
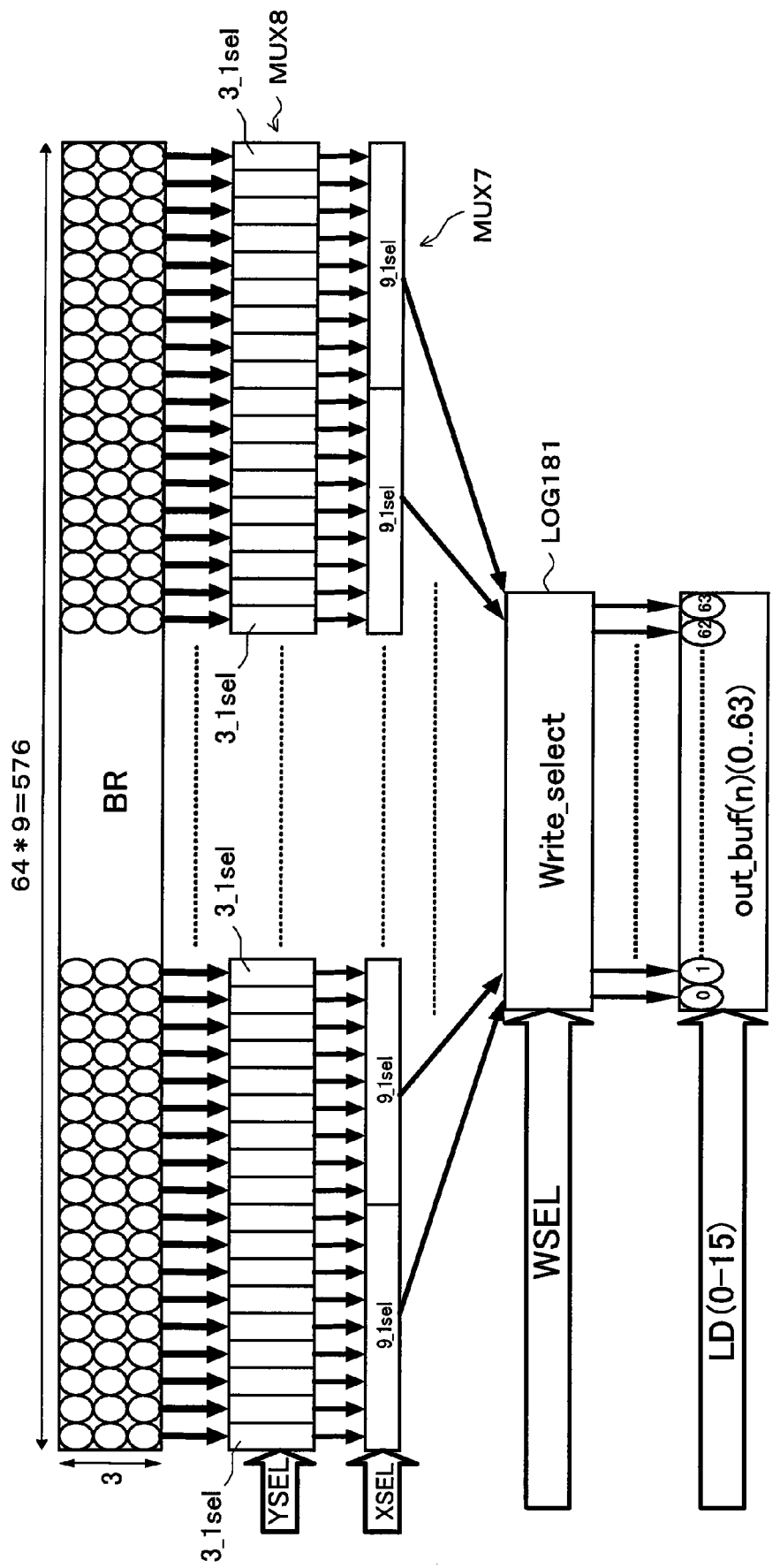
FIG. 51 is a diagram for explaining processing for execution of a command "set_BR#64x9x3" by an SCU shown in FIG. 3 etc.

The SCU 203_0, when executing the input data conversion command "set#BR#64x9x3" from the host processor 101, for example, as shown in FIG. 51, selects 64 pixel data from among the 576x3 pixel data in the rectangular image region BR selected by the tributary parameter BR#num by the tributary parameter xsel to generate the stream data and writes this into the output buffer out_buf after undergoing the predetermined pixel data selection processing.

Each of the 576 multiplexers MUX8 receives as input 3 pixel data adjacent in the y-direction in the rectangular image region BR selected by the tributary parameter BR#num, selects 1 pixel data by the tributary parameter ysel, and outputs the same to 64 multiplexers MUX7.

Each of the 64 multiplexers MUX7 selects one pixel data among nine pixel data adjacent in the x-direction input from the multiplexer MUX8 by the tributary parameter xsel and outputs the same to the logical circuit LOG181.

The logical circuit LOG181 determines whether to write the 64 pixel data input from the 64 multiplexers MUX7 into the output buffer out_buf as they are or to pack 4 bits from the LSB of each pixel data Pixel and store the same in the 16 pixel data Pixel by the tributary parameter wsel.

The SCU 203_0 performs the load control from the output buffer out_buf to the PU_SIMD processing circuits #0 to #3 for each 4 pixel data by the tributary parameter ld.

[Definition of Multiplex Rectangular Image Region by SCU 203_0 (Time of Writing)]

Figure 52:
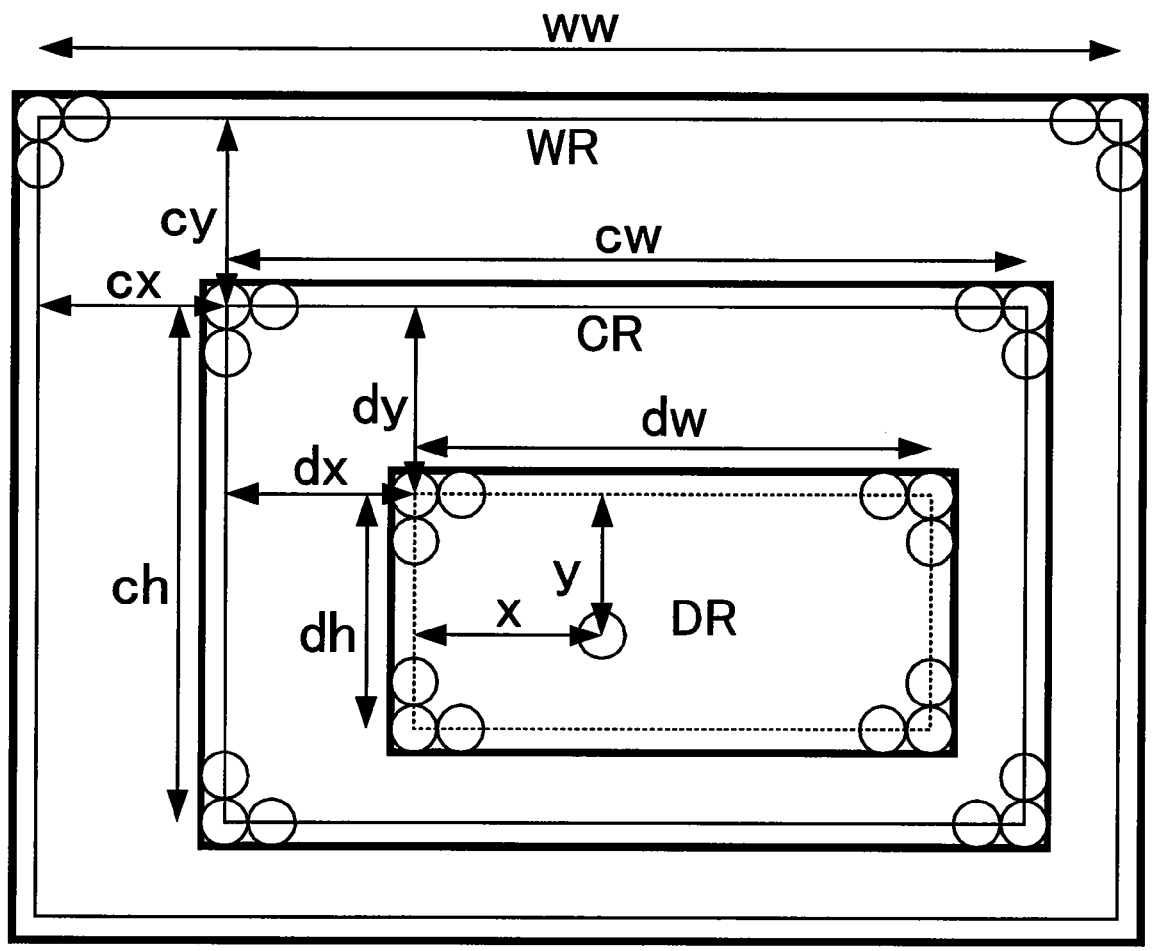
FIG. 52 is a diagram for explaining a method of management of a storage region by an SCU shown in FIG. 3 etc.

The SCU 203_0 can define the rectangular image regions CR and DR as multiplex rectangular image regions by the two-dimensional logical address expression as shown in FIG. 52 in the rectangular image region WR in the storage region.

As the values indicating positional relationships, the following coordinate values are used.

ww indicates the rectangular image region width in the x-direction of the rectangular image region WR.

cx, cy indicate the two-dimensional coordinates of the rectangular image region CR in the rectangular image region WR. These indicate the coordinates at the top left of the rectangular image region CR in the coordinate system defining the top left of the rectangular image region WR as the origin (0, 0).

cw and ch indicate the width and height of the rectangular image region CR.

dx and dy indicate the two-dimensional coordinates of the rectangular image region DR in the rectangular image region CR. These indicate the coordinates at the top left of the rectangular image region DR in the coordinate system defining the top left of the rectangular image region CR as the origin (0, 0).

dw and dh indicate the width and height of the rectangular image region DR.

[Mode of Definition of Rectangular Image Region DR by SCU 203_0]

Figure 53:
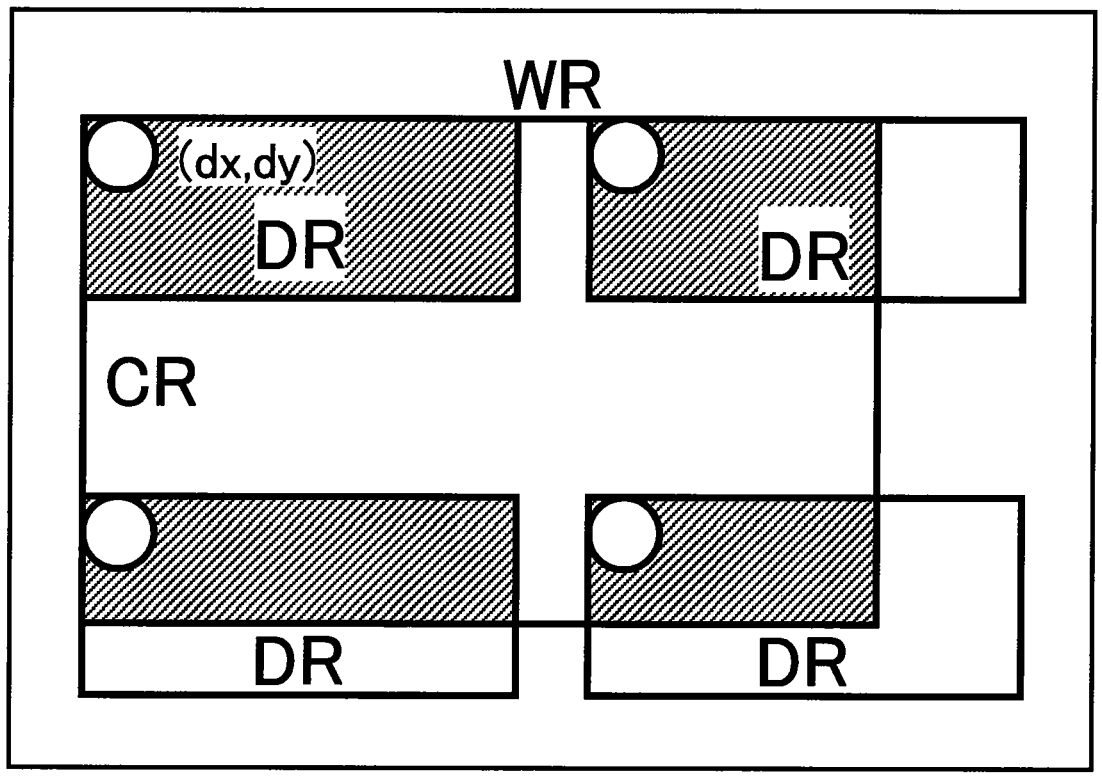
FIG. 53 is a diagram for explaining a method of management of a storage region by an SCU shown in FIG. 3 etc.

The SCU 203_0 can designate the rectangular image region DR so as to be outside of the rectangular image region CR as shown in FIG. 53 by adjusting the values of dx, dy and dw, dh.

Due to this, the SCU 203_0 can receive as input the stream data of a variety of formats from the PU_SIMD processing circuits #0 to #3.

Below, an explanation will be given of various types of DR modes indicating the form of designation of the rectangular image region DR by the SCU 203_0.

DR mode 1:

The SCU 203_0 can set the rectangular image region DR outside from the rectangular image region CR when it is set in the DR mode 1.

The SCU 203_0 does not write the value of the pixel data of the pixel corresponding positions included in the outside region into the rectangular image region CR when the rectangular image region DR is outside from the rectangular image region CR.

The pixel data in the rectangular image region DR is defined by the following Equation (10) in the rectangular image region CR.

[Equation 10]

if$((x+dx>=cw)|(y+dy>ch))$pixel$(x,y)$ is not WRitten into $CR$ else $CR(x+dx,y+dy)$=pixel$(x,y)$ (10)

DR mode 2:

The SCU 203_0 can set the rectangular image region DR outside from the rectangular image region CR where it is set in the DR mode 2.

Figure 54:
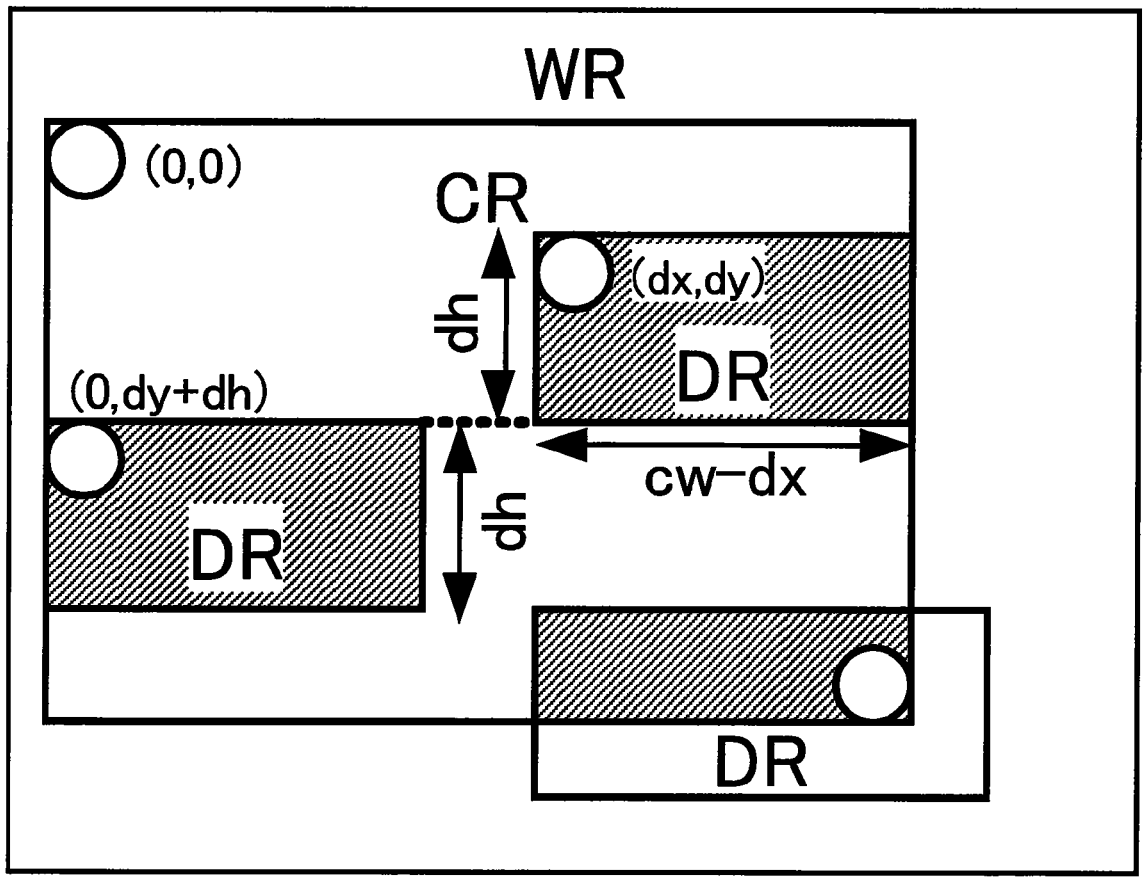
FIG. 54 is a diagram for explaining a method of management of a storage region by an SCU shown in FIG. 3 etc.

As shown in FIG. 54, when the rectangular image region DR is outside the rectangular image region CR in the x-direction, the SCU 203_0 controls the outside region to be folded back inside the rectangular image region CR.

Further, as shown in FIG. 54, when the rectangular image region DR is outside the rectangular image region CR in the x-direction and the y-direction, the SCU 203_0 does not write the pixel data in the rectangular image region DR into the rectangular image region CR.

The pixel data in the rectangular image region DR is defined as in the following Equation (11) in the rectangular image region CR.

[Equation 11]

if$(cw<=x+dx)\&(y+dy<=ch-dh)CR(x+dx-cw,y+dy+dh)$=pixel$(x,y)$ else if$(cw<=x+dx)\&(ch-dh<y+dy)$pixel$(x,y)$ is not Written in $CR$ else if$(ch<y+dx)$pixel$(x,y)$ is not Written in $CR$ else $CR(x+dx,y+dy)$=pixel$(x,y)$ (11)

[Processing for Conversion of Output Data of PU_SIMD Processing Circuits #0 to #3]

The stream data output by the PU_SIMD processing circuits #0 to #3 are written into the input buffer in_buf.

The SCU 203_0 reads out the data from the input buffer in_buf, applies rearrangement or other data conversion processing, and then writes the same into the rectangular image region DR.

Further, the SCU 203_0 reads out the data from the input buffer in_buf according to need, applies rearrangement or other data conversion processing according to the mask data DR#mask, then writes the same into the rectangular image region DR.

The SCU 203_0 can designate the above conversion processing for each of the PU_SIMD processing circuits #0 to #3.

The SCU 203_0 is provided with a register for recording the mask data DR#mask.

The SCU 203_0 is provided with the input buffer in_buf corresponding to each of the PU_SIMD processing circuits #0 to #3.

The SCU 203_0 performs the output data conversion processing explained above, that is, the processing for writing the streams output by the PU_SIMD processing circuits #0 to #3 into the rectangular image region DR in accordance with for example the output data conversion command WO#data#op shown in the following Table 4.

The SCU 203_0 receives as input and executes the output data conversion command from the host processor 101 shown in FIG. 1.

The SCU 203_0 can designate the tributary parameter shown in Table 5 in each output data conversion command shown in Table 4.

TABLE 4

| Output data conversion command | DR rectangular image region width dw | Dr rectangular image region height dh |
| --- | --- | --- |
| set_DR_mask_64x1 | 64 | 1 |
| set_DR_packed_64x1 | 64 | 1 |

TABLE 4-continued

| Output data conversion command | DR rectangular image region width dw | Dr rectangular image region height dh |
|---|---|---|
| set_DR_64x1 | 64 | 1 |
| set_DR_128x1 | 64 | 1 |
| set_DR_192x1 | 64 | 1 |
| set_DR_256x1 | 64 | 1 |

TABLE 5

| Tributary parameter | Meaning |
|---|---|
| DR_num | DR number (0 . . . 3) |
| bsel[1:0] | Select 64 bits from 4*64 bits stored in inbuf(0 . . . 15) |
| psel[3:0] | Designate pixel write number in DR region, alignment, 1 skip, 2 skip, 3 skip |

Below, each of the output data conversion processing shown in the above Table 4 will be explained.

[set#DR#mask#64x1]

In each of the input buffers in_buf (0-15), 64 pixel data input from PU_SIMD #0 to #3 are written. Note that, 1 pixel data is expressed by 4 bits.

Here, for example, each output buffer out_buf is previously linked with one processor unit PU shown in FIG. 3.

Figure 55:
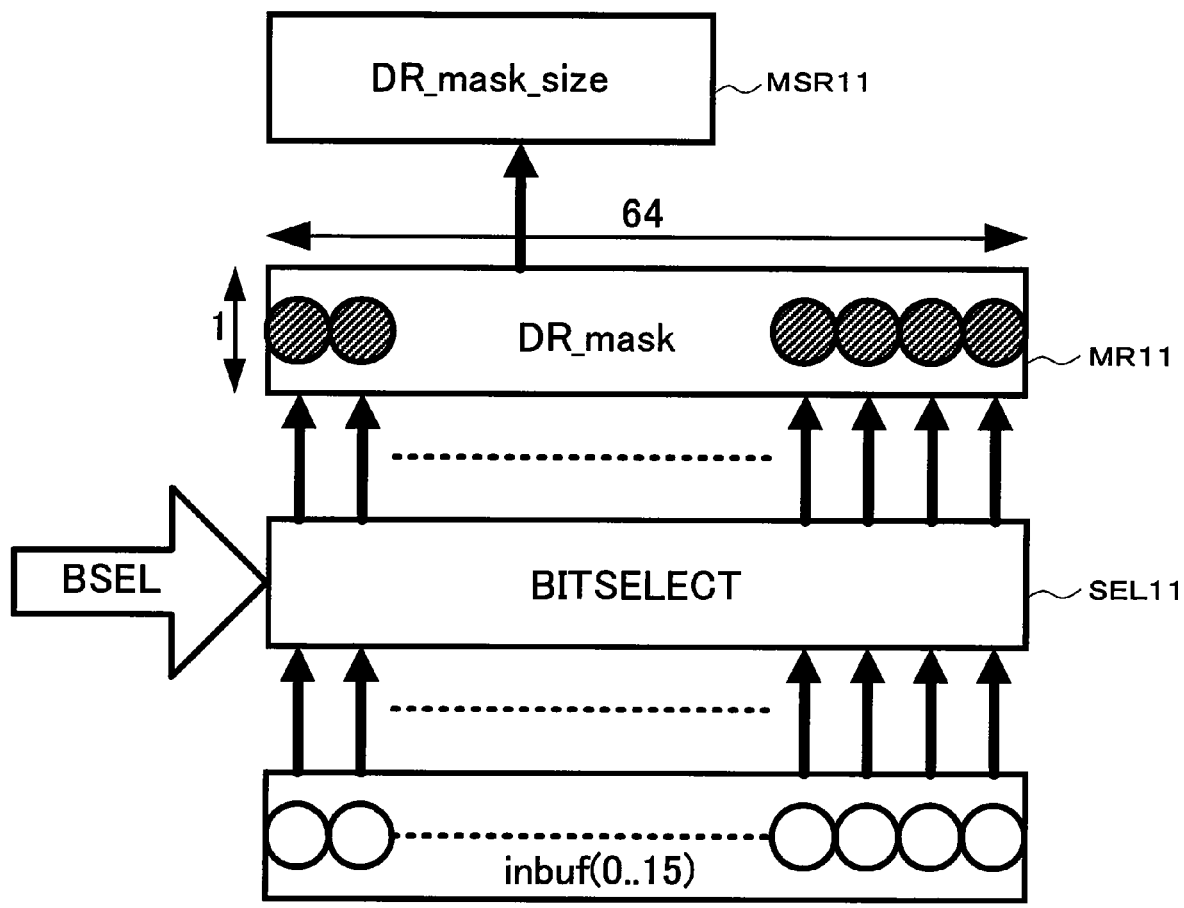
FIG. 55 is a diagram for explaining processing for execution of a command "set#DR#mask#64x1" by an SCU shown in FIG. 3 etc.

The SCU 203_0, as shown in FIG. 55, selects 1 bit from among 4 bits composing each pixel data and writes the same as 64-bit mask data DR#mask into the mask register MR11.

Each bit composing the mask data DR#mask is used as a pixel data unit of mask information when writing the output of the processor unit PU into the rectangular image region DR.

For example, the case where a bit of the mask data DR#mask is "1" means to write the pixel data into the rectangular image region DR, and the case of "0" means to not write the pixel data.

When the output data conversion processing command explained later is set#DR#packed=64x1, the SCU 203_0 actually writes the pixel data into the rectangular image region DR.

The SCU 203_0 writes the 64-bit mask data DR#mask into the mask register MR11 having the 64 bit structure selected by the tributary parameter DR#num.

Further, the SCU 203_0 writes the number of bits which become "1" in the 64-bit mask data DR#mask into the mask size register MSR11 selected by the tributary parameter DR#num.

Accordingly, the value stored in the mask size register MSR11 is one of 0 to 64.

As shown in FIG. 55, in each of the input buffers in_buf (0-15), 64 pixel data input from the corresponding processor unit PU are written.

The bit selector SEL11 selects 4 to 1 bit composing the 64 pixel data stored in the input buffer in_buf (0-15) by the tributary parameter bsel. There are four types of selection. The same bit is selected by each pixel data.

The SCU 203_0 stores the data selected by the bit selector SEL11 in the mask register MR11 selected by the tributary parameter DR#num as the mask data DR#mask.

[set#DR#packed#64x1]

Figure 56:
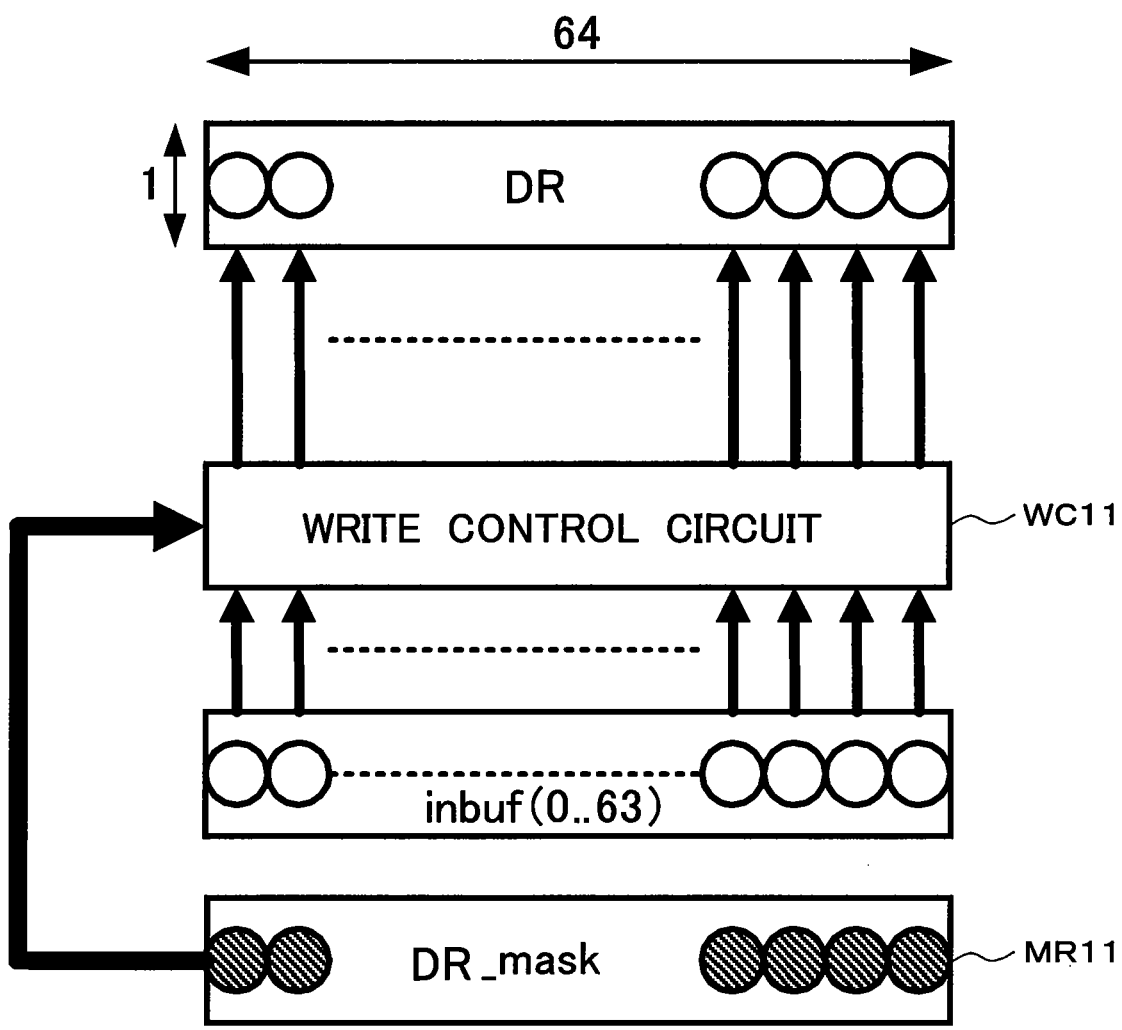
FIG. 56 is a diagram for explaining processing for execution of a command "set#DR#packed#64x1" by an SCU shown in FIG. 3 etc.

In each of the input buffers in_buf (0-63) shown in FIG. 56, 64 pixel data input from the corresponding processor unit PU are written.

The write control circuit WC11 of the SCU 203_0 writes the pixel data stored in the input buffer in_buf into the rectangular image region DR selected by the tributary parameter DR#num according to the mask data DR#mask stored in the mask register MR11 having the 64-bit structure selected by the tributary parameter DR#num.

At this time, the write control circuit WC11 writes the pixel data corresponding to the bits indicating "1" of the mask data DR#mask by sequential packing from the smallest value in the x-coordinates of the rectangular image region DR.

The width of the rectangular image region DR is 64 pixel data and the height is 1 pixel data, but the pixel data are written into the rectangular image region DR packed in accordance with the mask data DR#mask, therefore the pixel data is not always written into the entire rectangular image region DR.

[set#DR#64x1]

Figure 57:
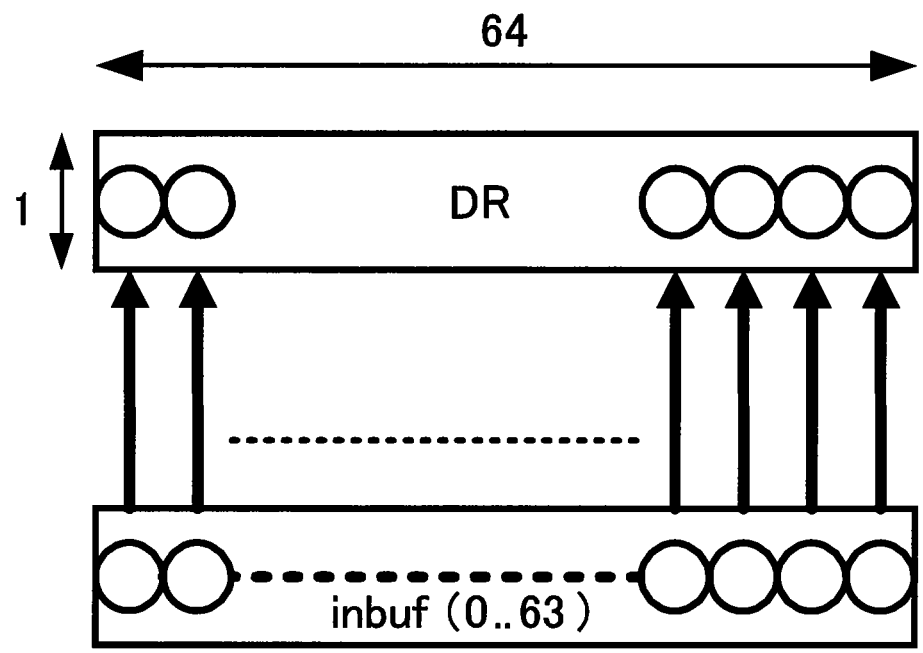
FIG. 57 is a diagram for explaining processing for execution of a command "set#DR#64x1" by an SCU shown in FIG. 3 etc.

In each of the input buffers in_buf (0-63) shown in FIG. 57, 64 pixel data input from the corresponding processor unit PU are written.

The SCU 203_0 writes 64 pixel data read out from the input buffer in_buf into the rectangular image region DR selected by the tributary parameter DR#num.

In the present embodiment, the size of the rectangular image region DR described above is 64x1 pixel data.

[set#DR#128x1]

Figure 58:
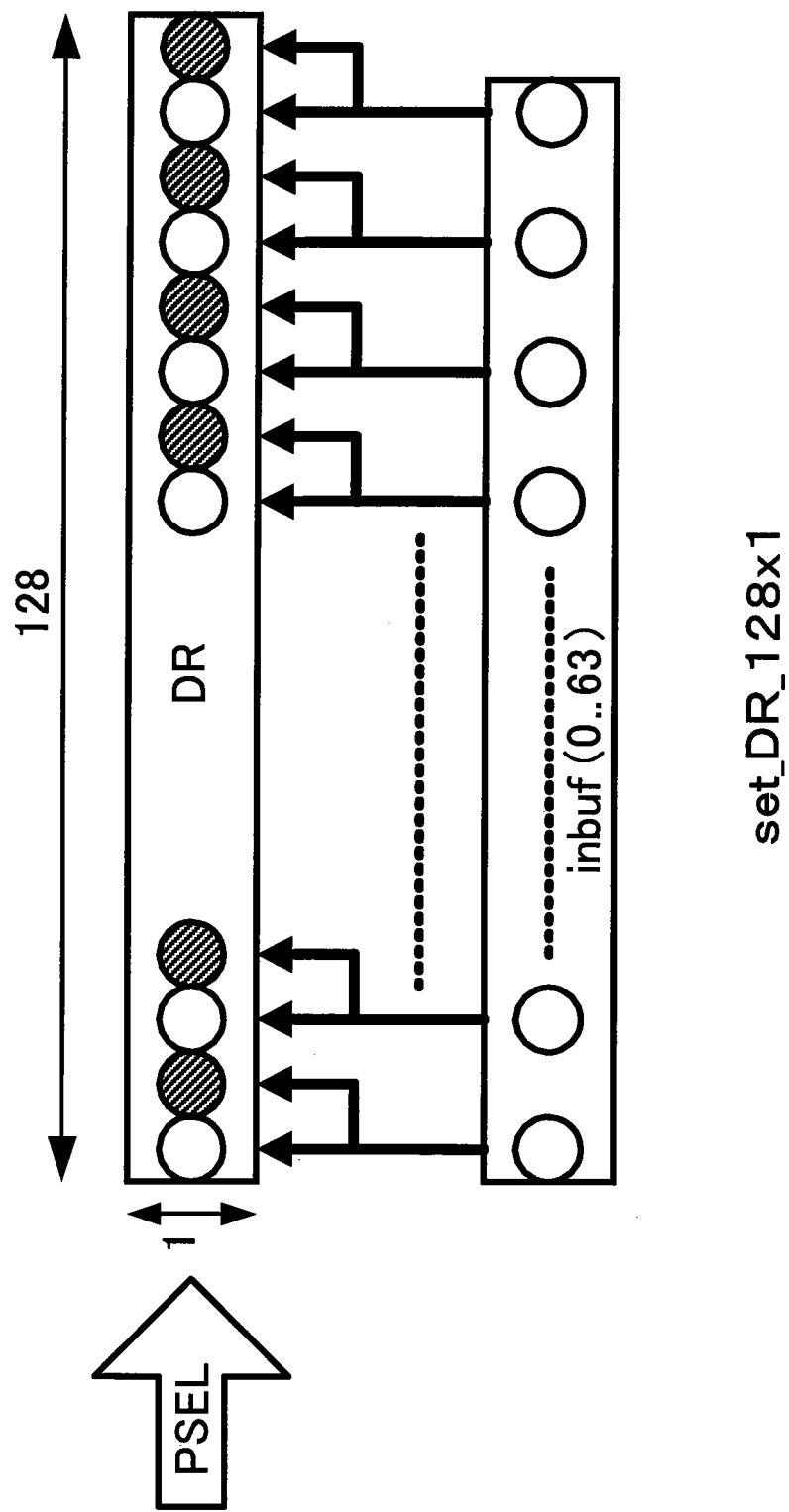
FIG. 58 is a diagram for explaining processing for execution of a command "set#DR#128x1" by an SCU shown in FIG. 3 etc.

In each of the input buffers in_buf (0-63) shown in FIG. 58, 64 pixel data input from the corresponding processor unit PU are written.

The SCU 203_0 writes 64 pixel data read out from the input buffer in_buf into the rectangular image region DR selected by the tributary parameter DR#num according to the tributary parameter sel.

In the present embodiment, the size of the above rectangular image region DR is 128x1 pixel data.

The SCU 203_0 writes the pixel data to the coordinates (pixel corresponding positions) with a multiple of 2 of the x-coordinates of the rectangular image region DR in the case where the tributary parameter psel=0.

The SCU 203_0 writes the pixel data to coordinates with a multiple of +1 of the x-coordinates of the rectangular image region DR in the case where the tributary parameter psel=1.

[set#DR#192x1]

Figure 59:
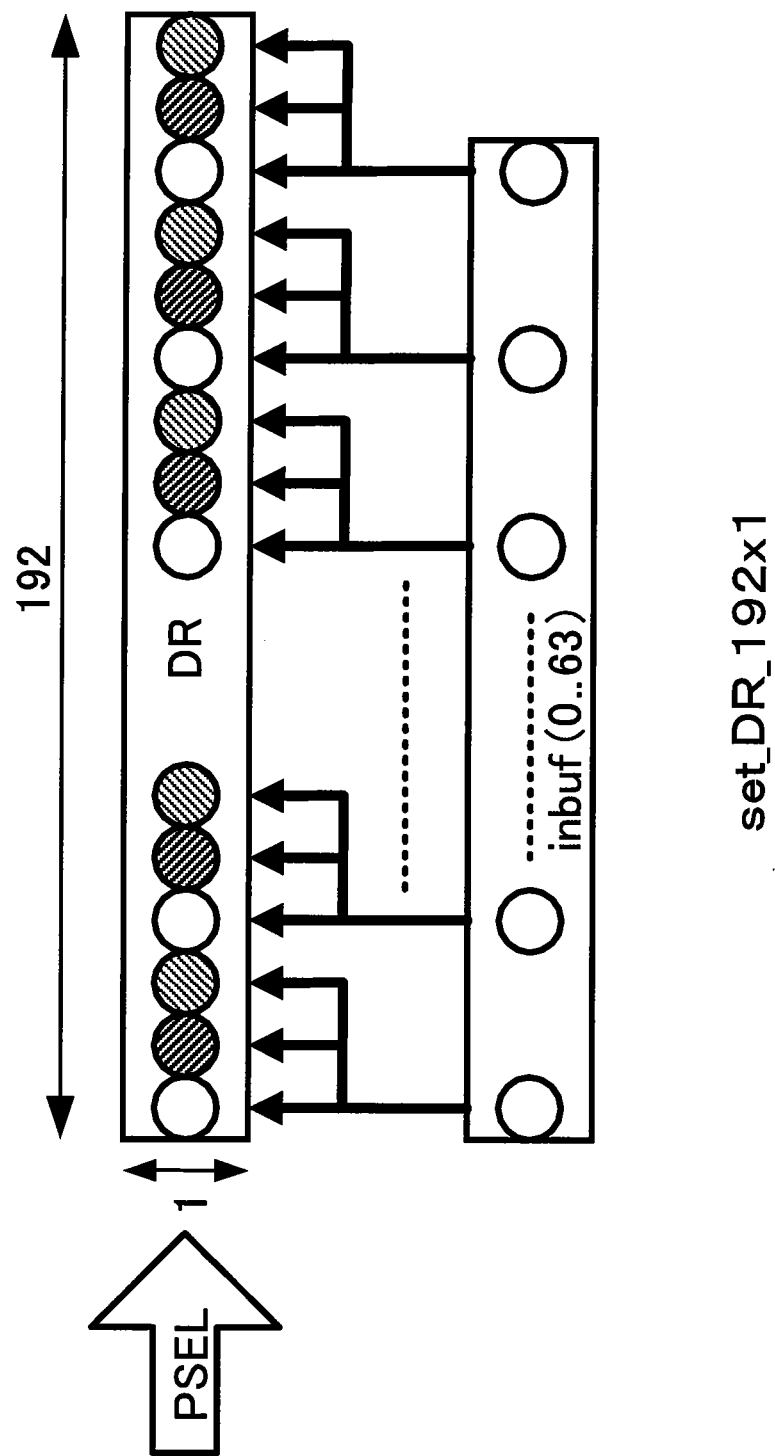
FIG. 59 is a diagram for explaining processing for execution of a command "set#DR#192x1" by an SCU shown in FIG. 3 etc.

In each of the input buffers in_buf (0-63) shown in FIG. 59, the 64 pixel data input from the corresponding processor unit PU are written.

The SCU 203_0 writes the 64 pixel data read out from the input buffer in_buf into the rectangular image region DR selected by the tributary parameter DR#num according to the tributary parameter sel.

In the present embodiment, the size of the above rectangular image region DR is 192x1 pixel data.

The SCU 203_0 writes the pixel data to coordinates (pixel corresponding positions) with a multiple of 3 of the x-coordinates of the rectangular image region DR in the case where the tributary parameter psel=0.

The SCU 203_0 writes the pixel data to coordinates with a multiple of 3+1 of the x-coordinates of the rectangular image region DR in the case where the tributary parameter psel=1.

The SCU 203_0 writes the pixel data to coordinates with a multiple of 3+2 of the x-coordinates of the rectangular image region DR in the case where the tributary parameter psel=2.

[set#DR#256x1]

Figure 60:
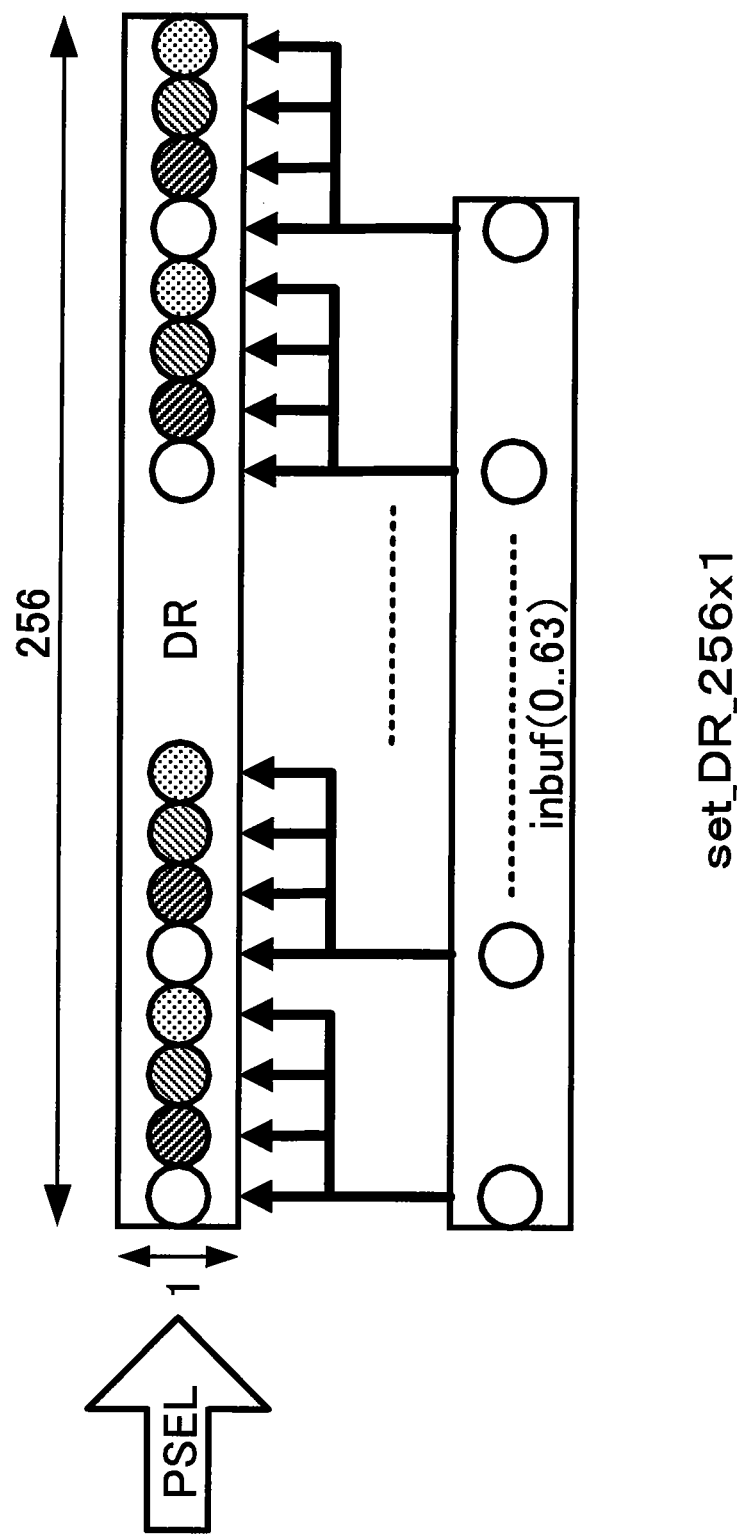
FIG. 60 is a diagram for explaining processing for execution of a command "set#DR#256x1" by an SCU shown in FIG. 3 etc.

In each of input buffers in_buf (0-63) shown in FIG. 60, 64 pixel data input from the corresponding processor unit PU are written.

The SCU 203_0 writes 64 pixel data read out from the input buffer in_buf into the rectangular image region DR selected by the tributary parameter DR#num according to the tributary parameter sel.

In the present embodiment, the size of the above rectangular image region DR is 256×1 pixel data.

The SCU 203_0 writes the pixel data into the coordinates with a multiple of 4 of the x-coordinates of the rectangular image region DR in the case where the tributary parameter psel=0.

The SCU 203_0 writes the pixel data into the coordinates with a multiple of 4+1 of the x-coordinates of the rectangular image region DR in the case where the tributary parameter psel=1.

The SCU 203_0 writes the pixel data into the coordinates with a multiple of 4+2 of the x-coordinates of the rectangular image region DR in the case where the tributary parameter psel=2.

The SCU 203_0 writes the pixel data into the coordinates with a multiple of 4+3 of the x-coordinates of the rectangular image region DR in the case where the tributary parameter psel=3.

[Operation Sequence of SCU 203_0]

The explanation will be given of operation sequence of the SCU 203_0 shown in FIG. 2, FIG. 3, and FIG. 27.

Note that the SCU 203_1 to 203_3 are basically the same as the SCU 203_0.

The SCU 203_0 is provided with four built-in processors, four program memories, and four program counters.

The SCU 203_0 stores the program input from the host processor 101 shown in FIG. 1 in the program memories.

The built-in processors of the SCU 203_0 read out the program from the program memories and execute it according to the program counters. The program includes the data conversion command WI#data#op and WO_data_op explained above.

The built-in processors are for example RISC processors.

The built-in processors instruct the start of processing of the PU_SIMD processing circuits #0 to #3.

The built-in processors designate the addresses and sizes of the rectangular image regions WR/AR/BR/CR/DR and, at the same time, perform addition of the addresses, condition branching, etc.

The commands executed by the built-in processors are comprised by instructions, operand0, and displacement.

The built-in processors, when executing a finish command, output interruption signals to the host processor 101 and end the execution of the program.

An explanation will be given of the commands executed by the built-in processors of SCU 203_0.

As shown in FIG. 61, the built-in processors execute the command "exec".

The command "exec" designates the data conversion commands WI#data#op and WO#data#op, and WI#data#op#param and WO#data#op#param as parameters thereof.

The command "exec" is used for designating DMA transfer.

As shown in FIG. 62, the built-in processors execute the command "branch".

The command "Branch" includes non-conditional static loop processing and conditional processing.

In the conditional processing, the condition is judged based on comparison results between the coordinates ax, ay, bx, by, cx, cy, dx, dy of rectangular image regions and the immediate values.

As shown in FIG. 63, the built-in processors execute the command "Set".

The command "Set" defines the coordinate designation such as the rectangular image regions ax, ay, aw, ah, bx, by, bw, bh, and the coordinate designation of the rectangular image regions cx, cy, cw, ch, dx, dy, dw, dh, etc.

The command "Set" designates bp, ww for defining the rectangular image region WR.

The command "Set" defines the transfer side start address, transferred side start address, and transfer size for defining the DMA region.

As shown in FIG. 64, the built-in processors execute the command "add/sub".

The command "add/sub" performs the addition/subtraction of coordinates of the rectangular image regions ax, ay, aw, ah, bx, by, bw, bh etc. and performs the addition/subtraction of coordinates of the rectangular image regions cx, cy, cw, ch, dx, dy, dw, dh, etc.

Further, the command "add/sub" can add a value which can be set from the PU_SIMD processing circuits #0 to #3 at only dx.

Figure 65A:
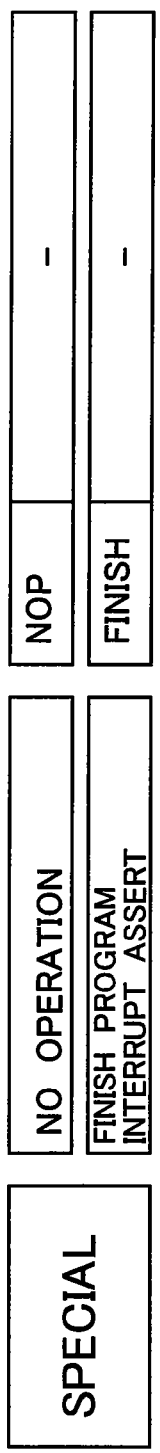
FIG. 65 is a diagram for explaining a specific command executed by an SCU and parameters.

As shown in FIG. 65(A), the built-in processor can execute "no operation" for incrementing only the program counter, "finish program" for instructing the program end, etc. as special commands.

Figure 65B:
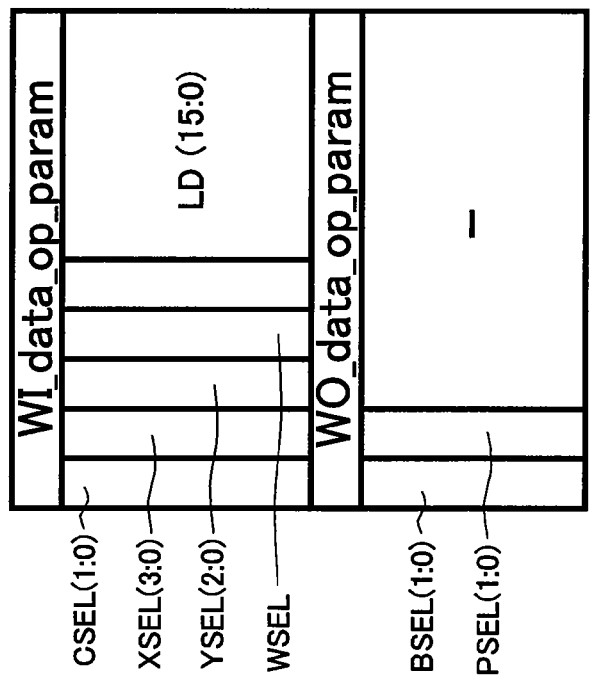

The tributary parameters of the data conversion commands, that is, WI#data#op#param and WO#data#op#param, are defined as shown in for example FIG. 65(B).

The tributary parameters are stored in the memories of the SCU 203_0 in correspondence with the data conversion commands.

Figure 66:
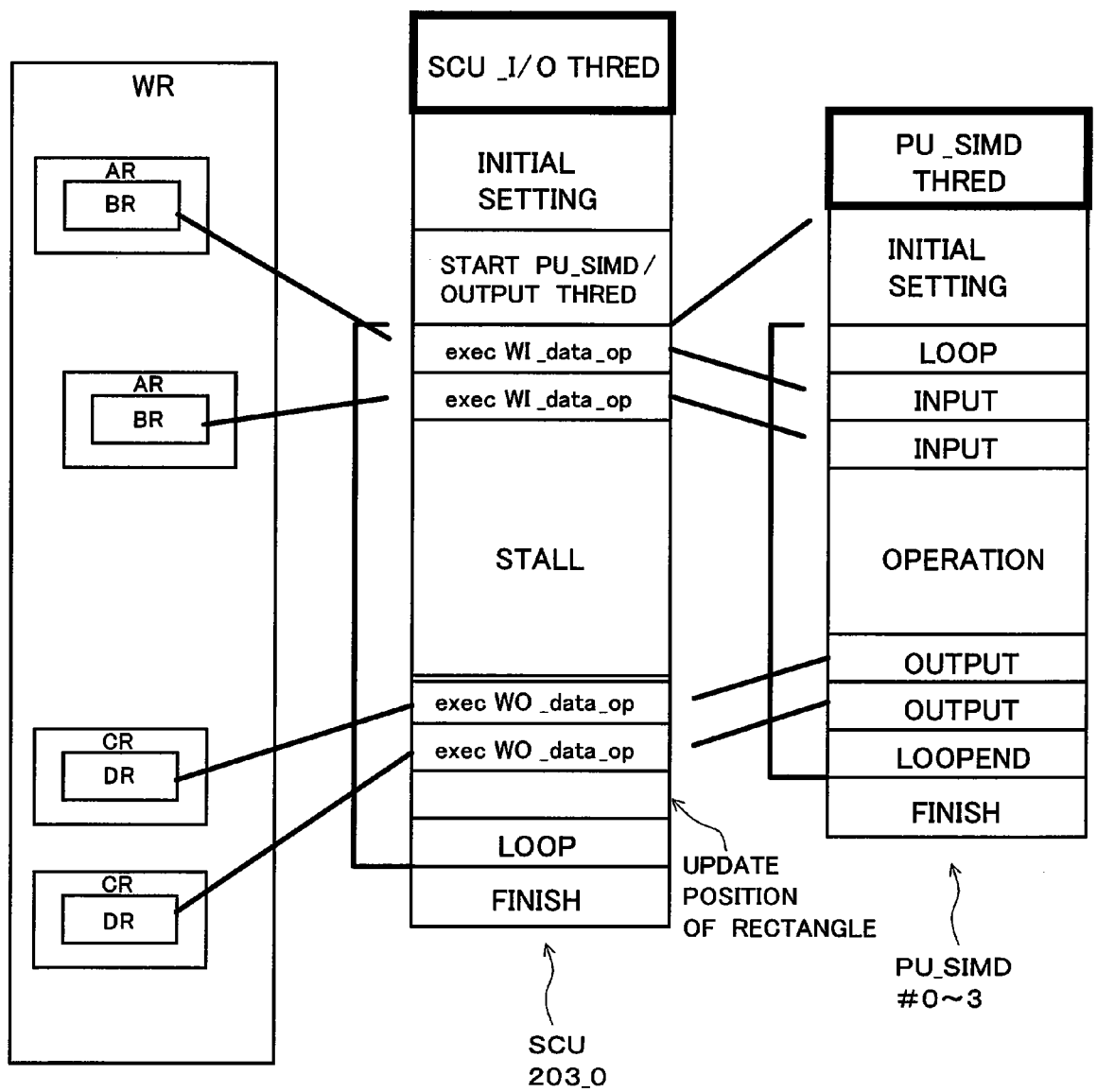
FIG. 66 is a diagram for explaining relationships of processing between an SCU and a processor unit.

As shown in FIG. 66, the SCU 203_0 makes the PU_SIMD #0 to #3 start the processing by executing the command "start PU_SIMD".

The SCU 203_0 converts the data read out from the rectangular image region WR by executing the data conversion command WI#data#op and outputs the same to the PU_SIMD processing circuits #0 to #3.

The SCU 203_0 converts the data input from the PU_SIMD #0 to #3 by executing the data conversion command WO_data_op and writes this into the rectangular image region WR.

In the present embodiment, the processing (thread) of the SCU 203_0 is instructed to start by the host processor 101 shown in FIG. 1.

The PU_SIMD (Single Instruction Multiple Data) processing circuits #0 to #3 operate by individual threads corresponding to the PU_SIMD processing. The thread is instructed to start by the SCU 203_0 or the host processor 101.

Figure 67:
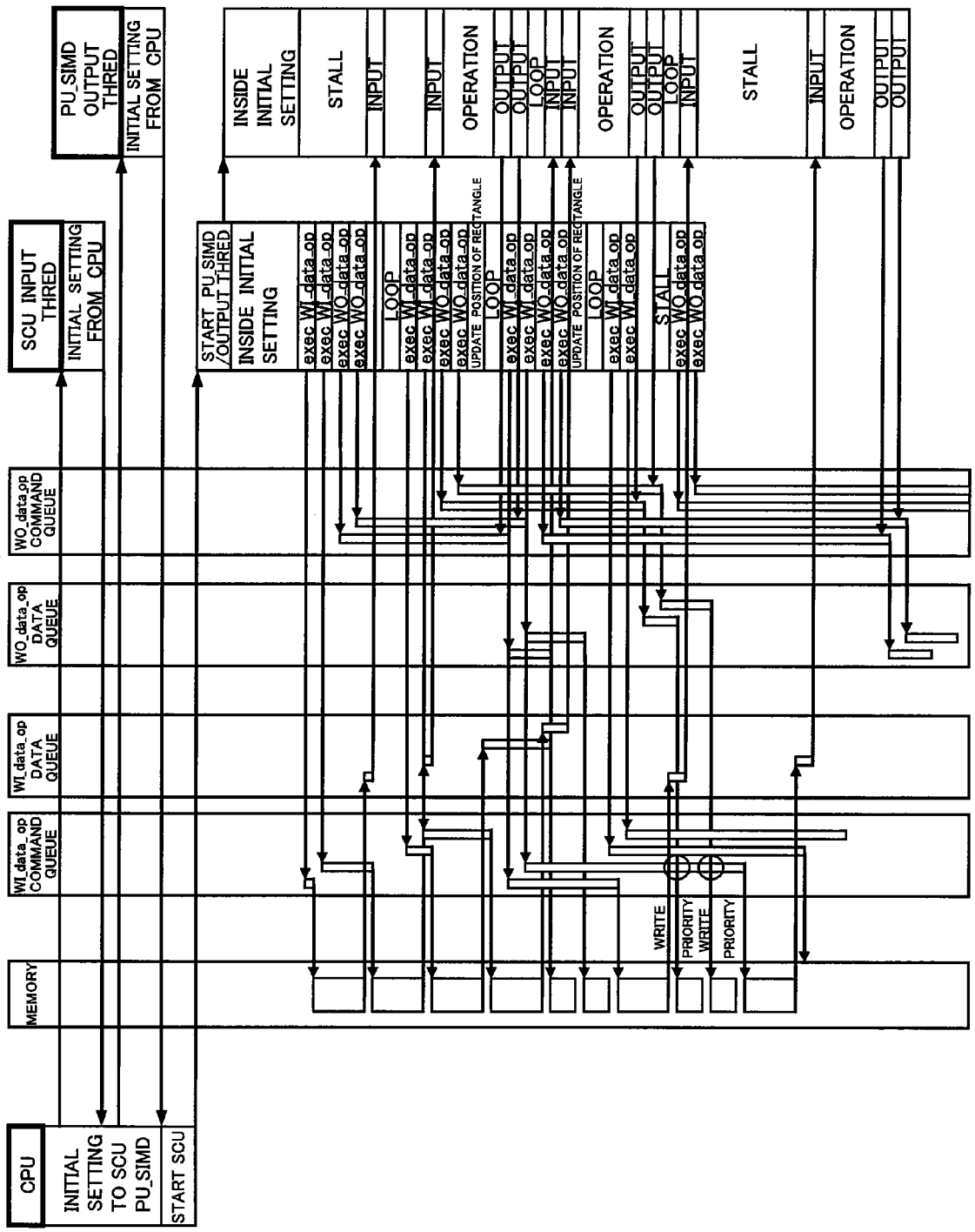
FIG. 67 is a diagram for explaining queuing of commands and data in an SCU.

The data conversion command WI#data#op and command WO_data_op and the data input/output by the related commands are stored in queues in the SCU 203_0 as shown in FIG. 67 and sequentially executed and processed.

Namely, the built-in processors first issue and execute commands for both of read/write operations of the storage region.

Then, the built-in processors perform the address processing by the execution of the data conversion commands WI#data#op and WO#data#op and stores addresses thereof in queues separately for read and write operations.

Further, the data accompanying the read and write operations are stored in the queues.

[Example of Entire Operation of Image Processing Apparatus 100]

The host processor 101 shown in FIG. 1 executes the program PRG and designates programs in the SCUs 203_0 to 203_3 shown in FIG. 2 by this.

The SCUs 203_0 to 203_3 access the memory system 105 or the local memories 204_0 to 204_3 in accordance with the advance of processing of the PEs in the PU arrays 202_0 to 202_3 based on each four predetermined threads obtained by executing the program designated by the host processor 101.

The PEs shown in FIG. 3 and FIG. 4 in the PU arrays 202_0 to 202_3 operate by different threads from those for the SCUs 203_0 to 203_3 while utilizing the memory access results by SCUs 203_0 to 203_3 under the control of the SCUs 203_0 to 203_3 or host processor 101.

In the PU arrays 202_0 to 202_3, the SCUs 203_0 to 203_3 selectively connect the PU_SIMD s #0 to #3 in parallel or in series for operation.

In the PU_SIMD #0 to #3, as shown in FIG. 4, the 16 PE0 to PE15 are serially connected. The adjacent PEs input/output the pixel data between them according to need.

As explained above, according to the image processing apparatus 100 of the present embodiment, the image processing engine 102 operate the PU_SIMD (Single Instruction Multiple Data) units of the PU arrays 202_0 to 202_3 by a shared thread and operate the SCUs 203_0 to 203_3 by different threads from the related thread.

Due to this, it is possible to specify the processing for enormous pixel data in advance and to execute it in parallel among a plurality of processor elements (PE) based on the same thread utilizing the fact that they are mutually independent.

By setting the thread of the SCUs 203_0 to 203_3 separate from the threads for the PU arrays 202_0 to 202_3, it is possible to efficiently realize access to the storage region concerning data relating to the processing of the related PEs by the back end of the processing of the PEs.

According to the image processing engine 102, by having the SCUs 203_0 to 203_3 access the storage region for the data relating to the processing of the PU arrays 202_0 to 202_3, the PEs of the PU arrays 202_0 to 202_3 do not have to perform the access processing to the storage region and can efficiently perform the image processing.

According to the image processing engine 102, as shown in FIG. 3, the pixel data can be input/output to the processor units PU on both sides to which the processor unit PU is serially connected and, at the same time, as shown in FIG. 4, the PEs serially connected in the processor unit PU can input/output pixel data to the PEs on both sides. Due to this, in comparison with the case where each PE independently accesses the memory, the number of times of memory access can be greatly reduced.

The present invention is not limited to the above embodiments.

Namely, the present invention can be applied even when variously modifying and replacing components of the above embodiments within the technical range of the present invention or equivalent range thereof.

Figure 68:
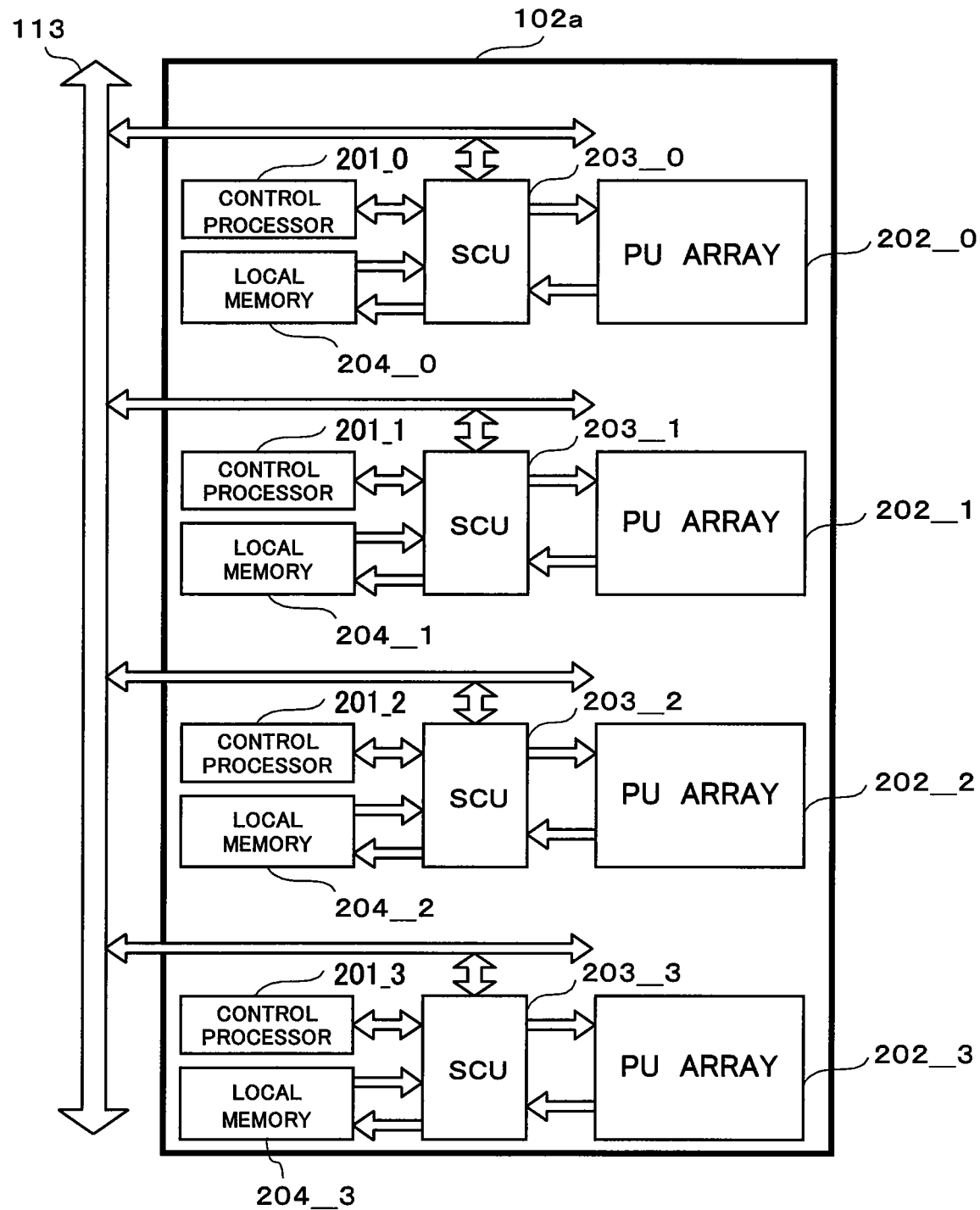
FIG. 68 is another diagram of the configuration of the image processing engine shown in FIG. 2.

For example, in the example shown in FIG. 2, an example of a control processor 201 centrally controlling a plurality of SCUs 203_0 to 203_3 was explained, but as shown in FIG. 68, the control processors 201_0 to 201_3 for individually controlling the SCUs 203_0 to 203_3 may be provided.

Second Embodiment

The image processing apparatus 100 of the second embodiment has the same configuration as that of the first embodiment as shown in FIG. 1, but differs in the configuration of the image processing engine 102 from that of the first embodiment. The configuration of the image processing apparatus 100 other than the image processing engine 102 is the same as that of the first embodiment, therefore the explanation is omitted here.

Below, an explanation will be given of the configuration of the image processing engine 102 of the second embodiment.

[Image Processing Engine 102]

In the same way as the first embodiment, the image processing engine 102 is the programmable image processor, and executes the image processing instructed by the host processor 101 in accordance with the application program executed in the image processing apparatus 100.

The image data covered by the image processing includes data captured by the camera module 107 input via the sensor I/F 106, data stored in the memory system 105 input via the memory I/F 104, data stored in the storage medium 109 input via the storage medium I/F 108, data given from the codec engine 103, and data processed at the codec engine 103.

The image processing engine 102 stores its own processing results via the memory I/F 104 in the memory system 105, stores the same via the storage medium I/F 108 in the storage medium 109, outputs them to the codec engine 103, displays the same in the built-in display device 111 via the built-in display device I/F 110, and outputs the same via the video I/F 112 to an outside apparatus.

Figure 69:
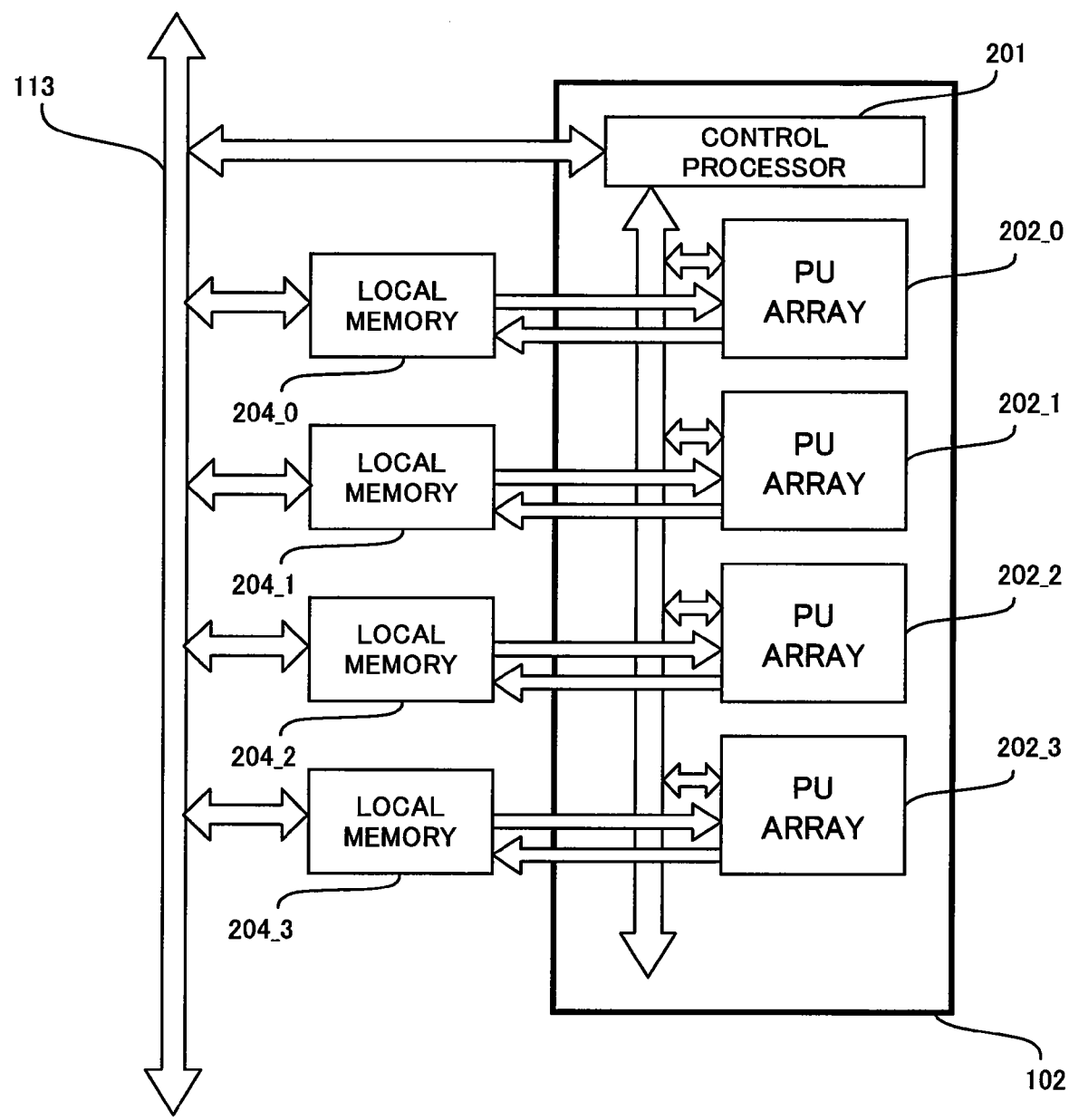
FIG. 69 is a diagram of the overall configuration of an image processing engine 102 of a second embodiment.

FIG. 69 is a diagram of the overall configuration of the image processing engine 102 of the second embodiment.

As shown in FIG. 69, the image processing engine 102 has a control processor (CPU) 201, PU (processor unit) arrays 202_0 to 202_3, and local memories 204_0 to 204_3. The control processor 201 is a processor for controlling the entire image processing engine 102 and handles the setup and activation of the components of the image processing engine 102 and processing at SIMD (Single Instruction Multiple Data) type processor arrays constituting the PU arrays 202—for which parallel processing is difficult.

The PU arrays 202_0 to 202_3 are programmable processors configured by a plurality of SIMD type processor arrays as will be explained later.

Further, the PU arrays 202_0 to 203_3 of the present embodiment differ from the first embodiment in the point that the SCUs (Stream Control Units) are provided inside them as will be explained later.

The local memories 204_0 to 204_3 are working memories of the image processing engine 102 which hold part of the pixel data stored in the memory system 105, store the intermediate results processed at the PU arrays 202_0 to 202_3 and programs executed at the PU arrays 202_0 to 202_3, store various types of parameters, etc.

The image processing engine 102 operates for example the PU arrays 202_0 to 202_3 shown in FIG. 69 by a shared thread under the control of the host processor 101.

The "shared thread" means that the processing is advanced based on for example a shared program.

[PU Arrays 202_0 to 202_3]

An explanation will be given of the PU array 202_0.

The PU arrays 202_1 to 202_3 have the same configuration as that of the PU array 202_0.

Figure 70:
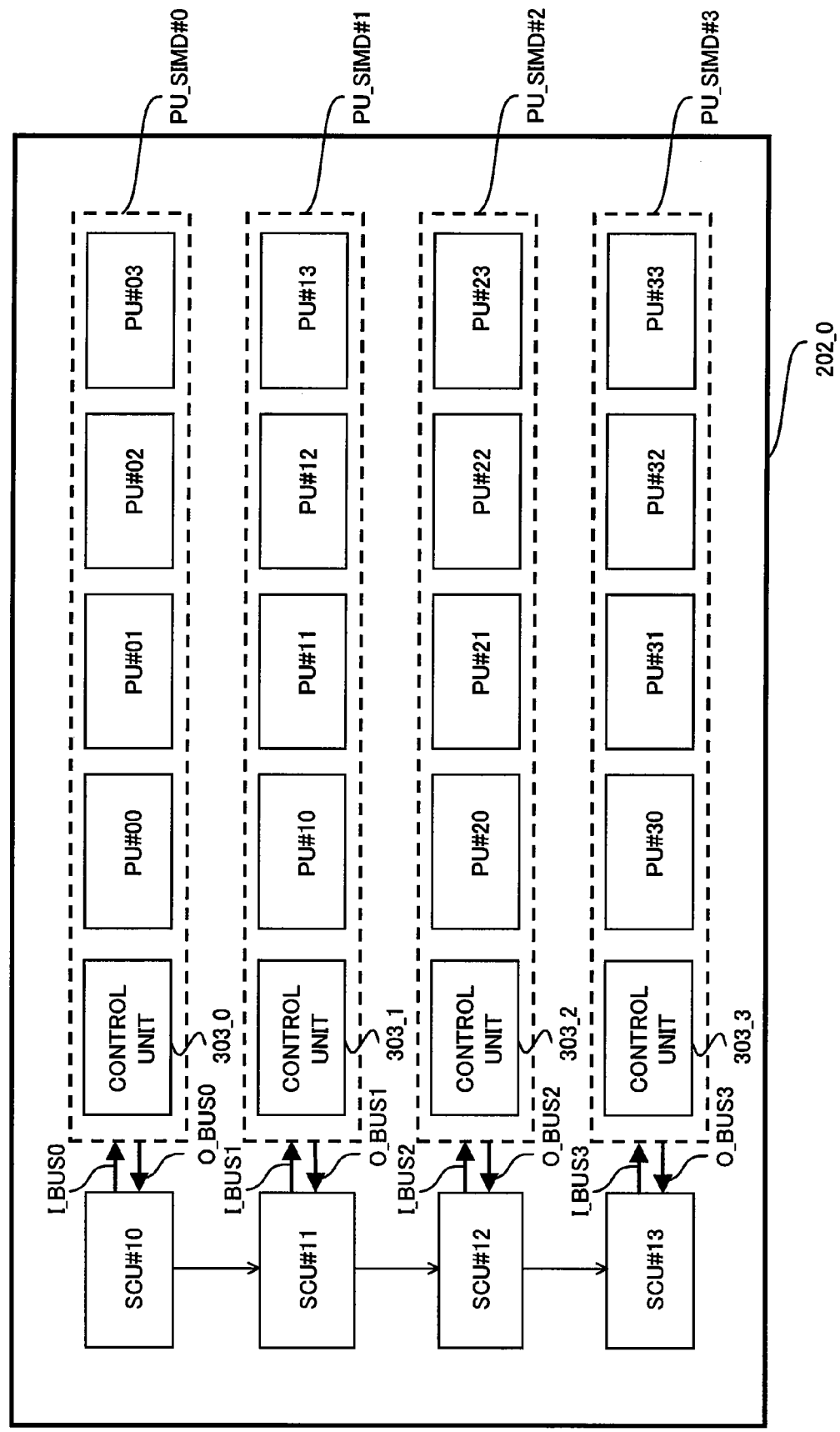
FIG. 70 is a view of the configuration of a PU array 202_0 shown in FIG. 69.

FIG. 70 is a view of the configuration of the PU array 202_0 shown in FIG. 69.

As shown in FIG. 70, the PU array 202_0 has four PU_SIMD (Single Instruction Multiple Data) processing circuits #0 to #3 and SCUs #10 to #13 connected corresponding to the PU_SIMDs.

The PU_SIMD processing circuit #0 has a control unit 303_0 and four processor units PU#00 to PU#03.

The four processor units PU #00 to #03 configure a SIMD type processor operating by the same command.

Four processor units PU #00 to #03 are laterally connected one-dimensionally.

By limiting the connection among the processor units PU #00 to #03 to between adjacent processor units and sharing the I#BUS used for the supply of data from the SCU among four processor units, the interconnects can be reduced and, at the same time, the bus control can be made easy.

By serially connecting the processor units PU #00 to #03, in image processing frequently using the adjacent pixel data, the pixel data can be directly output to the adjacent processor units without going the local memory, so the processing time can be shortened.

The PU_SIMD processing circuits #1 to #3 have the same configuration as that of the PU_SIMD processing circuit #0.

[Processor Unit PU#00]

The configuration of the processor unit PU#00 is the same as the explanation given relating to FIG. 4 in the first embodiment, therefore the explanation is omitted here.

The data input from the SCU (Stream Control Unit) #10 to the processor unit PU#00 via the input data bus I_BUS0 is written into the in line buffer 401 in the PU#00.

Each of the processor elements PE0 to PE15 performs the processing by using the data read out from the in line buffer 401 and writes the processing result into the out line buffer 404.

The SCU #10 reads out the processing result from the out line buffer 404.

As shown in FIG. 70, the PU array 202_0 can independently operate four PU_SIMD processing circuits #0 to #3 in parallel or can directly operate these. When these operate in series, they are connected by utilizing the connection among SCUs.

The control unit 303_0 shown in FIG. 70 has a not shown command storage use memory and outputs a control signal obtained by decoding the command read out from the command storage use memory to all PEs in the PU_SIMD #0.

The control unit 303_0 includes a program flow control use loop register not shown here and a pointer register for accessing the stream register in the PE.

The loop register is a register for controlling the number of loops in the program and can be set by the control processor 201 or can be set by a command at the time of the execution of the program.

When the loop register is set by the command, the register value in the PE can be designated as the source operand. At that time, use is made of the register value of the previously determined PE among a plurality of PEs, for example, the PE on the left end in the figure, for example, the PE0 of the processor unit PU#00.

For the pointer register as well, the register value in PE can be designated as the source operand, but use is made of the register value of a specific PE in the same way as the case of the loop register.

The same is also true for the control units 303_1 to 303_3.

An explanation will be given of the processing routine and processing distribution in the image processing apparatus 100 using as an example the case of storing the still image captured by using the camera module 107.

The data captured by the image capturing device in the camera module 107 is read out via the sensor I/F 106 for each horizontal scan line, is output to the image processing engine 102, and is stored in the memory system 105. At this time, the image processing engine 102 executes part of the wave detection processing.

When 1 frame's worth of the data is stored in the memory system 105, the image processing engine 102 executes the remaining wave detection processing and various types of camera signal processing and various types of image processing while reading the required rectangular image region in the 1 frame's worth of image data in order to make the internal PU_SIMD processing circuits operate in parallel efficiently.

The processing results of the image processing engine 102 are stored in the memory system 105.

The image processing engine 102 also converts the resolution. The resolution-converted image data is displayed via the built-in display device I/F 110 in the built-in display device 111.

The codec engine 103 performs image compression by using the image data of a plurality of frames processed by the image processing engine 102 and stored in the memory system 105. The compressed image data is stored via the storage medium I/F 108 in the storage medium 109.

The image processing engine 102 is configured by a plurality of PU arrays 202_0 to 202_3. The PU arrays 202_0 to 202_3 process different regions in the frame.

When the image processing engine is configured by the four PU arrays 202_0 to 202_3 as in the present embodiment, for example as explained with reference to FIG. 5 in the first embodiment, regions can be assigned to the PU arrays 202_0 to 202_3.

Each of the PU arrays 202_0 to 202_3 has a plurality of PU_SIMD processing circuits configured by 64 PEs as explained before. For example, as explained with reference to FIG. 6 in the first embodiment, the region assigned to each of the PU arrays 202_0 to 202_3 is further divided to rectangular image regions each having lateral 64-pixel width. Each pixel can be assigned to one PE.

At this time, each PE sequentially processes a pixel train in a vertical direction assigned to itself as explained with reference to FIG. 7 in the first embodiment.

For example, a case where the PU array 202_0 performs filtering of 5x5 pixels as shown in FIG. 8 of the first embodiment will be considered.

At this time, each PE in the PU array 202_0 uses the pixel data at the 5x5 pixel positions around a pixel position Pixel in order to perform the filtering of pixel data at the pixel position Pixel for processing as shown in FIG. 8 of the first embodiment.

Each PE in the PU array 202_0 sequentially moves the pixel position to be processed as instructed by the arrow shown in FIG. 8 (downward direction in the figure).

When each PE in the PU array 202_0 ends the filtering of 5x5 pixels described above at the pixel position Pixel, the SCU 203_0, as shown in FIG. 9 of the first embodiment, reads out the pixel data at the pixel position of the next 1 line from the local memory 204_0 or memory system 105 and writes it into the in line buffer 401 of the processor unit PU in the PU array 202_0 shown in FIG. 4.

Then, each PU in the PU array 202_0 performs the filtering of 5x5 pixels of the pixel data at the next pixel position Pixel_next as shown in FIG. 10 of the first embodiment.

Note that, in the above explanation, the PU_SIMD #0 shown in FIG. 70 was focused on for the explanation, but the PU_SIMD #1 to #3 are the same as the PU_SIMD #0.

The PU arrays 202_1 to 202_3 are the same as the PU array 202_0.

[Processor Element PE]

Next, an explanation will be given of PEn (n=1 to 14).

Note that PE0 is the same as the PEn except for the point that, between PEs, it inputs/outputs data only with the PE1, and the PE15 is the same except that it inputs/outputs data only with the PE14.

Figure 71:
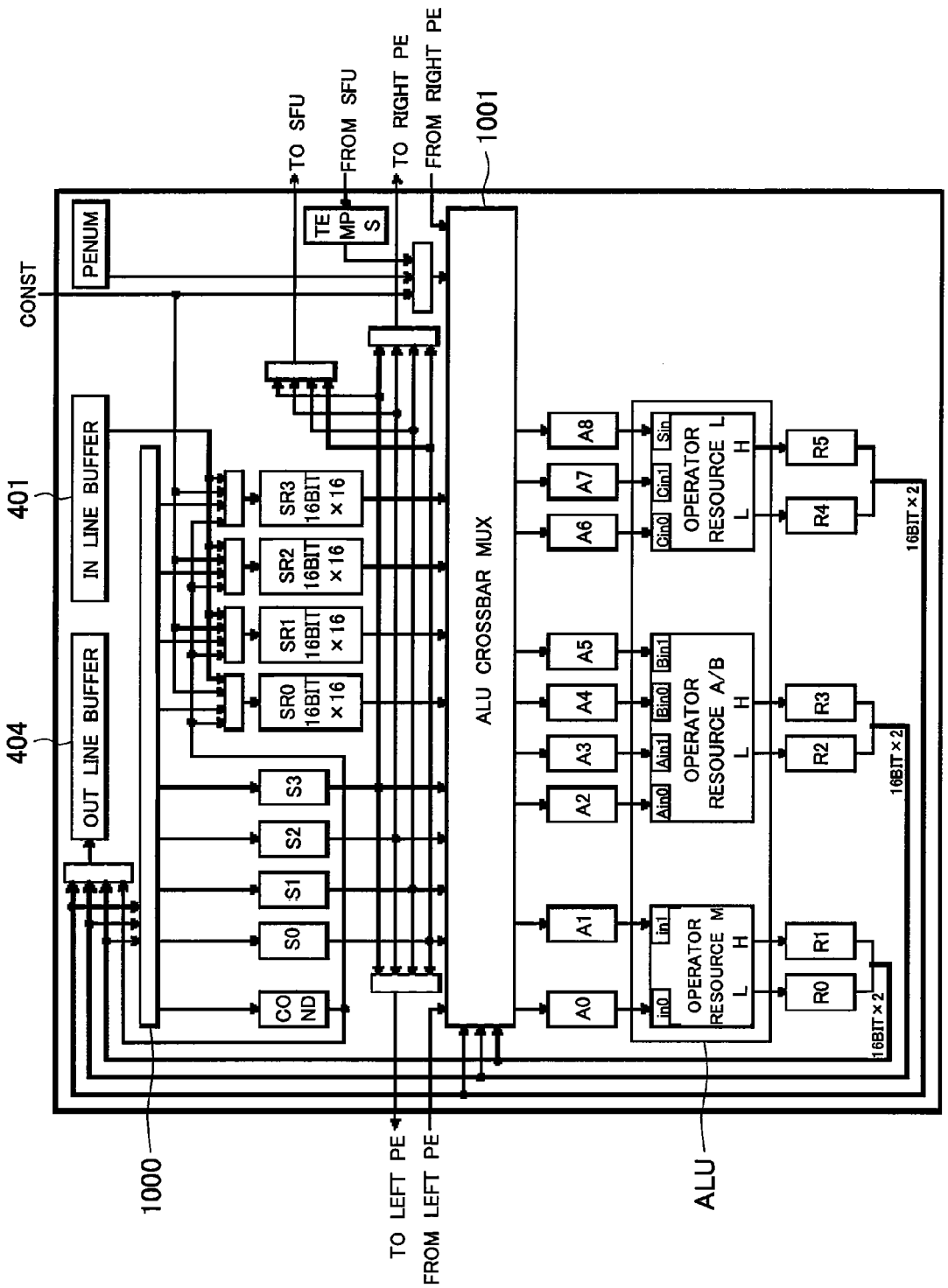
FIG. 71 is a view of the configuration of a PEn in the second embodiment.

FIG. 71 is a view of the configuration of the PEn in the second embodiment.

As shown in FIG. 71, the PEn has the multiplexers MUX1000 and 1001, various types of registers such as the stream registers SR0 to SR3, and an arithmetic and logical unit ALU.

The in line buffer 401 is a buffer receiving the input data sent from an SCU (Stream Control Unit). It can hold one stage's worth of 16-bit data per PE.

The out line buffer 404 is a buffer sending the processing results in a PE to the SCU. It can hold one stage's worth of 16-bit data per PE.

The stream registers SR0 to SR3 are register files each having a 16-bit width and 16 entries, and each PE has four SRs in total.

The stream registers SR0 to SR3 are registers for storage of the data required for the processing mainly supplied from the SCU and temporary backup of the processing results and can perform the access by access by direct address designation. Four pointers at the maximum can be defined for each stream register. Each pointer has the following three values. Namely, these are "Start" as the start point of the pointer definition region, "End" as the end point of the pointer definition region, and "Current" as the current pointer position. Note, End must be equal to or larger than Start. By making the Starts and Ends of the two pointers the same and using one as the read pointer and using the other as the Wwrite pointer, this can be made to function as an FIFO. Further, the Start and End may be changed for each pointer.

Further, overlapping of regions designated by Start and End on each other is not prohibited for completely independent pointers in the same stream register.

Below, the functions related to the stream registers SR0 to SR3 will be explained.

1) Access to the stream registers SR0 to SR3

There are two types of access methods when performing writing or reading with respect to the stream registers SR0 to SR3, i.e., pointer access and direct access.

Pointer access is access by offset from Current of the designated pointer. The offset value is a positive integer within a range from 0 to 15 in the case of reading, while a positive integer within a range from 0 to 3 in the case of writing.

Direct access designates entry in the stream registers SR0 to SR3 by an immediate value. The immediate value is a positive integer within the range from 0 to 15.

2) Pointer Operation

Commands for realizing the pointer operation as shown below are prepared.

a) Immediate Designation of Value Held by the Pointer

Values of Start and End are designated by the immediate value.

b) Immediate Addition with Respect to Current Value

The added immediate value is an integer within a range from −8 to 7.

c) Initialization of Value Held by Pointer

Values of Start, End, and Current are initialized to 0, 15, and 0 after reset. Further, a command for initializing the Current value to the Start value is prepared.

3) Wraparound

When performing the pointer access or pointer operation with respect to the stream registers SR0 to SR3, this sometimes exceeds the region defined by <Start, End>. In this case, the following wraparound is carried out. Here, when the indexes before and after Wraparound to the entry of the stream registers SR0 to SR3 are dxbw and idxaw, the following stand.

idxaw=(idxbw>End)?
Start+(idxbw−End−1) % (End−Start+1): idxbw
idxaw=(idxbw<Start)?
End−(Start−idxbw−1) % (End−Start+1): idxbw 4) Linkage Modes Pointer definition regions designated by the same pointers may be linked for use in the combination of SR0 and SR1 or SR2 and SR3 among the four existing stream registers SR0 to SR3. For example, when linking the pointers 0 for the combination of SR0 and SR1, the region defined by Start and End of the SR0 use pointer 0 and the region defined by Start and End of the SR1 use pointer 0 are linked. When the linkage mode is designated for certain pointers, only the even number pointers in the stream register pair become valid. When an even number pointer value on exceeds End, the pointer value is automatically changed to an odd number side pointer region. This can be used as if the both regions were continuous. Further, when exceeding End of the odd number side pointer region, a Wraparound function of the automatic change to the even number side Start value is realized. By this function, the empty regions of the two stream registers can be effectively utilized, and a pointer region exceeding 16 entries can be defined. When the linkage mode is set as the operation mode of the pointers, only the even number side pointers can be used. The linkage mode is not set in units of stream registers, but in units of pointers. Accordingly, the settings of the linkage mode of the pointers are independent from each other.

A simple explanation will be given of the other registers of a PE.

The registers S0 to S3 are four general purpose registers each having a 16-bit length. When performing processing handling 32-bit data, two continuous registers, that is S0 and S1 or S2 and S3, can be operand designated as a register pair.

The register TEMPS is a temporary backup use register having a data length of 16 bits.

The register TEMPS is a register used when utilizing the shared function unit 403. In a case other than the access to the shared function unit 403, this can be used as a working register. These registers can be designated by both of the source operand and the destination operand of the arithmetic and logical processing command.

The register COND is a condition register having a data length of 4 bits used mainly when performing the conditional execution. This can be designated as the destination operand of the arithmetic and logical processing. At that time, any bit among the processing results, the result of processing at the arithmetic and logical unit ALU, a carry flag indicating that the carry stands, or a zero flag indicating that the result of processing is 0 is selected and it is designated at which bit of the condition register it is to be reflected.

The register PENUM is a processor number register of a read only type having a data length of 6 bits storing the number of processing element (0 to 63).

The path described as Const in FIG. 71 is a path for transferring a constant value when the register CONSTANT is designated as the source operand and has a 16-bit width. The register CONSTANT is configured by a plurality of registers. The register CONSTANT is not provided for each PE, but is provided in the SCU.

A PE, when performing the processing, can access not only its own registers, but also registers of the adjacent PEs. Namely, the PE1 can refer to the registers of the PE0 and PE2. Note that the adjacent PEs can access only the general purpose registers S0 to S3. In FIG. 71, the paths described as To Left PE and To Right PE are paths for transferring values of the general purpose registers S0 to S3 to the left neighboring PE and the right neighboring PE. Further, paths described as From Left PE and From Right PE are paths receiving values of registers selected from the left neighboring PE and the right neighboring PE. A PE in the present embodiment provides different multiplexers for the left neighboring PE and the right neighboring PE, therefore can access different left and right general purpose registers different in the same cycle, so can quickly perform the processing. Note that the PE0 and PE15 can only access the left or right PE.

Next, an explanation will be given of the arithmetic and logical units ALU.

As shown in FIG. 71, a PE has three types of arithmetic and logical units and can simultaneously execute processing using these three arithmetic and logical units. The three types of arithmetic and logical units are a unit for performing multiplication, that is, an operator Resource M, a unit for mainly performing addition/subtraction and comparison operation, that is, an operator Resource A/B, and a unit for mainly performing logical processing and shifts, that is, an operator Resource L.

The data required for the processing in a PE is written into the in line buffer 401 by the SCU. The capacity of the in line buffer 401 is 1 stage's worth having a 16-bit width per PE. Further, the results of the processing at the PE are written into the out line buffer 404. In the same way as the in line buffer 401, the capacity thereof is 1 stage's worth having a 16-bit width per PE.

A PE transfers the data written in the in line buffer 401 to the stream registers SR0 to SR3 by a loading command. The stream registers SR0 to SR3 can be loaded from the register COND other than the in line buffer. Conversely, also the command for moving the data from the stream registers SR0 to SR3 to the COND is prepared.

The writing into the out line buffer 404 is usually carried out by direct designation to the destination operand of the processing command, but a command for moving the data from the register COND to the out line buffer 404 is also provided.

These data transfers are carried out parallel to the processing performed by the arithmetic and logical units ALU.

Namely, in the PE of the second embodiment, a plurality of processings can be simultaneously carried out.

The shared function unit 403 is the same as that in the explanation given in the first embodiment, so the explanation is omitted.

[SCU (Stream Control Unit) #10 to #13]

Below, an explanation will be given of the SCU #10.

The SCUs #11 to #13 are the same as the SCU #10. The SCU #10, as shown in FIG. 70 etc., performs control for efficiently inputting/outputting the data required for the processing of the individual processor elements PE forming the PU_SIMD processing circuit #0 with respect to a plurality of PU_SIMD (Single Instruction Multiple Data) processing circuits #0.

In the same way, the SCU #11 performs control for efficiently inputting/outputting the data required for the processing of the individual processor elements PE forming the PU_SIMD processing circuit #1 with respect to the PU_SIMD processing circuit #1, the SCU #12 performs control for efficiently inputting/outputting the data required for the processing of the individual processor elements PE forming the PU_SIMD processing circuit #2 with respect to the PU_SIMD processing circuit #2, and the SCU #13 performs control for efficiently inputting/outputting the data required for the processing of the individual processor elements PE forming the PU_SIMD processing circuit #3 with respect to the PU_SIMD processing circuit #3.

The SCU #10 stores the data required for the processing in a storage device such as a semiconductor memory etc.

The PU_SIMD processing circuits #0 to #3 are SIMD type processors, therefore the input/output operations with respect to all PEs are simultaneously carried out in terms of time. Accordingly, the input/output by the SCU #10 with respect to the PU_SIMD #0 becomes input/output simultaneous with the number of PEs worth of input/output data. Below, the data simultaneously input/output will be called stream data.

On the other hand, the PU_SIMD processing circuits #0 to #3 mainly perform the processing of image information, but the image information to be processed is stored in a memory or other storage device in the storage region managed by physical one-dimensional addresses while securing a logical two-dimensional storage region. The basic unit of the image data is called pixel data.

The SCU #10 is located between the PU_SIMD processing circuit #0 and the memory system 105 and the local memory 204_0 and has the function of converting the plurality of pixel data to stream data for input/output.

Next, an explanation will be given of the structure of the SCU #10.

Figure 72:
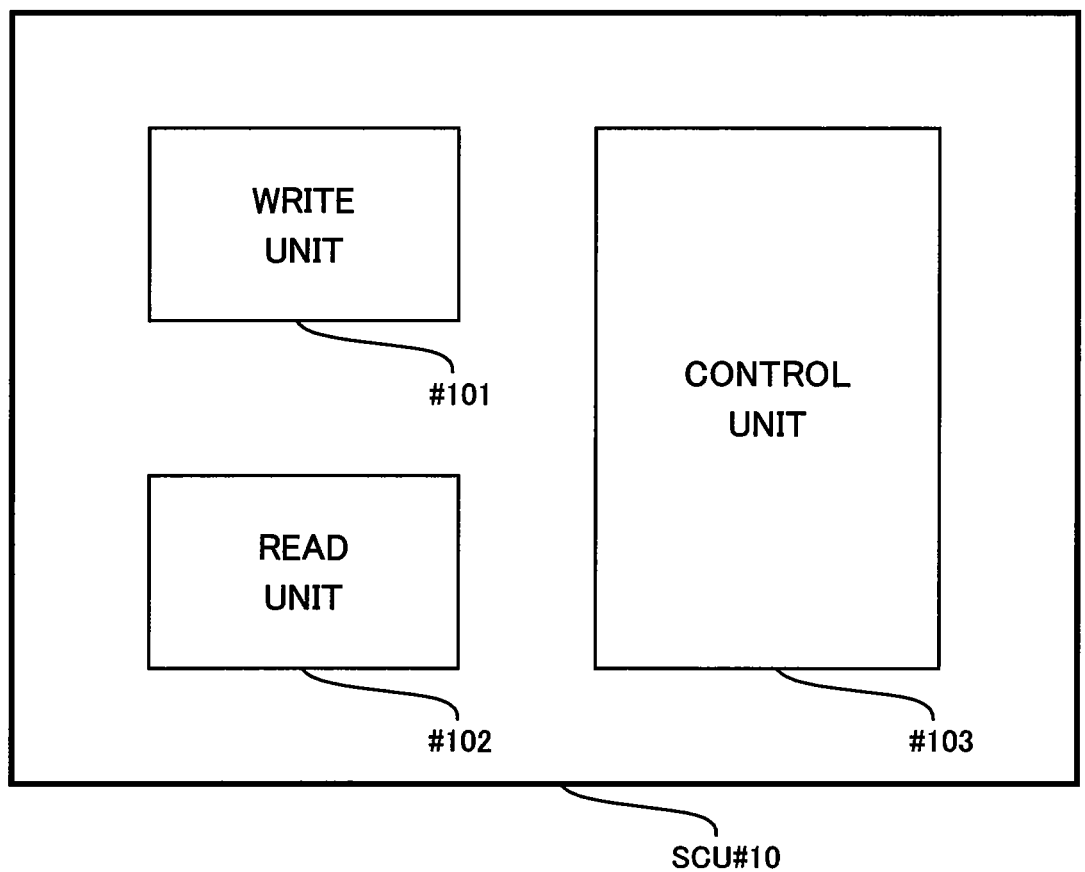
FIG. 72 is a block diagram showing a structure of an SCU #10.

FIG. 72 is a block diagram showing the structure of the SCU #10.

As shown in FIG. 72, the SCU #10 is configured by a write portion #101, a read portion #102, and a control unit #103.

The write portion #101 performs the writing into the local memory 204_0 or memory system 105 (hereinafter referred to as a storage region).

The read portion #102 performs the reading from the storage region.

The control unit #103 is a CPU or other control device for overall control of the SCU #10 and performs data processing and data supply to the PU_SIMD processing circuit #0.

Below, an explanation will be given of a rectangular image region defined in a storage region by the SCU #10.

The hierarchical structure of the rectangular image regions in a storage region handled by the SCU #10 will be explained with reference to FIG. 73.

Figure 73:
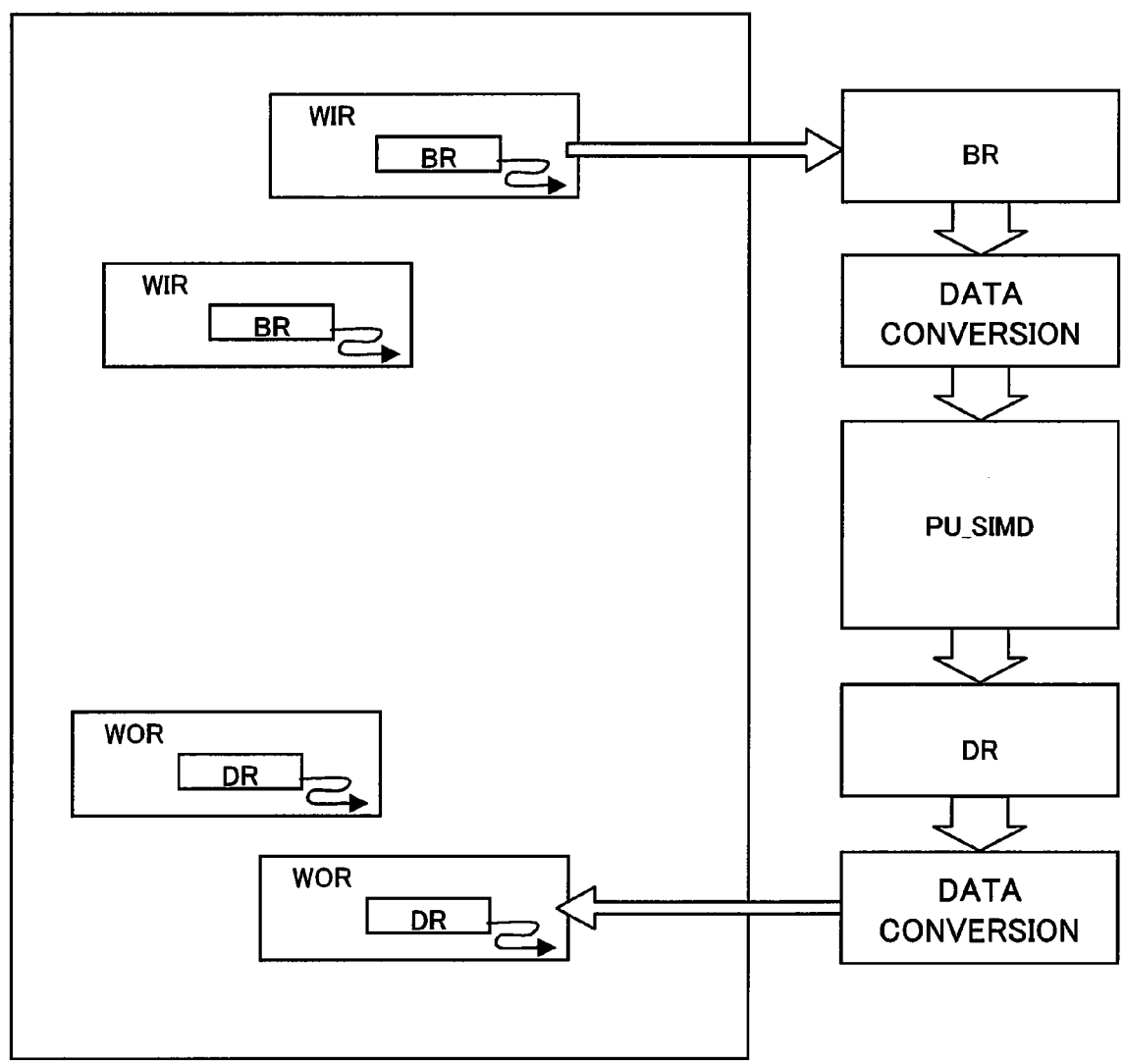
FIG. 73 is a partial diagram for explaining a method of management of a storage region by a stream control unit (SCU) in a second embodiment.

As shown in FIG. 73, the SCU #10 designates the rectangular image region WIR as the input work region in the storage region.

The SCU #10 designates the rectangular image region BR as the reading side of the pixel data in the rectangular image region WIR.

The SCU #10 executes (designates) the data conversion command WI#data#op for converting the pixel data read out from the rectangular image region BR to the stream data required by the PU_SIMD processing circuits #0 to #3 based on the program input from the host processor 101.

The SCU #10 can program a series of repetitive processing of the designation of a rectangular image region BR and WI_data_op as will be explained later.

As shown in FIG. 73, the SCU #10 designates the rectangular image region WOR as the output work region in the storage region.

The SCU #10 designates the rectangular image region DR as the write destination of the pixel data in the rectangular image region WOR.

The SCU #10 executes the data conversion command WO#data#op from the output stream data of the PU_SIMD #0 to the rectangular image region DR.

The SCU #10 can program a series of repetitive processing of the designation of the rectangular image region DR and WO_data_op as will be explained later.

The SCU #10 can arrange and move the rectangular image region BR to any position in the rectangular image region WIR and arrange and move the rectangular image region DR to any position in the rectangular image region WOR.

The SCU #10 can designate the rectangular image region BR or DR by two-dimensional logical coordinates in the rectangular image region WIR or WOR.

The SCU #10 can designate the rectangular image region WIR or WOR of the storage region by physical addresses.

When the pixel data inside the rectangular image regions WIR, WOR, BR, and DR are accessed, access to the storage region becomes necessary, therefore the SCU #10 performs the conversion from the logical address to the physical address and accesses the storage region.

Figure 74:
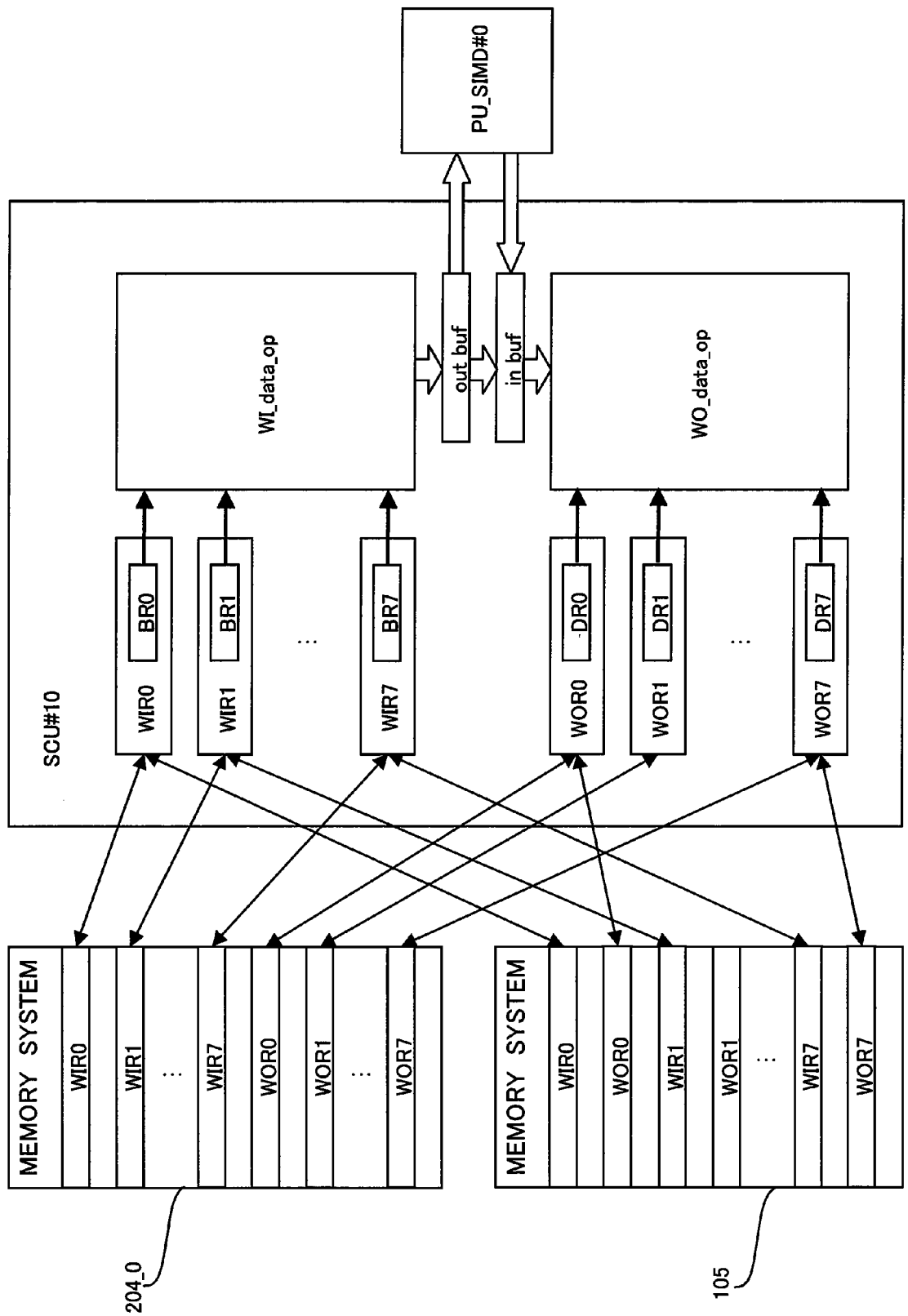
FIG. 74 is a diagram for explaining a function for processing multiplex rectangular image regions set inside the SCU #10.

FIG. 74 is a diagram for explaining the function for the processing concerning the multiplex rectangular image regions set inside the SCU #10.

As shown in FIG. 74, the SCU #10 assigns the rectangular image regions WIR0 and WOR0 in the storage region to the PU_SIMD processing circuit #0.

The rectangular image regions WIR0 and WOR0 are defined in a storage region such as the memory system 105 and local memory 204_0.

Further, the SCU #10 of the present embodiment can define eight types of WIR from WIR0 to WIR7 and eight types of WOR from WOR0 to WOR7 in the storage region. Further, the rectangular image regions BR0 to BR7 are defined in the rectangular image regions WIR0 to WIR7 one by one, and DR0 to DR7 are defined in WOR0 to WOR7 one by one.

The SCU #10 shown in FIG. 72 converts the data in the rectangular image region BR to stream data by the data conversion command WI_data_op and writes the same into the output buffer out_buf.

Further, the SCU #10 data converts the stream data input from the PU_SIMD processing circuit #0 and stored in the input buffer in#buf by the data conversion command WO#data#op and writes the same into the rectangular image region DR.

As explained above with reference to FIG. 72, by defining the rectangular image region BR in the rectangular image region WIR and defining DR in WOR by the hierarchical structure, for example, when the rectangular image region BR is relatively moved in the rectangular image region WIR and DR is relatively moved in WOR, the address can be expressed by adding the standard coordinates to the local coordinates in the rectangular image regions BR and DR and the programming becomes easy.

In the present embodiment, the number of the rectangular image regions, the number of hierarchical levels of the multiplex designation, etc. are expressed by specific numerical values, but the structures and numbers thereof can be freely combined. It is possible to change the structure according to the necessity of broad image processing.

Namely, the SCU 203_0 of the first embodiment set the AR or CR in the rectangular image region and further set BR or DR in that, but according to the SCU #10 of the present second embodiment, AR and CR are not set in WR, but BR and DR are set, therefore, the operation of the SCU #10 is simplified, and the operation speed becomes fast.

Next, an explanation will be given of the connection performed by the SCU #10 for the data transfer.

[Connection of System Bus]

The system bus 113 shown in FIG. 1 is a bus for connecting the SCU #10 to another processing module such as the host processor 101 and memory system 105 and has the following characteristic features.

(1) The system bus 113 can employ an established bus standard inside the LSI or SOC.

(2) The bus width of the system bus 113 is 128 bits. By employing a configuration in which continuous data transfer (burst transfer) is possible, the bus use efficiency can be improved.

(3) The SCU 203_0 accesses the storage device (for example memory system 105) on the system bus 113 as a bus master.

(4) A bus master other than the SCU #10 on the system bus 113 accesses the internal register of the SCU #10 or SCU dedicated storage device (for example, local memory 204_0).

(5) The system bus 113 can perform selection not based on the bus standard so far as the data transfer efficiency and function are satisfied.

[Connection of Dedicated Storage Region of SCU #10]

The SCU #10 can be connected to a dedicated storage device as a dedicated storage region.

A dedicated storage device can be an SRAM or DRAM or other semiconductor memory either inside or outside of the SOC.

The above dedicated storage device is connected to a bus having a broader band than the system bus 113.

The dedicated storage device is prepared for the purpose of the use exclusively by one SCU #10.

The bus master on the system bus 113 can access the dedicated storage device.

[PU_SIMD Connection]

The PU_SIMD processing circuit #0 is bus connected to the SCU #10.

In the same way, the PU_SIMD processing circuit #1 is bus connected to the SCU #11, the PU_SIMD processing circuit #2 is bus connected to the SCU #12, and the PU_SIMD processing circuit #3 is bus connected to the SCU #13.

The stream data is input from the SCU #10 to the PU_SIMD processing circuit #0 using the 256-bit unidirectional bus of the PU_SIMD processing circuit #0. The transfer efficiency is 256 bits/clock.

A 2-line type handshake is employed as the data/transfer protocol.

The SCU #10 is provided inside it with the output buffer out_buf.

In the case of output from the SCU #10, the PU_SIMD processing circuit internal register is identified by designating an address in the PU_SIMD processing circuit #0.

The stream data is input from the PU_SIMD processing circuit #0 to the SCU #10 using the 256-bit unidirectional bus of each PU_SIMD. The transfer efficiency is 256 bits/clock.

Further, a 2-line type handshake is employed as the data/transfer protocol.

The SCU #10 is provided inside it with the input use input buffer in_buf.

In the case of input from the PU_SIMD processing circuit #0 to the SCU #10, the PU_SIMD processing circuit internal register is identified by designating an address in the PU_SIMD.

[Conversion of Physical/Logical Address of SCU #10]

A pixel corresponding position Pixel inside a rectangular image region WR in the storage region explained by using FIG. 73 and FIG. 74 and accessed by the SCU #10 is expressed by a two-dimensional logical address, but the memory system 105 and the local memory 204_0 are expressed by physical addresses. Accordingly, the SCU #10 performs the address conversion from a two-dimensional logical address to a physical address when performing a Read or WRite operation with respect to pixel corresponding positions Pixel designated inside the rectangular image regions AR, BR, CR, and DR in the rectangular image region WR.

The method of the address conversion is the same as that of the first embodiment, so the explanation is omitted here.

[Access to Storage Region by SCU #10]

The SCU #10 can use the memory system 105 as a large scale external storage device connected to the system bus 113 and the local memory 204_0 as a small scale dedicated storage device connected to the system bus 113 as storage regions as explained above.

The memory system 105 is for example a DRAM chip connected to the outside of the SOC including the SCU #10. It is a memory chip such as a general DDR or RAMBUS.

The local memory 204_0 is for example an SRAM inside a SOC including SCU #10 or an eDRAM (Embedded-DRAM: ON-chip DRAM included in the same SOC as SCU).

In general, a DRAM has a hierarchical structure of addresses such as row/column/bank. It is characterized in that continuous data access included in the same row is high speed, but continuous data access bridging row boundaries and continuous access of far away rows requires processing such as page precharging, therefore the speed becomes low.

In the present embodiment, the SCU #10 uses for example DRAMs as the memory system 105 and the local memory 204_0, but there is no problem even in the case of SRAMs. Further, when using DRAMs, by arranging rectangular images of pixel data in a storage region on the same page as much as possible at the time of generation of stream data for the purpose of avoiding discontinuity of the above access performance, the discontinuity of the DRAM access can be reduced as much as possible.

This can be realized by for example the method explained in the first embodiment.

[Definition of Multiplex Rectangular Image Region by SCU #10 (Time of Reading)]

Figure 75:
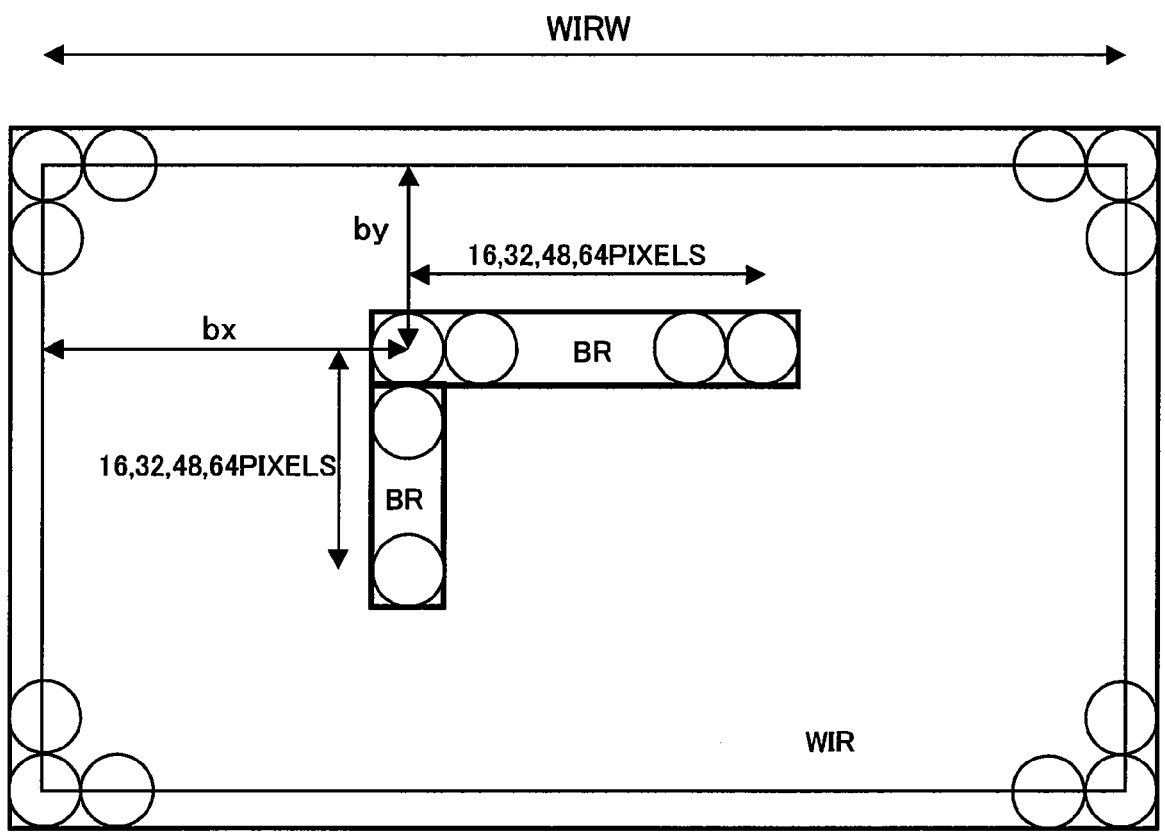
FIG. 75 is a diagram showing an example of a method of definition of a rectangular image region BR in a rectangular image region WIR in a storage region in the second embodiment.

The SCU #100, as explained above, can define a rectangular image region BR in a rectangular image region WIR in a storage region as multiplex rectangular image regions by the two-dimensional logical address expression as shown in FIG. 75.

WIR is defined as a continuous region able to be physically addressed in the storage region.

Further, the designation of a pixel inside an WIR is defined by logical addressing by an SCU.

Here, a pixel is logically addressed with a 16-bit fixed size. Note that for reduction of the amount of information of the storage region, 1 pixel can be expressed by 12 bits or 8 bits. In this case, the difference of pixel expression between the internal portion of the storage region and SCU (for example, in the case of 8 bit/pixel in the storage region, 1 pixel inside an SCU is equivalent to 2 pixels in the storage region) must be noted.

Further, BR can be defined in the WIR.

BR is defined by a logical address space inside the WIR.

BR is not a partial copy of WIR and is accessed by address mapping conversion.

When defining BR, this can be defined outside WIR, but the pixel values in the case of being outside are not guaranteed.

There are eight types of BRs from BR0 to BR7.

The BR regions can be designated by the left end coordinates (bx,by in FIG. 75) of the rectangle for each BRn (n=0 to 7).

The rectangular size of a BR region is designated by wi_data_op from among the following eight types. Namely, it is one of the regions consisting of 16, 32, 48, and 64 pixels in the horizontal direction and 1 pixel in the vertical direction or regions consisting of 1 pixel in the horizontal direction and 16, 32, 48, and 64 pixels in the vertical direction.

As values indicating positional relationships, the following coordinate values are used.

wirw is the x-direction rectangular image region width of the rectangular image region WR.

bx and by indicate the two-dimensional coordinates of the rectangular image region BR in the rectangular image region WIR. The coordinates of the pixel corresponding position Pixel on the top left of the rectangular image region BR is instructed by the coordinate system having the top left of the rectangular image region WIR as the origin (0, 0).

bw and bh indicate the width and height of the rectangular image region BR.

x and y indicate the two-dimensional coordinates of the pixel corresponding position Pixel in the rectangular image region BR. This is the coordinate system having the top left of the rectangular image region BR as the origin (0, 0).

[Processing for Input of Data to PU_SIMD #0 by SCU #10]

The SCU #10 reads out the pixel data Pixel (bx,by) from the rectangular image region BR, converts this to the data stream data (performs the input data conversion processing), and inputs the same to the PU_SIMD processing circuit #0. This processing is the same as the processing explained in the first embodiment, therefore the explanation is omitted.

[Definition of Multiplex Rectangular Image Region (Time of Writing) by SCU #10]

Figure 76:
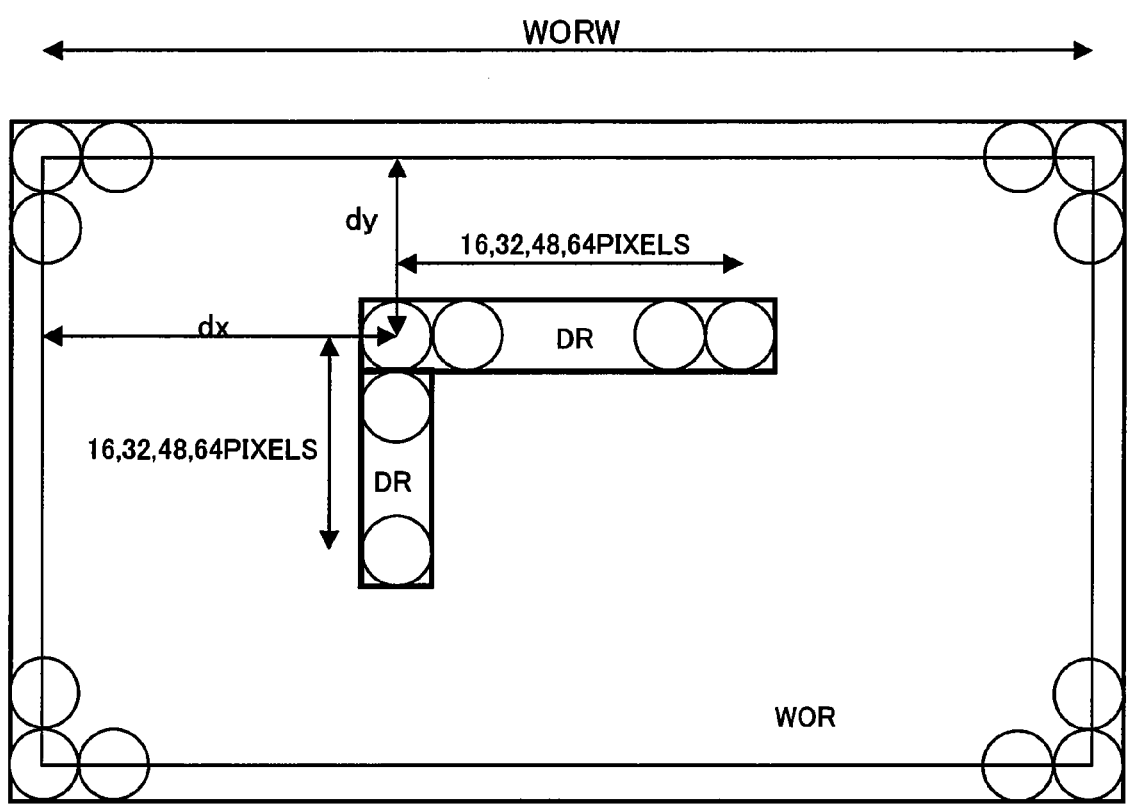
FIG. 76 is a diagram showing an example of a method of definition of a rectangular image region DR in a rectangular image region WOR in a storage region in the second embodiment.

The SCU #10 can define a rectangular image region DR as a multiplex rectangular image region by a two-dimensional logical address expression as shown in FIG. 76 in the rectangular image region WOR in the storage region.

WOR is defined as a continuous region able to be physically addressed in the storage region.

Further, the designation of a pixel inside the WOR is defined by logical addressing by an SCU.

Here, the pixel is logically addressed by a 16-bit fixed size. Note, for the reduction of the amount of information of the storage region, 1 pixel can be expressed by 12 bits or 8 bits. In this case, the difference of pixel expression between the internal portion of the storage region and SCU (for example, in the case of 8 bits/pixel in the storage region, 1 pixel inside an SCU is equivalent to 2 pixels in the storage region) must be noted.

Further, DR can be defined in the WOR.

DR is defined by a logical address space inside the WOR.

DR is not a partial copy of WOR and is accessed by address mapping conversion.

When defining DR, this can be defined outside WOR, but the pixel values in the case of being outside are not guaranteed.

There are eight types of DRs from DR0 to DR7.

The DR regions can be designated by the left end coordinates (dx,dy in FIG. 76) of the rectangle for each DRn (n=0 to 7).

The rectangular size of a DR region is designated by wo_data_op from among the following eight types. Namely, it is one of the regions consisting of 16, 32, 48, and 64 pixels in the horizontal direction and 1 pixel in the vertical direction or regions consisting of 1 pixel in the horizontal direction and 16, 32, 48, and 64 pixels in the vertical direction.

As values indicating positional relationships, the following coordinate values are used.

worw is the x-direction rectangular image region width of the rectangular image region WOR.

dx and dy indicate the two-dimensional coordinates of the rectangular image region DR in the rectangular image region WOR. These show coordinates of the top left of the rectangular image region DR in the coordinate system having the top left of the rectangular image region WR as the origin (0, 0).

dw and dh indicate the width and height of the rectangular image region DR.

[Processing for Conversion of Output Data of PU_SIMD Processing Circuit #0]

The stream data output by the PU_SIMD processing circuit #0 is written into the input buffer in_buf.

The SCU #10 reads out the data from the input buffer in_buf and applies rearrangement or other data conversion processing, then writes it into the rectangular image region DR.

Further, the SCU #10 reads out the data from the input buffer in_buf according to need and applies rearrangement or other data conversion processing according to the mask data DR#mask, then writes it into the rectangular image region DR.

The processing is the same as the processing performed by the SCU 203_0 in the first embodiment, so the explanation is omitted.

[Example of Overall Operation of Image Processing Apparatus 100]

The host processor 101 shown in FIG. 1 executes the program PRG. Due to this, the program is designated in the SCUs #10 to #13 shown in FIG. 70.

The SCUs #10 to #13 access the memory system 105 or local memories 204_0 to 204_3 in accordance with the advance of the processing of the PEs in the PU arrays 202_0 to 202_3 based on each predetermined 4 threads obtained by executing the program designated by the host processor 101.

The PEs in the PU arrays 202_0 to 202_3 operate by different threads from that of the SCUs #10 to #13 while utilizing the results of memory access by SCUs #10 to #13 under the control of the SCUs 203_0 to 203_3 or host processor 101.

In the PU arrays 202_0 to 202_3, the SCUs #10 to #13 and PU_SIMD #0 to #3 are operate while connected.

In the PU_SIMD #0 to #3, the 16 PE0 to PE15 are serially connected, and the input/output of pixel data is carried out according to need between adjacent PEs.

As explained above, according to the image processing apparatus 100 of the second embodiment, the image processing engine 102 operates the PU_SIMD (Single Instruction Multiple Data) units in the PU arrays 202_0 to 202_3 by the shared thread and operates the SCUs #10 to #13 by the different threads from the related thread.

Due to this, it is possible to specify the processing for enormous pixel data in advance and to execute it in parallel among a plurality of processor elements (PE) based on the same thread utilizing the fact that they are mutually independent. Further, in the PEs of the second embodiment, a plurality of processings can be performed simultaneously and the processing speed of the apparatus as a whole is improved.

By setting the thread of the SCUs #10 to #13 separate from the threads for the PU arrays 202_0 to 202_3, it is possible to efficiently realize access to the storage region concerning data relating to the processing of the related PEs by the back end of the processing of the PEs.

According to the image processing engine 102, by having the SCUs #10 to #13 access the storage region for the data relating to the processing of the PU arrays 202_0 to 202_3, the PEs of the PU arrays 202_0 to 202_3 do not have to perform the access processing to the storage region and can efficiently perform the image processing.

According to the image processing engine 102, the pixel data can be input/output to the processor units PU on both sides to which the processor unit PU is serially connected and, at the same time, the PEs serially connected in the processor unit PU can input/output pixel data to the PEs on both sides.

Due to this, in comparison with the case where each PE independently accesses the memory, the number of times of memory access can be greatly reduced.

Further, according to the image processing apparatus 100 of the second embodiment, an SCU is assigned for each PU_SIMD and the processing is individually carried out, therefore the load applied to the SCU is reduced, and the time taken for the image processing is shortened.

Further, according to the image processing apparatus 100 of the second embodiment, the multiplex rectangular image regions defined in the storage regions of SCUs #10 to #13 are only doubles of WR and BR (or DR), therefore the processing is simplified, the load applied to the entire image processing apparatus 100 is reduced, and the time required for the processing is shortened.

The present invention is not limited to the above embodiments.

Namely, the present invention can be applied even when variously modifying and replacing components of the above embodiments within the technical range of the present invention or equivalent range thereof.

In the above embodiments, image processing handling a large amount of data was exemplified, but the present invention can also be applied to various types of data processing other than image processing.

Namely, the present invention can be applied to various types of signal processing for efficiently providing data from the storing means to the processor elements PE in each processor unit PU or conversely writing data from processor elements PE into storing means while maintaining the integrity when performing signal processing in a dispersed manner using a plurality of processor units PU each having a plurality of processor elements PE as in the PU_SIMD processing circuit.

The numbers of the PU arrays 202_0 to 202_3, SCUs 203_0 to 203_3, processor units PU, and processor elements PE explained in the present embodiments may be any numbers.

The invention claimed is:

1. A signal processing apparatus comprising:
at least one storage unit,
an input/output data control unit that controls at least one of reading data from or writing data to a predetermined storage unit in at least one of said storage units, and
a signal processing unit that performs predetermined signal processing on the data read out by said input/output data control unit,
wherein,
said input/output data control unit and said signal processing unit operate based on different threads,
said signal processing unit has a plurality of SIMD (Single Instruction Multiple Data) type signal processing circuits connected in series with each other, and
each of the SIMD type signal processing circuits includes a plurality of signal processing elements connected in series such that one processing element only communicates with two adjacent processing elements, and
the plurality of processing elements are connected in parallel to the input/output data control unit, said input/output data control unit defining rectangular image data storage regions in said storage units, the rectangular image data storage regions comprising rectangular region width and rectangular region height parameters.

2. A signal processing apparatus as set forth in claim 1, wherein one of said plurality of signal processing elements performs said predetermined processing based on data read out by said input/output data control unit from said storage units and input to said signal processing unit and transfers data with adjoining other signal processing circuits.

3. A signal processing apparatus as set forth in claim 2, comprising:
   a predetermined number of said signal processing units; and
   the same number of said input/output data processors as said signal processing units.

4. A signal processing apparatus as set forth in claim 2, wherein:
   said input/output data control unit has a built-in memory, and
   when a processing circuit of one of said plurality of signal processing circuits uses the results of another processing circuit, said input/output data control unit writes the results of the other processing circuit into said built-in memory and reads said results from said built-in memory to the processing circuit.

5. A signal processing apparatus as set forth in claim 2, wherein:
   said plurality of signal processing circuits have predetermined numbers of signal processing elements,
   one of said plurality of signal processing elements performs said predetermined processing based on data read out by said input/output data control unit from said storage units and input to said signal processing unit and transfers data with adjoining other signal processing circuits.

6. A signal processing apparatus as set forth in claim 2, wherein:
   said data is image data,
   said plurality of signal processing circuits are circuits for processing image data, and
   said input/output data control unit (a) manages addresses inside said rectangular image data storage regions in said rectangular image data storage regions by local two-dimensional addresses, (b) generates one-dimensional addresses based on reference addresses showing the positions of said rectangular image data storage regions in said storage regions and said two-dimensional addresses, and (c) accesses image data stored in said storage units based on said one-dimensional addresses.

7. A signal processing apparatus as set forth in claim 1, wherein:
   said data is image data,
   said plurality of signal processing circuits are circuits that process image data, and
   said input/output data control unit includes
   (a) a converter reading out image data from said storage units, converting it to a format enabling output to said signal processing units, and/or converting image data input from said signal processing unit to a format enabling storage in said storage units,
   (b) a first buffer temporarily holding image data read out from said storing units and converted by said converter before outputting it to said signal processing unit, and
   (c) a second buffer temporarily holding image data input from said signal processing unit and converted by said converter until being written in said storage units.

8. A signal processing apparatus as set forth in claim 5, wherein:
   said data is image data,
   said plurality of signal processing circuits are circuits that process image data, and
   said input/output data control unit outputs a plurality of partial image data forming the image data read out from said storage units to the corresponding plurality of signal processing elements.

9. A signal processing apparatus as set forth in claim 6, wherein said input/output data control unit outputs a reference address selected from a plurality of reference addresses set in advance in said rectangular image data storage regions to said plurality of processing circuits.

10. A signal processing apparatus as set forth in claim 6, wherein said input/output data control unit reads out said reference addresses from said storage units and manages access to said rectangular image data storage regions based on said read reference addresses.

11. A signal processing apparatus as set forth in claim 7, wherein said input/output data control unit includes said first and second buffers for each of said plurality of signal processing circuits and reads out data output by any signal processing circuit from a second buffer corresponding to any signal processing circuit and writes it in a first buffer corresponding to another signal processing circuit.

12. A signal processing apparatus as set forth in claim 1, wherein said input/output data control unit executes said first thread of said plurality of signal processing circuits.

13. A signal processing apparatus as set forth in claim 12, wherein each of said signal processing elements has:
   an arithmetic and logic circuit for performing arithmetic operations and/or logic operations,
   a first register storing data input from another two signal processing elements to which said signal processing elements are connected in series and said input/output data control unit, and
   a second register storing data read out from said first register and to be selectively output to any of another two signal processing elements, said arithmetic and logic circuit, and said input/output data control unit.

14. A signal processing apparatus as set forth in claim 13, wherein said first register is a pointer access type register.

15. A signal processing apparatus as set forth in claim 14, wherein said processing in said processing circuit and loading and storage with respect to said first register and said second register are performed in parallel.

16. A signal processing apparatus as set forth in claim 15, wherein at least one of said first registers among the plurality of said first registers is a register for setting a control flag for control of said processing by said processing circuit.

17. A signal processing apparatus comprising:
   a host processing circuit,
   at least one storage unit,
   an input/output data control unit that controls at least one of reading data from or writing data to a predetermined storage unit in at least one of said storage units, and
   a signal processing unit that performs predetermined signal processing on the data read out by said input/output data processing unit,
   wherein,
   said signal processing unit has a plurality of SIMD (Single Instruction Multiple Data) type signal processing circuits connected in series with each other,
   said signal processing unit operates under control of said host processing circuit or said input/output data control unit based on a common first thread, said input/output data control unit operates under the control of said host processing circuit based on a second thread separate from said first thread, each of the SIMD type signal processing circuits includes a plurality of signal processing elements connected in series such that one processing element only communicates with two adjacent processing elements, and the plurality of processing elements are connected in parallel to the input/output data control unit, said input/output data control unit defining rectangular image data storage regions in said storage units, the rectangular image data storage regions comprising rectangular region width and rectangular region height parameters, said rectangular region width and rectangular region height parameters configured for hierarchical designation.

18. A signal processing apparatus as set forth in claim 1, wherein said rectangular region height and rectangular region width parameters are configured for hierarchical designation.

* * * * *